United States Patent [19]

Hicks

[11] 4,083,034

[45] Apr. 4, 1978

[54] PLURAL TRACKER CHARACTER DETECTION AND BOUNDARY LOCATION SYSTEM

[75] Inventor: James Ray Hicks, Irving, Tex.

[73] Assignee: Recognition Equipment Incorporated, Dallas, Tex.

[21] Appl. No.: 729,540

[22] Filed: Oct. 4, 1976

[51] Int. Cl.$^2$ .............................................. G06K 9/00
[52] U.S. Cl. .................. 340/146.3 H; 340/146.3 MA
[58] Field of Search .............. 340/146.3 H, 146.3 AG, 340/146.3 J, 146.3 MA, 146.3 ED, 146.3 SG

[56] References Cited

U.S. PATENT DOCUMENTS

| 3,613,080 | 10/1971 | Angeloni et al. | 340/146.3 MA |
| 3,805,237 | 4/1974 | Cobb et al. | 340/146.3 H |
| 3,818,445 | 6/1974 | Neville | 340/146.3 H |
| 3,827,025 | 7/1974 | Mauch et al. | 340/146.3 H |
| 3,883,848 | 5/1975 | Minck et al. | 340/146.3 H |

OTHER PUBLICATIONS

E. P. Tenpas, "Character Golation for Recognition Machines", IBM Tech. Discl. Bulletin, vol. 19, No. 1, June 1976.

*Primary Examiner*—Joseph M. Thesz
*Attorney, Agent, or Firm*—John E. Vandigriff

[57] ABSTRACT

A system is provided for detecting and locating touching, overlapping and broken segment characters in a binary information stream generated by scanning printed characters on a document surface with a linear sensor array. Fixed, variable and proportional pitch characters are accommodated. As the information stream is circulated through a shift register memory, selected cells of the memory provide a center cell memory window to plural trackers. The trackers are activated on a priority basis as center cells of the memory window satisfy a start condition, and trace between center cells satisfying an adjacency condition. Tracker information is qualified to identify valid information, and the valid tracker information merged to detect and center a valid character in a memory mosaic for output to succeeding systems.

11 Claims, 39 Drawing Figures

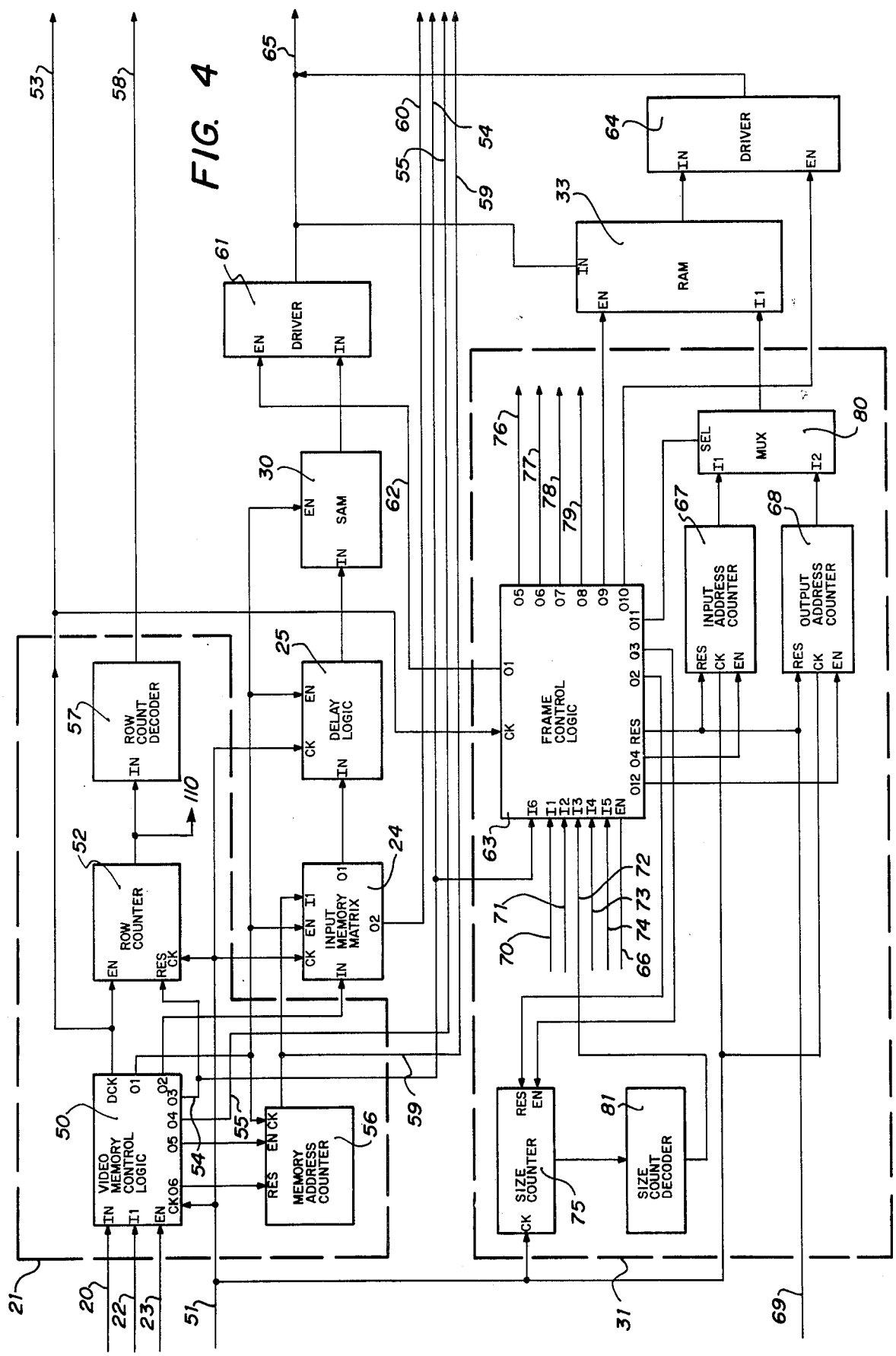

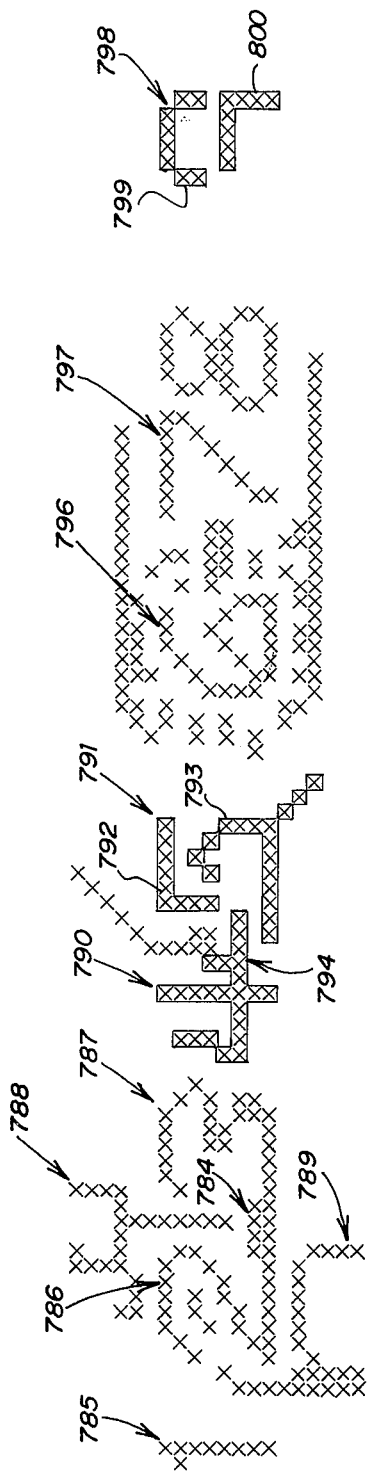
FIG. 26
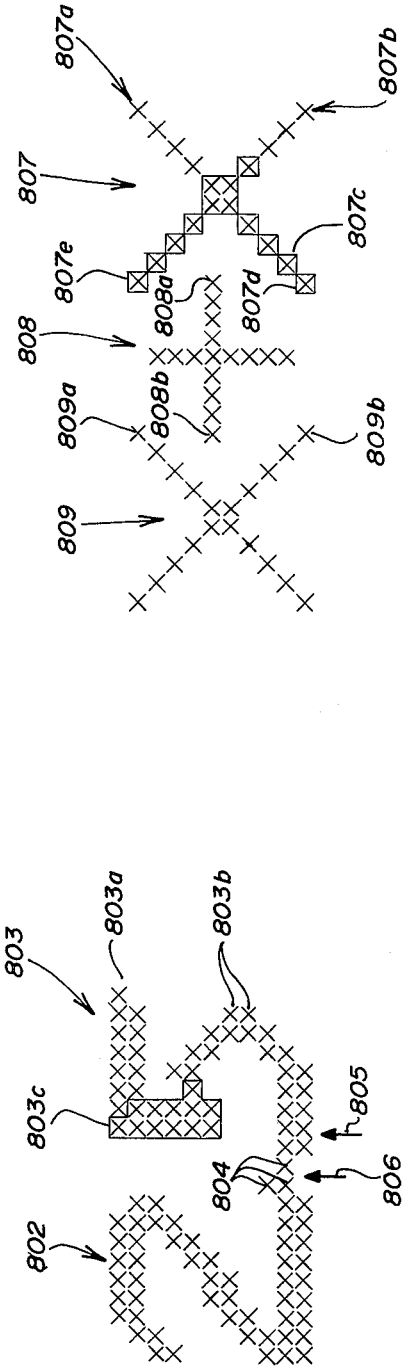
FIG. 28
FIG. 27

PLURAL TRACKER CHARACTER DETECTION AND BOUNDARY LOCATION SYSTEM

FIELD OF THE INVENTION

The invention relates to systems for positioning a character image in a storage matrix, and more particularly to a system for detecting and locating character information in a data stream generated by the scanning of an information field.

PRIOR ART

The reliability of character information detection and location systems heretofore used has been dependent upon highly constrained handprint and machine fonts, timing marks placed on a document surface, a fixed character pitch (characters per inch), feedback from character recognition logic, or separate vertical and horizontal searches of condensed information usually formed by logically ORing selected data bits.

Systems requiring document timing marks, fixed character pitch or printing constraints are limited in application, and subject the user to an unnecessary expense in formatting his documents. Where feedback from recognition logic is required, a serious time constraint occurs since the recognition logic must operate in real time. Further, separate vertical and horizontal searches of condensed information is not only time consuming, but also of limited reliability.

The character detection and location systems previously used also have been unreliable in detecting variable or proportional pitch characters, touching characters, overlapping characters, broken segment characters, characters encompassed by background noise, and partial character images occurring as a result of scanning an information line at a skew.

The systems disclosed in U.S. Pat. Nos. 3,104,369 and 3,105,956 are representative of the prior systems. U.S. Pat. No. 3,104,369 discloses a system for locating characters wherein a first character is located with OR'd video data. Succeeding characters are located by sampling the video data stream at fixed time intervals. Overlapping characters may be detected if non-touching, and touching characters may be detected in an information data stream with fixed character spacing.

U.S. Pat. No. 3,105,956 discloses a character recognition system wherein timing marks and a recognition logic output are required to locate a character image in a storage matrix.

The present invention provides a system for detecting character information in a data stream, and locating the character image in a storage matrix prior to a character recognition process. Neither document timing marks nor data compression is required. Further, the need for separate vertical and horizontal searches of a binary image is obviated. Overlapping characters, broken segment characters and characters occurring in information fields with background noise are detected reliably in information streams exhibiting a fixed or a variable character pitch. Further, the system reliably detects touching characters in data streams exhibiting a fixed character pitch. With minor modifications, the system may be adapted to accommodate proportional pitch characters. The performance of the system is not compromised by the appearance of character fragments in the data stream occurring as a result of scanning an information line at a skew.

SUMMARY OF THE INVENTION

The invention is directed to a system for detecting and locating the boundaries of characters occurring in an information field wherein characters may touch, overlap, exhibit broken segments, or be encompassed by background noise sources.

More particularly, a binary information stream is received from a linear sensor array scanning the information field. A memory control means circulates the information stream through a shift register memory to a scan assembly memory mosaic. A stationary memory window of the shift register memory is provided to plural trackers at the shift rate. The trackers are activated on a priority basis as center cells of the memory window satisfy a start condition, and continue to trace between center cells satisfying an adjacency condition. Uppermost and lowermost center cell coordinates, center cell counts and scan counts for each tracker are provided throughout a tracing operation.

A read only memory control unit evaluates each tracker and marks valid those trackers tracing character information. Valid tracker information then is merged and evaluated to detect and locate valid characters in the binary information stream. The valid characters are centered in the memory mosaic for output to succeeding systems.

In one aspect of the invention, character fragments or characters of an adjacent information line appearing within the field of view of an information line being scanned are rejected.

In another aspect of the invention, both fixed and variable character pitch are accommodated.

In a second embodiment of the invention, proportional pitch characters are accommodated.

DESCRIPTION OF THE DRAWINGS

For a more complete understanding of the present invention and for further objects and advantages thereof, reference may now be had to the following description taken in conjunction with the accompanying drawings in which:

FIG. 3 diagrammatical illustration of memory map sections of the input memory matrix unit and the tracker memory unit of FIG. 2;

FIG. 4 is a functional block diagram of the memory control unit and the frame control unit of FIG. 2;

FIGS. 26-28 illustrate diagrammatically character images which heretofore could not be detected with reliability.

DESCRIPTION OF PREFERRED EMBODIMENTS

FIG. 1

Figure 1:
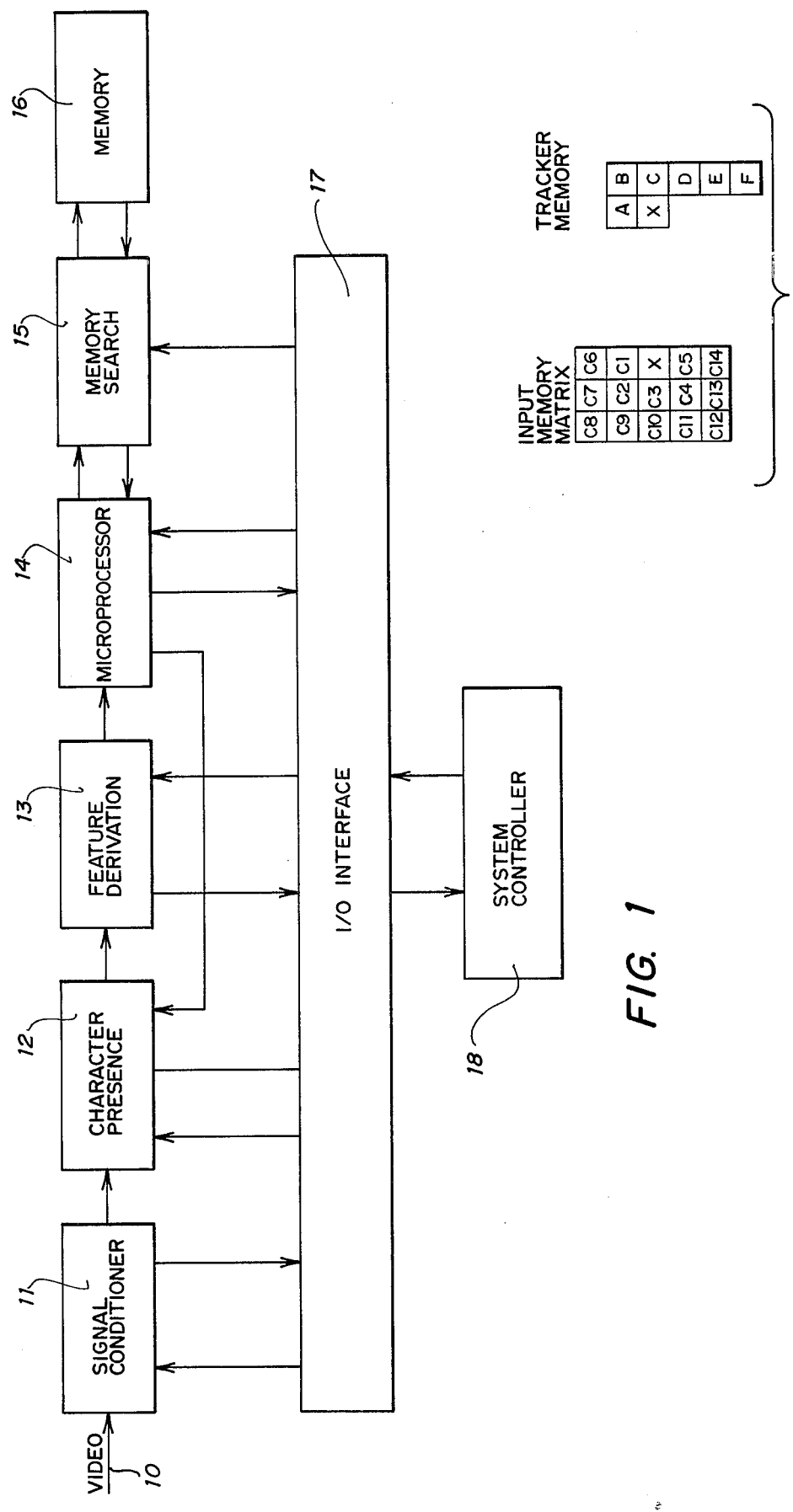
FIG. 1 is a functional block diagram of a optical character recognition system embodying the invention.

FIG. 1 is a functional block diagram of an optical character recognition system embodying the present invention.

Video data on a data line 10 is received by a signal conditioner 11, where the data is filtered, digitized, and formated. The digitized output of conditioner 11 is applied to a character presence unit 12 which detects the character information, and positions the binary character image within a memory mosaic. A feature derivation unit 13 accesses the memory mosaic to trace the character image boundary and derive therefrom slope features from which the character may be identified. The features so derived are supplied to a microprocesser 14 which formats the features for a memory search operation. Memory search unit 15 under the control of the microprocessor 14 searches a memory unit 16, and forwards a character recognition signal to the microprocesser upon finding a match to the formatted features. The microprocesser thereupon issues an interrupt through an I/O interface unit 17 to a system controller 18. Controller 18 then reads a character code stored in memory search unit 15 to identify the character.

When character presence unit 12 detects the presence of a character, an interrupt is issued through unit 17 to the system controller 18. The system controller thereupon senses a scan count provided by unit 12 to locate a character on a document surface. Controller 18 further senses a status signal output by unit 12 to identify a valid character, a character space or a character reject.

The invention described herein is embodied in the character presence unit 12, and comprises a system for detecting and locating fixed or variable pitch characters in an information stream including touching, overlapping, proportional or variable pitch characters, and broken segment characters. The system provides a substantial improvement over prior systems in detecting and locating characters within a background of ink splatter or overprint. Further, the reliability of the system is not compromised by the appearance of characters of an adjacent information line within the viewing window of the information line being read.

FIG. 2

Figure 2:
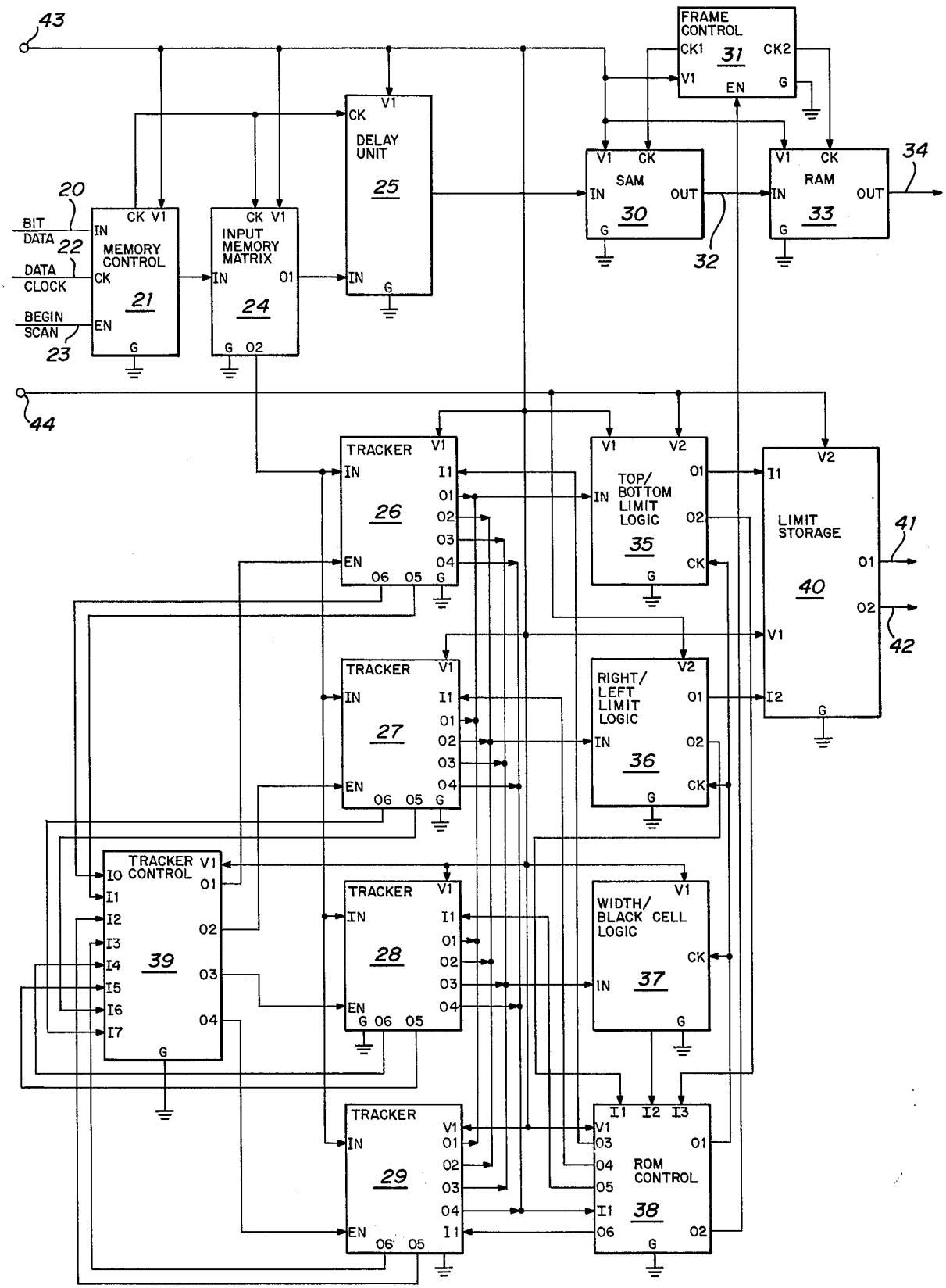
FIG. 2 is a functional block diagram of the character presence unit of FIG. 1.

FIG. 2 illustrates in functional block diagram form the character presence unit 12 of FIG. 1.

A data line 20 leading from the signal conditioner 11 of FIG. 1 is connected to the input of a memory control unit 21. The clock input of the control unit is connected to a control line 22 leading from an output of signal conditioner 11, and the enable input of the control unit is connected to a control line 23 also leading from an output of signal conditioner 11. The clock output of memory control unit 21 is connected to the clock inputs of an input memory matrix unit 24 and a delay unit 25. The G input of the control unit is connected to ground.

Memory matrix unit 24 is a 3 × 50 bit memory having stored therein three scans of video data. The delay unit 25 is a 2 K bit shift register which may impart up to a 40 scan delay to the serial bit data stream supplied by memory matrix unit 24.

The O1 output of memory matrix unit 24 is connected to the input of delay unit 25, and the O2 output is connected to the input of trackers 26-29. The G inputs of memory matrix unit 24 and delay unit 25 are connected to ground. The output of delay unit 25 is connected to the input of a SAM (scan assembly memory) 30. SAM 30 is a 69 × 50 bit memory having a 24 × 32 bit character image mosaic centered therein. The clock input to SAM 30 is connected to the CK1 (clock 1) output of a frame control unit 31, and the output of SAM 30 is supplied by way of a data cable 32 to the input of a RAM (random access memory) 33. The G input of SAM 30 is connected to ground.

RAM 33 is a 2 K × 24 bit memory in which 64 characters may be stored for character recognition. The clock input to the RAM is connected to the CK2 (clock 2) output of frame control unit 31, and the output of the RAM is connected to a data cable 34 leading to succeeding recognition systems. The G input of RAM 33 is connected to ground.

The O1 output of tracker 26 is connected to the O1 outputs of trackers 27-29, and to the input of a top/bottom limit logic unit 35. Each of the trackers is comprised of a tri-state driver. Thus, although multiple outputs are connected to a common data cable, only one output at a time is enabled.

The O2 output of tracker 26 is connected to the O2 output of trackers 27-29, and to the input of a right/left limit logic unit 36. The O3 output of tracker 26 is connected to the O3 output of trackers 27-29, and to the input of a width and black cell logic unit 37. The O4 output of tracker 26 is connected to the O4 outputs of trackers 27-29, and to the I1 input of a ROM control unit 38. The G inputs of trackers 26-29 are connected to ground. The O5 output of tracker 26 is connected to the I1 input of a tracker control unit 39, and the O6 output of the tracker is connected to the I0 input of the tracker control unit. The enable input of tracker 26 is connected to the O1 output of the tracker control unit, and the I1 input of tracker 26 is connected to the O3 output of ROM control unit 38. The G input of ROM control unit 38 is connected to ground.

The O5 output of tracker 27 is connected to the I6 input of control unit 39, and the O6 output of the tracker is connected to the I7 input of control unit 39. The I1 input to tracker 27 is connected to the O4 output of ROM control unit 38, and the enable input to the tracker is connected to O2 output of tracker control unit 39. The G input of control unit 39 is connected to ground.

The O5 output of tracker 28 is connected to the I5 input of tracker control unit 39, and the O6 output of the tracker is connected to the I4 input of the tracker control unit. The I1 input of tracker 28 is connected to the O5 output of ROM control unit 38, and the enable input of the tracker is connected to the O3 output of tracker control unit 39.

The O5 output of tracker 29 is connected to the I2 input of tracker control unit 39, and the O6 output of the tracker is connected to the I3 input of the tracker control unit. The I1 input to tracker 29 is connected to the O6 output of ROM control unit 38, and the enable input of the tracker is connected to the O4 output of tracker control unit 39.

The O1 output of ROM control unit 38 is connected to the clock inputs of logic units 35-37, and the O2 output of ROM control unit 38 is connected to the enable input of frame control unit 31. The G input of control unit 31 is connected to ground.

The O1 output of logic unit 35 is supplied to the I1 input of a limit storage unit 40, and the O2 output of the logic unit is supplied to the I3 input of unit 38. The O1 output of logic unit 36 is supplied to the I2 input of the storage unit 40, and the O2 output of the logic unit is supplied to the I1 input of unit 38. The output of logic unit 37 is connected to the I2 input of control unit 38. The O1 output of storage unit 40 is connected to a data cable 41, while the O2 output of the storage unit is connected to a data cable 42. The G inputs of logic units 35-37 and storage unit 40 are connected to ground.

A +5 volt source 43 is connected to the V1 inputs of memory control unit 21, input memory matrix unit 24, delay unit 25, SAM 30, frame control unit 31, RAM 33, trackers 26-29, logic units 35-37, control units 38 and 39, and storage unit 40. A minus 12 volt source 44 is applied to the V2 inputs of logic units 35 and 36, and storage unit 40.

In operation, a video sensor comprised of a single column of 50 sensor elements sweeps a document surface. The sensor elements are scanned once per sample at a 5.5 microsecond scan rate, and the video signal formed thereby is digitized by signal conditioner 11 to form a serial bit stream. The serial bit data stream is supplied at the scan rate to data line 20 leading to memory control unit 21. The memory control unit transfers a serial bit data stream a scan at a time to the input memory matrix unit 24. The output of the input memory matrix unit is forwarded at the scan rate under the control of unit 21 to delay unit 25, and to the black cell tracker units 26-29.

The output of the forty scan delay unit 25 is supplied to SAM unit 30, and the output of SAM 30 in turn is transferred to RAM 33 under the control of frame control unit 31. Unit 31 operates in response to commands from ROM control unit 38.

The trackers 26-29 operate under the control of a tracker control unit 39 which senses the current state of each tracker, and initiates the trackers on a priority basis. More particularly, trackers 26-29 provide active/inactive status signals at their O5 outputs, and tracker complete signals at their O6 outputs. When a first data scan is received, and provided by way of memory matrix unit 24 to trackers 26-29, tracker control unit 39 issues a start pulse to an inactive tracker of highest priority which satisfies a start condition. Upon initiation, the tracker traces the video a data bit at a time from scan to scan until an adjacency condition is not met.

FIG. 3

FIG. 3 illustrates memory map sections of input memory matrix unit 24 and a tracker memory unit.

The adjacency condition may be explained by referring to FIG. 3, where the X-cell refers to a current center cell of a stationary memory window in input memory matrix unit 24. An adjacency condition for a tracker is met if the following Boolean algebra equation is satisfied:

$$\text{Adjacency} = x \cdot (A + B + C + D) + x \cdot C5 \cdot E + x \cdot C5 \cdot C14 \cdot F + C3 \cdot A \quad \text{(A)}$$

So long as the above adjacency condition is satisfied, the tracker continues to trace from center cell to center cell as provided by the input memory matrix unit 24. If the adjacency condition is not satisfied after a complete scan, however, the tracker issues either an inactive or complete signal to the tracker control unit 39. By way of example, a tracker may encounter a void in a scan. Upon receiving a status signal from ROM control unit 38 indicating that no character information is present, the tracker shall issue an inactive signal. The tracker issues a complete signal, however, if the ROM control unit 38 has detected valid character information. The complete state indicates that valid character information in a tracker memory has not been forwarded to logic units 35-37. In this event, the character information is retained until after the ROM control unit 38 has an opportunity to access the tracker registers.

As each scan of data is received into the tracker memories, tracker control unit 39 senses the status of each tracker and issues a start pulse to the inactive tracker of highest priority which satisfies a start condition. Referring again to FIG. 3, a start pulse is generated by tracker control unit 39 when the following Boolean algebra equation is satisfied:

$$\text{Start} = x \cdot C1 \cdot (C6 + C7) + x \cdot C2 \cdot (C6 + C7 + C8 + C9 + C10) + x \cdot C3 \cdot (C9 + C10 + C11) + x \cdot C4 \cdot (C10 + C11 + C12 + C13 + C14) + x \cdot C5 \cdot (C13 + C14). \quad \text{(B)}$$

Each of the trackers has a one scan memory, top and bottom limit registers, a character width register, a tracker cell counter and a row counter. The top register is updated if the current count of the row counter is less than the row count stored in the top register. Further, the bottom register is updated if the current count of the row counter exceeds the row count of the bottom register. The tracked cell counter of a tracker is updated each time an adjacency condition is met, and the width register is updated each time a vertical scan of data is received by the tracker while the tracker is either in an active or a complete state.

The tracker registers are continually sensed by the ROM control unit 38 to detect the presence of valid character information. Valid character information may be present if the center of a character image is within a predetermined number of cells of the center of a last detected character image. The validity condition may be represented by the following Boolean algebra equation:

$$V = (FCM + \Delta Y) \cdot B \cdot (W + H), \qquad (C)$$

where $\Delta Y$ is the character center deviation, $B$ is a black cell count threshold parameter, $W$ is a character width threshold parameter, $H$ is a character height threshold parameter, and FCM refers to a first character mode. An FCM condition exists when a first character presence has been indicated, and there is no previous character to compare against.

If a tracker in the complete state is determined to have valid character information in its memory, the output of the tracker is transferred under the control of ROM control unit 38 to update logic units 35-37. It should be noted that only valid trackers may become complete, and in the complete state the trackers retain their information until a data transfer is ordered by unit 38 to update logic units 35-37.

Logic units 35-37 accept the tracker information, and detect therefrom the boundary limits and scan width of the character image. If a character is too tall or too wide to comprise valid character information, ROM control unit 38 designates the character to be a reject. If the character is too small, however, a character space is indicated.

As the data scans are transferred through input memory matrix unit 24, they are forwarded to delay unit 25 which may provide up to a forth scan delay. The delay affords ROM control unit 38 the time to fully process a character image. Under the control of memory control unit 21, a vertical scan is shifted through delay unit 25 and applied to SAM 30 where a character image may be centered within a character image mosaic. In the preferred embodiment, the character image mosaic is 24 columns wide and 32 rows tall. When ROM control unit 38 has determined that a character has been centered within SAM 30, the control unit issues an enable pulse to frame control unit 31. Unit 31 in response thereto transfers a 24 × 32 bit memory mosaic from SAM 30 to RAM 33 a row at a time in a top to bottom scan. As the mosaic is transferred from SAM 30 to RAM 33, the contents of logic units 35 and 36 are transferred to limit storage unit 40. When the feature derivation unit 13 of FIG. 1 requests video from the character presence unit as illustrated by FIG. 2, the contents of limit storage unit 40 are accessed. The transfer from the limit storage unit is followed by a character video transfer from RAM 33.

Thus, under the control of ROM control unit 38 and frame control unit 31, a character image, the top and bottom limits of the character, and the right and left limits of the character may be transferred to feature derivation unit 13 of FIG. 1.

FIG. 4

FIG. 4 is a functional block diagram illustrating in a more detailed form the memory control unit 21 and the frame control unit 31 of FIG. 2.

A serial bit stream of video data is carried by data line 20 from signal conditioner 11 of FIG. 1 to the input of a video memory control logic unit 50. Signal conditioner 11 also supplies a data clock to the I1 input of logic unit 50 by way of a control line 22, and a begin scan signal to the enable input of the logic unit by way of a control line 23. In addition, an 18 MHz clock signal is supplied by the system controller 18 of FIG. 1 to the clock input of the logic unit 50 by way of a control line 51.

The video memory control logic unit 50 synchronizes the video data on line 20, the data clock signal on line 22 and the begin scan signal on line 23 with the 18 MHz clock on line 51. Logic unit 50 supplies a synchronized 9.0 MHz data clock to the enable input of a six bit row counter 52 and to a control line 53. The logic unit further provides 27.5 nanosecond write pulses at a 9.0 MHz rate at its O1 output. The write pulses are applied to the enable inputs of input memory matrix unit 24, delay logic unit 25 and SAM 30. Logic unit 50 also issues a synchronized 9.0 MHz data bit stream from its O2 output to the input of input memory matrix unit 24. Synchronized 55 nanosecond begin scan pulses are provided at the O3 output of logic unit 50, and applied at a 9.0 MHz rate to the reset input of row counter 52 and to a control line 54. A second write signal comprised of 27.5 nanosecond pulses is provided at the O4 output of logic unit 50, and applied at a 9.0 MHz rate to a control line 55. The O5 output of logic unit 50 is connected to the enable input of a modulo 46 memory address counter 56, the reset input of which is connected to the O6 output of logic unit 50.

Counter 56 is clocked by the write signal at the O1 output of logic unit 50, and provides an address count to the I1 input of the input memory matrix 24 and to a control line 59. Every 50 clock pulses, counter 56 is reset by logic unit 50.

The clock input to row counter 52 is connected to control line 51, and the output of the row counter is connected to the input of a row count decoder 57. The output of decoder 57 in turn is connected to a control line 58.

Video memory control logic unit 50, memory address counter 56, row counter 52 and row count decoder 57 comprise memory control unit 21 of FIG. 2.

The clock input of memory matrix unit 24 is connected to control line 51 and to the clock input of delay logic unit 25. The video data received at the input of the memory matrix unit is supplied as a serial bit stream at a 9.0 MHz rate to the input of the delay logic unit 25. In response to the memory address count supplied by counter 56, memory matrix unit 24 supplies video data appearing within a stationary 15 bit memory window to a data cable 60.

The delay logic unit 25 imparts up to a 40-scan delay to the serial bit stream supplied by memory matrix unit 24, and applies the delayed data stream to the input of SAM 30. The 24 bit output of SAM 30 is applied to the input of a driver 61, the enable input of which is connected by way of a control line 62 to the O1 output of a frame control logic unit 63. The output of driver 61 is connected to the input of RAM 33, to the output of a driver 64 and to a data cable 65.

Driver 61 is a tristate driver of a type such as that manufactured and sold by Texas Instruments, Incorporated of Dallas, Texas, and identified as Model No. SN74368.

The frame control logic unit 63 controls the transfer of video data from SAM 30 to RAM 33, and the transfer of the character information from RAM 33 to succeeding character recognition systems. The clock input of logic unit 63 is connected to control line 53, and the enable input is connected to a control line 66. The reset input of logic unit 63 is connected to the reset input of an 11-bit input address counter 67, the reset input of an 11-bit output address counter 68, and to a control line 69. The I1 input of the logic unit is connected to a control line 70, and the I2 input is connected to a control line 71. The I3 input to logic unit 63 is connected to a control cable 72, the I4 input to a control line 73 and the I5 input to a control line 74. The I6 input to logic unit 63 is connected to line 54.

The O2 output of logic unit 63 is connected to the reset input of a five-bit size counter 75, and the O3 output of the logic unit is connected to the enable input of the size counter. The O4 output of logic unit 63 is connected to the enable input of address counter 67, the O5 output to a control line 76, and the O6 output to a control line 77. The O7 output of logic unit 63 is connected to a control line 78, and the 08 output is connected to a control line 79. The O9 output of logic unit 63 is connected to the enable input of RAM 33, and the O10 output of the logic unit is connected to the enable input of driver 64. The O11 output of logic unit 63 is connected to the select input of a multiplexer 80, and the O12 output of the logic unit is connected to the enable input of counter 68.

The clock input to size counter 75 is connected to the clock inputs of counters 67 and 68, and to control line 51. The output of size counter 75 is connected to the input of a size count decoder 81, the output of which is applied to control cable 72.

The output of address counter 67 is connected to the I1 input of multiplexer 80, and the output of address counter 68 is connected to the I2 input of the multiplexer. The output of multiplexer 80 in turn is connected to the I1 input to RAM 33.

Frame control logic unit 63, counters 67, 68 and 75, multiplexer 80 and decoder 81 comprise frame control unit 31 of FIG. 2.

In operation, the system of FIG. 4 is initialized by a a master clear pulse issued by system controller 18 of FIG. 1 by way of control line 69. Counters 67 and 68, and frame control logic unit 63 thereby are reset. The control logic unit 63 in turn resets size counter 75.

At the time that the master clear signal is issued on line 69, the video memory control logic unit 50 is enabled by a begin scan pulse on line 23. The logic unit thereupon synchronizes the begin scan pulse, the 9.0 MHz data clock signal on control line 22, and the serial bit data stream on data line 20 with the 18 MHz clock signal on control line 51. The logic unit 50 further resets memory address counter 56, and issues a synchronous begin scan signal to reset row counter 52. The counter 52 is enabled by the next leading edge of the synchronous data clock signal supplied by logic unit 50, and thereafter counts at a 18 MHz rate until it is again reset. The logic unit 50 in addition directs the flow of the serial data bit stream on line 20 through input memory matrix unit 24 and delay logic unit 25 to SAM 30. More particularly, the video data bits are stored into input memory matrix unit 24 at the address indicated by the memory address counter 56. Between video scans, the video data is clocked through the memory matrix unit at a 18 MHz rate. During the data transfer, the row count is continually sensed by the row counter decoder 57. Upon detecting the occurrence of a 49 count, the decoder issues a signal on line 58 to indicate that the bottom cell of a 50 cell vertical video scan has become a center cell in a 15 bit memory window of memory matrix unit 24. As the data bit stream is clocked through the three 50 bit columns comprising input memory matrix unit 24, center cell data bits are supplied serially to the delay logic unit 25. In addition, the center cell and those data bits surrounding the center cell within the stationary 15 bit memory window of unit 24 are supplied to a data cable 60.

Delay logic unit 25 imparts a 12-scan delay to the serial data bit stream supplied by memory matrix unit 24. The serial bit stream is transferred through the logic unit 104 at the 18 MHz rate and stored in SAM 30. The data then is transferred as a 24 × 32 bit memory mosaic from SAM 30 to driver 61 at the write signal rate of 9.0 MHz. When driver 61 is enabled by frame control logic unit 63, the 32 24-bit words of the memory mosaic are transferred to data cable 65.

The data also is transferred from SAM 30 to RAM 33 under the control of frame control logic unit 63, which is enabled by a character presence signal on control line 66. Upon detecting the character presence signal, logic unit 63 resets size counter 75. The logic unit 63 then initiates a transfer of data from SAM 30 to RAM 33 upon receipt of a logic one pulse on control line 71. More particularly, logic unit 63 enables driver 61 and selects multiplexer 80 to the input address counter 67. In addition, the logic unit 63 issues enable pulses to RAM 33, and increments both the input address counter 67 and the size counter 75 at the data clock rate. Logic unit 63 also senses the output of decoder 81 to detect a count of 31, which indicates that 32 rows of data have been transferred from the SAM 30 to the RAM 33. When a size count of 31 is detected, the logic unit 63 disables driver 61, enables driver 64, resets size counter 75 and selects multiplexer 80 to output address counter 68 for a read operation. During the read operation, logic unit 63 increments output address counter 68 at the data clock rate, issues a recognition clock pulse to control line 78, and increments counter 75 upon the transfer of each row of data. When the size count carried by control cable 72 is equivalent to 31, the last row of data in RAM 33 has been transferred. Upon completion of the read operation, the write operation again is initiated to store additional character information into RAM 33.

FIGURE 5

Figure 5:
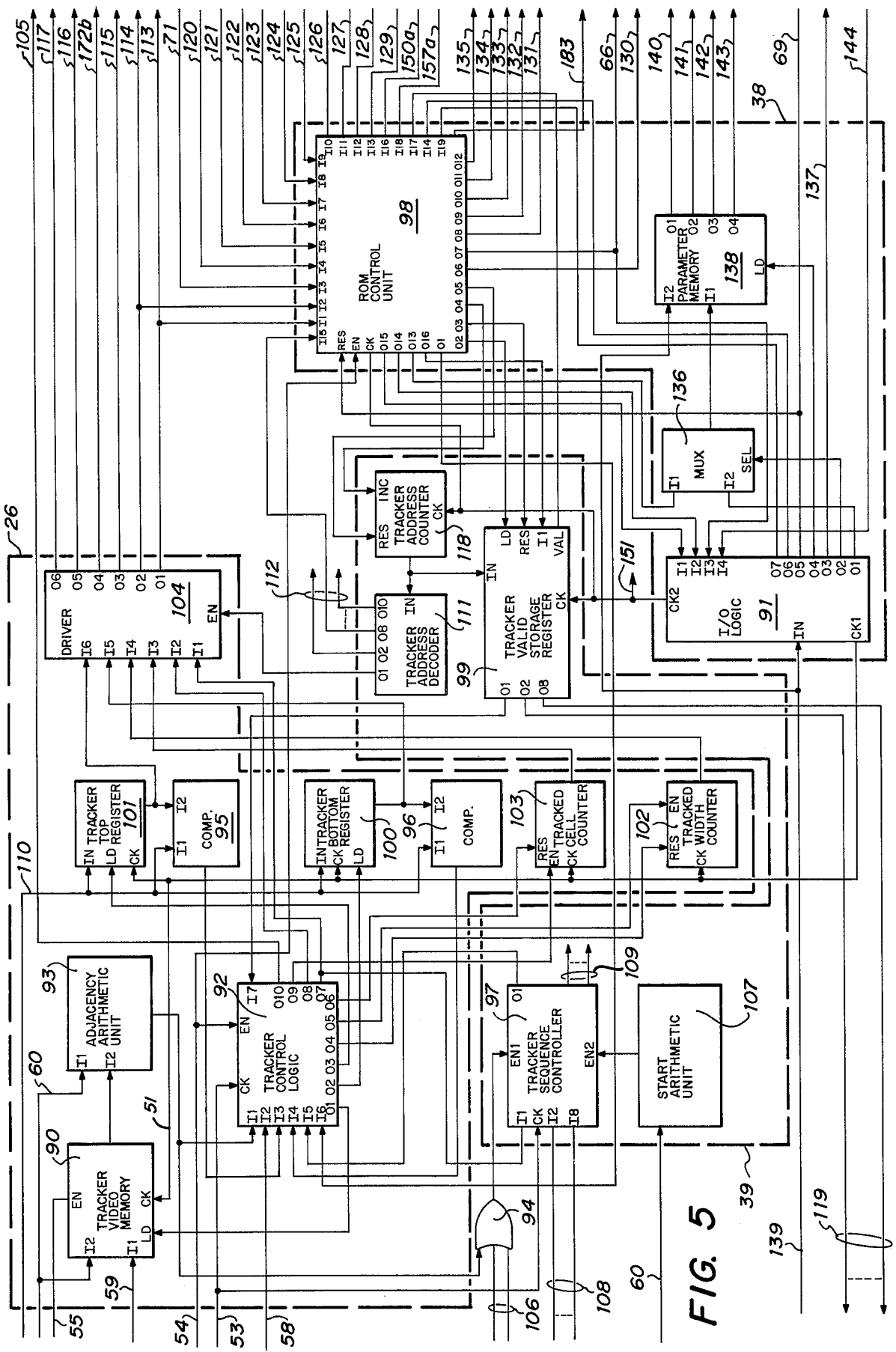
FIG. 5 is a functional block diagram of a tracker, the tracker control unit and the ROM control unit of FIG. 2.

FIG. 5 is a detailed functional block diagram of tracker 26, tracker control unit 39 and ROM control unit 38 of FIG. 2.

Video memory control logic unit 50 of FIG. 4 supplies a write signal along a control line 55 to the enable input of a fifty bit tracker video memory unit 90. The address input I1 to memory unit 90 is connected by way of control line 59 to the output of memory address counter 56. The data input I2 to memory unit 90 is connected by way of data cable 60 to the O2 output of memory matrix unit 24. The clock input to memory unit 90 is connected by way of control line 51 to the 4.5

MHz CK1 (clock 1") output of an I/O logic unit 91. The LD (load) input to memory unit 90 is connected to the O1 output of a tracker control logic unit 92, and the output of the memory unit is connected to the I2 input of an adjacency arithmetic unit 93. The I1 input to arithmetic unit 93 is connected by way of cable 60 to an output of the input memory matrix unit 24 of FIG. 4. The output of arithmetic unit 93 is connected to the I1 input of tracker control logic unit 92, and to one input of an OR gate 94.

The I2 input of logic unit 92 is connected to control line 58 leading to the output of decoder 57 of FIG. 4, and the I3 input to logic unit 92 is connected to the output of a comparator 95. The I4 input of logic unit 92 is connected to the output of a comparator 96, and the I5 input to the logic unit is connected to the O1 output of a tracker sequence controller 97. The I6 input to logic unit 92 is connected to the O1 output of a ROM control unit 98 comprised of a 16 × 256 bit ROM (read only memory). The I7 input to the logic unit is connected to the O1 output of a tracker valid storage register 99. The clock input to logic unit 92 is connected to control line 53 leading to an output of video memory control logic unit 50 of FIG. 4. The enable input to logic unit 92 is connected to control line 54 also leading to an output of logic unit 50, and to the enable input of ROM control unit 98.

The O2 output of control logic unit 92 is connected to the load input of a six-bit tracker bottom register 100, and the O3 output of the logic unit is connected to the load input of a six-bit tracker top register 101. The O4 output of logic unit 92 is connected to the reset input of an eight-bit tracker width counter 102, and the O5 output of logic unit 92 is connected to the enable input of the width counter. The O6 output of logic unit 92 is connected to the reset input of a six-bit tracked cell counter 103. The O7 output of logic unit 92 is connected to the I1 input of a driver 104, and to the I1 input of the tracker sequence controller 97. The O8 output of logic unit 92 is connected to the I2 input of driver 104, the O9 output of the logic unit is connected to the enable input of counter 103, and the O10 output of the logic unit is connected to a control line 105.

The EN1 enable input to controller 97 is connected to the output of OR gate 94, the remaining inputs of which are connected to seven control lines 106 leading to adjacency arithmetic units embodied in trackers other than tracker 26. The EN2 enable input of controller 97 is connected to the output of a start arithmetic unit 107, the input to which is connected by way of data cable 60 to the O2 output of input memory matrix unit 24. The clock input to controller 97 is connected to line 53. The I2-I8 inputs to controller 97 are connected to control lines 108 leading to seven trackers other than tracker 26. The O2-O8 outputs of controller 97 are applied by way of control lines 109 to tracker control logic units embodied in trackers other than tracker 26. It is to be understood that while eight trackers are referred to in the preferred embodiment described herein, any number of trackers may be used.

The input to register 101 is connected by way of a control line 110 to the output of row counter 52 of FIG. 4. The input to register 101 also is connected to the I1 input of comparator 95, to the input of bottom register 100, and to the I1 input to comparator 96. The clock input to register 101 is connected to control line 51, to the clock input of bottom register 100, to the clock input of tracked cell counter 103 and to the clock input of width counter 102. The output of register 101 is applied to the I2 input of comparator 95 and to the I6 input to driver 104.

The output of bottom register 100 is connected to the I2 input of comparator 96, and to the I5 input to driver 104. The output of tracked cell counter 103 is connected to the I3 input to driver 104, and the output of width counter 102 is connected to the I4 input to driver 104. The enable input to driver 104 is connected to the O1 output of a tracker address decoder 111, the O2-O10 outputs of which are applied to control lines 112. Eight of lines 112, lines 112a-112h, are connected to the enable inputs of drivers in trackers other than tracker 26. The O1 output of driver 104 supplied to the I1 input of ROM control unit 98 and to a control line 113. The O2 output of driver 104 is applied to the I2 input of unit 98 and to control line 114. The O3 output of driver 104 is connected to a control line 115, the O5 output to a control cable 116 and the O6 output to a control cable 117.

Driver 104 is a tristate driver of a type such as that manufactured and sold by Texas Instruments Incorporated of Dallas, Texas, and identified as Model No. SN74368.

Tracker video memory unit 90, tracker control logic unit 92, arithmetic unit 93, comparators 95 and 96, registers 100 and 101, counters 102 and 103, and driver 104 comprise tracker 26 of FIG. 2.

The input to decoder 111 is connected to the input of register 99, and to the output of a four-bit tracker address counter 118. The reset input to counter 118 is connected to the O5 output of unit 98, and the increment input to the counter is connected to the O4 output of unit 98. The clock input to counter 118 is connected to the clock input of unit 98, to the clock input of register 99 and to the CK2 clock output of logic unit 91.

The O2-O8 outputs of register 99 are applied by way of control lines 119 to tracker control logic units embodied in seven trackers other than tracker 26. The load input to register 99 is connected to the O2 output of unit 98, and the reset input to the register is connected to the O3 output of unit 98. The valid input I1 of register 99 is connected to the O16 output of unit 98, and the valid output of the register is connected to the I17 input of unit 98.

Tracker sequence controller 97, register 99, start arithmetic unit 107, decoder 111 and counter 118 comprise tracker control unit 39 of FIG. 2.

The reset input to ROM 98 is connected to the O5 output of logic unit 91 and to control line 69 leading to the reset input of counters 67 and 68 of FIG. 4. The I3 input to ROM 98 is connected to control line 71, the I4 input to a control line 120, the I5 input to a control line 121, and the I6 input to a control line 122. The I7 input is connected to a control line 123, the I8 input to a control line 124 and the I9 input to a control line 125. The I10 input to ROM control unit 98 is connected to a control line 126, the I11 input to a control line 127, the I12 input to a control line 128 and the I13 input to a control line 129. The I14 input to unit 98 is connected to the O6 output of logic unit 91, the I15 input to the O8 output of decoder 111, and the I19 input to the O7 output of logic unit 91.

The O6 output of unit 98 is connected to a control line 130, and the O7 output is connected to control line 66 and to the I3 input of logic unit 91. The O8 output of unit 98 is connected to a control line 131, the O9 output to a control line 132 and the O10 output to a control line 133. The O11 output of unit 98 is connected to a control line 134, and the O12 output is connected to a control line 135. The O13 output of unit 98 is connected to the I1 input of a multiplexer 136, and the O14 output of unit 98 is connected to the I2 input of logic unit 91. The O15 output of unit 98 is connected to the I1 input of logic unit 91, the I4 input of which is connected to a control line 144.

The O1 output of logic unit 91 is connected to the I2 input of multiplexer 136, and the O2 output of the logic unit is connected to the select input of the multiplexer. The O3 output of logic unit 91 is connected to a control line 137, and the O4 output is connected to the load input of an 8 × 15 bit parameter memory unit 138.

The output of multiplexer 136 is applied to the I1 input of memory unit 138, the I2 input of which is connected to the input of logic unit 91 and to a data cable 139. The O1 output of memory unit 138 is connected to a control line 140, the O2 output to a control line 141, the O3 output to a control line 142 and the O4 output to a control line 143. The parameter memory unit 138 may be comprised of storage registers such as those manufactured and sold by Texas Instruments, Incorporated, of Dallas, Texas and represented to the public as Model No. 74LS670.

I/O logic unit 91, ROM control unit 98, multiplexer 136 and parameter memory unit 138 comprise ROM control unit 38 of FIG. 2.

In operation, the system of FIG. 5 is initialized by a reset signal provided at the O5 output of the I/O logic unit 91. The addressing logic of the unit 98 is reset, and the ROM in turn resets tracker address counter 118, and issues a tracker reset command to tracker control logic unit 92. The tracker control logic thereupon resets tracker width counter 102 and tracked cell counter 103.

Threshold parameters used in the tracker and character evaluation processes, which are to be further described, are stored in the parameter memory unit 138. More particularly, the threshold parameters are carried by the I/O data cable 139 to the I2 input of memory unit 138 and to the input of logic unit 91. During a parameter loading operation, logic unit 91 selects multiplexer 136 to the I2 input, and supplies thereto parameter addresses for loading the threshold parameters in memory unit 138. Upon receiving a load command from logic unit 91, the memory 138 stores the parameters at the addresses indicated by multiplexer 136. Upon completion of the parameter storage operation, logic unit 91 selected multiplexer 136 to the O13 output of ROM control unit 98. During the processing of tracker information by logic units 35-37 of FIG. 2, unit 98 issues parameter addresses by way of multiplexer 136.

The tracker video memory unit 90 is enabled by a write pulse on line 55, while the tracker control logic unit 92 and unit 98 are enabled by a begin scan signal on line 54.

As video information, hereafter referred to as black video, appears in memory unit 24, such video is qualified by the start arithmetic unit 107. If the start condition of Equation B is satisfied, the tracker sequence controller 97 issues a start pulse to the control logic of the highest priority tracker which is inactive. After a system reset, tracker 26 is the highest priority tracker which is inactive. Upon receiving the start pulse from controller 97, logic unit 92 stores the 15 bit data word on cable 60 into those memory cells of memory unit 90 which are addressed by counter 56 of FIG. 4. Logic unit 92 further loads top register 101 and bottom register 100 with the current count of row counter 52, and increments the cell counter 103 to a one count to indicate that a first black video cell has been stored.

As additional black video appears in memory unit 24, it is compared with the tracker video output of unit 90 and qualified by the adjacency arithmetic unit 93. If the current black center cell in the memory window satisfies Equation A, a pulse is issued to the logic unit 92 which stores the center cell of the 15-bit data word on data cable 60 into the 50 bit video memory unit 90. In addition, logic unit 92 updates the top register 101 if the row count is less than the content of the top register as indicated by comparator 95. If the row count is greater than the content of the bottom register as indicated by comparator 96, logic unit 92 updates bottom register 100. Further, logic unit 92 increments cell counter 103 to indicate that an additional black cell has been detected.

The begin scan signals issued by the video memory control logic unit 50 occur once each scan, every 5.5 microseconds. Each time a begin scan signal occurs, logic unit 92 increments width counter 102. Thus, the output of the width counter is an indication of the number of scans which have occurred since tracker 26 has been initialized.

It now may be understood that as black video is stored in memory unit 90, the control logic unit 92 updates top register 101 so that the highest row having black video meeting the adjacency condition is indicated. Further, logic unit 92 updates the bottom register 100 so that the lowest row having black video meeting the adjacency condition is indicated. In addition, as tracker 26 is tracking the black video in video memory 90, the width counter 102 is updated each scan period by a begin scan signal.

When black video occurs in matrix memory unit 24 which meets the start condition of arithmetic unit 107 but not the adjacency condition of arithmetic unit 93, the tracker sequence controller 97 issues a start signal to the inactive tracker of highest priority. The second tracker begins to track the video data from a current black center cell of the memory data window on cable 60. The first tracker continues to track, but the tracker does not store the current memory data window since the adjacency condition is not met.

With 50 consecutive data bits or a full scan of data fails to meet the adjacency condition of a given tracker, the tracker either enters an inactive state or a complete state. In the inactive state, the tracker is reset and ceases to track video data. The complete state is entered only after tracker information has satisfied the valid condition of Equation C. A tracker upon entering a complete state retains the top register, bottom register and cell counter data. The width counter, however, continues to count.

After a tracker has entered the complete state, the tracker enters the inactive state only after the ROM control unit 98 has accessed the top, bottom, tracked cell and width counters. Thereafter, the tracker remains in the inactive condition until it receives a start pulse from tracker sequence controller 97.

The current state of each tracker is indicated by the respective tracker control logic, which signals the tracker sequence controller 97. Upon system initialization, the controller 97 issues a start pulse to the highest priority tracker which is inactive when a start condition is indicated. Thereafter, controller 97 issues a start pulse to the highest priority inactive tracker when an adjacency condition is indicated by OR gate 94.

The ROM control unit 98 accesses each of the trackers by incrementing the tracker address counter 118, the output of which is decoded by decoder 111 to enable a tracker driver unit such as unit 104. When the driver unit of a tracker is enabled, the top, bottom, tracked cell, and width counter data is made available for tracker evaluation. Such evaluation comprises the detection of a valid character image in the tracker information stream.

When valid character data is detected, the unit 98 stores a valid pulse in register 99. When unit 98 increments the tracker address counter 118, the driver unit of the addressed tracker is enabled, and the register 99 is addressed to determine whether the addressed tracker satisfied the valid condition in the previous scan.

FIG. 6

Figure 6:
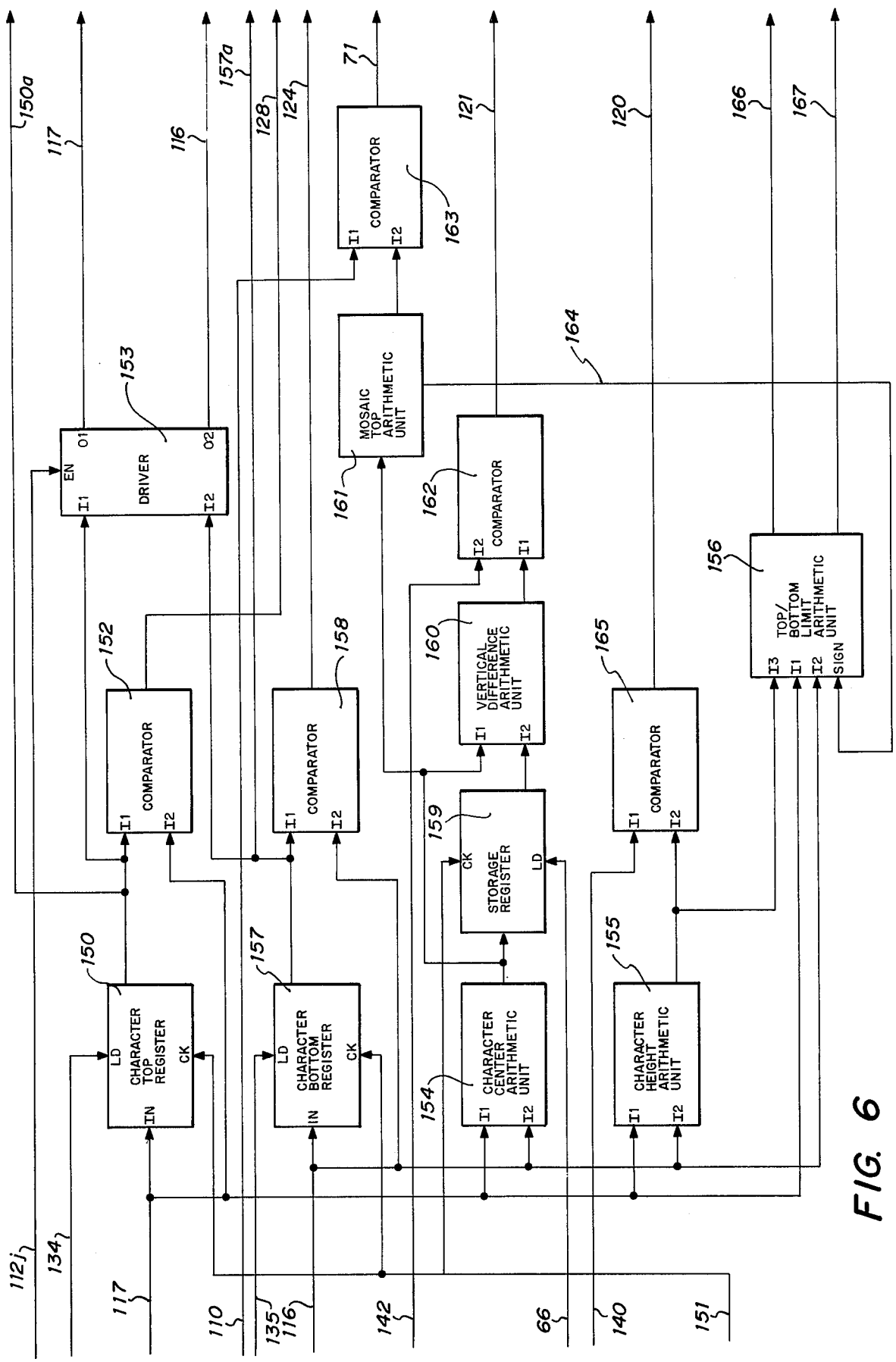
FIG. 6 is a functional block diagram of the top and bottom limit logic unit of FIG. 2.

FIG. 6 is a detailed functional block diagram of the top and bottom limit logic unit 35 of FIG. 2.

Tracker data is supplied to the input of a six-bit character top register 150 by way of control cable 117 connected to the O6 output of driver 104 of FIG. 5. The load input to register 150 is connected to control line 134 leading to the O11 output of ROM control unit 98, and the clock input to the register is connected to a control line 151 leading to the CK2 output of logic unit 91. The output of register 150 is applied to the I1 input of a comparator 152, to the I1 input of a driver 153, and to a control line 150a leading to the I16 input of ROM 98. The I2 input to comparator 152 is connected to control cable 117, to the I1 input to a character center arithmetic unit 154, to the I1 input of a character height arithmetic unit 155, and to the I1 input of a top/bottom limit arithmetic unit 156. The output of comparator 152 is applied to control line 128 leading to the I12 input of unit 98.

The I2 input to driver 153 is connected to the output of a six-bit character bottom register 157, and the enable input to the driver is connected to a control line 112j of lines 112 leading to the tracker ten signal output of the tracker address decoder 111 of FIG. 5. The O1 output of driver 153 is connected to control cable 117, and the O2 output is connected to control cable 116.

Driver 153 is a tristate driver of a type such as that manufactured and sold by Texas Instruments, Incorporated of Dallas, Texas, and identified as Model No. SN74368.

The data input to register 157 is connected to data cable 116, to the I2 input of comparator 158, to the I2 input of arithmetic unit 154, to the I2 input of arithmetic unit 155 and to the I2 input of arithmetic unit 156. The load input to register 157 is connected by way of control line 135 to the O12 output of ROM control unit 98. The output of register 157 also is connected to the I1 input of a comparator 158, and to a control line 157a leading to the I18 input of unit 98. The output of comparator 158 is applied to control line 124 leading to the I8 input of unit 98.

The output of arithmetic unit 154 is applied to the data input of a six-bit storage register 159, to the I1 input of a vertical difference arithmetic unit 160 and to the data input of a mosaic top arithmetic unit 161. The load input of register 159 is connected to control line 66 leading from the O7 output of unit 98. The output of register 159 is applied to the I2 input of arithmetic unit 160, the output of which is connected to the I1 input of a comparator 162. The I2 input to comparator 162 is connected to control line 142 leading from the O3 output of parameter memory unit 138 of FIG. 5. The output of comparator 162 is connected to control line 121 leading to the I5 input of unit 98.

Arithmetic unit 161 applies a row number to the I2 input of a comparator 163, and generates a pulse to a control line 164 leading to the sign input of arithmetic unit 156 when the mosaic top is at a row below the row indicated by the row counter 52 of FIG. 4. The I1 input to comparator 163 is connected to control line 110 leading to the output of row counter 52, and the output of the comparator is connected to control line 71 leading to the I3 input of unit 98.

The output of arithmetic unit 155 is applied to the I2 input of a comparator 165 and to the I3 input of arithmetic unit 156. The I1 input to comparator 165 is connected to control line 140 leading to the O1 output of parameter memory unit 138 of FIG. 5. The output of comparator 165 is applied to control line 120 leading to the I4 input of ROM control unit 98. The O1 output of arithmetic unit 156 is applied to a control cable 166, while the O2 output of the arithmetic unit is applied to a control cable 167.

In operation, the information stored in tracker top register 101 and tracker bottom register 100 of FIG. 5 are loaded into character top register 150 and character bottom register 157, respectively, upon receipt of load commands from the unit 98. The outputs of registers 150 and 157 are rerouted to lines 117 and 116, respectively, when driver 153 is enabled by the tracker ten signal output of tracker address decoder 111. Comparator 152 compares the output of register 150 with the information on line 117, and issues a logic one pulse to unit 98 when the row count in top register 150 is greater than the row count on cable 117. In like manner, comparator 158 compares the output of register 157 with the information on cable 116. If the row count in register 157 is less than the row count on cable 116, comparator 158 issues a logic one pulse to unit 98.

The tracker top and bottom register counts also are applied by way of cables 117 and 116, respectively, to character center arithmetic unit 154 and character height arithmetic unit 155. The arithmetic unit 154 determines the vertical center of a character by dividing the sum of the top and bottom register row counts by 2. Upon the occurrence of a character presence signal on line 66 from ROM control unit 98, a vertical coordinate is stored in storage register 159. The vertical difference arithmetic unit 160 receives the vertical coordinate stored in register 159 and the output of arithmetic unit 154, and provides the difference therebetween to comparator 162. Comparator 162 compares the difference with a parameter supplied by parameter memory unit 138 on line 142. If the difference is less than the parameter value, the comparator 162 issues a logic one pulse to unit 98 by way of line 121.

The data center difference calculated by arithmetic unit 154 also is supplied to mosaic top arithmetic unit 161, which identifies the top row of a 32 × 24 bit memory mosaic in SAM 30. More particularly, arithmetic unit 161 subtracts a decimal 15 from the output of arithmetic unit 154. If the result is positive, it is supplied to comparator 163. If the result is negative, however, a logic zero is supplied to comparator 163, and a pulse is issued to line 164 to indicate that a negative result has occurred. Comparator 163 compares the row number supplied by arithmetic unit 161 with the row count on line 110 leading from row counter 52 of FIG. 4. When the row count is equal to the row number supplied by arithmetic unit 161, comparator 163 issues a logic one pulse on line 71 leading to frame control logic unit 63 of FIG. 4 and to unit 98.

The character height arithmetic unit 155 calculates the height of tracker data by subtracting the tracker top register data on cable 117 from the tracker bottom register data on cable 116. Comparator 165 compares the calculated height with a height parameter supplied by parameter memory unit 138 on line 140. If the calculated height exceeds the height parameter, comparator 165 issues a logic one pulse on line 120 leading to ROM control unit 98.

The top/bottom limit arithmetic unit 156 receives a signal from arithmetic unit 161 by way of control line 164 to indicate when the indicated top row of a memory mosaic in SAM 30 has a value less than a row zero count. Each data scan in SAM 30 is scanned from row zero through row 50. Thus, a negative row indication from arithmetic unit 161 signals the occurrence of a 24 × 32 bit memory mosaic which extends above the top row of the sensor scan. Such an instance would occur when a line of information is scanned at a skew. Arithmetic unit 156 senses line 164, and evaluates the data on cables 116 and 117 and at the output of arithmetic unit 155 in a manner later to be described. The top row limit and the bottom row limit of a character occurring within a 32 × 24 bit mosaic of SAM 30 is provided therefrom at the O1 and O2 outputs, respectively, of unit 156.

Figure 7:
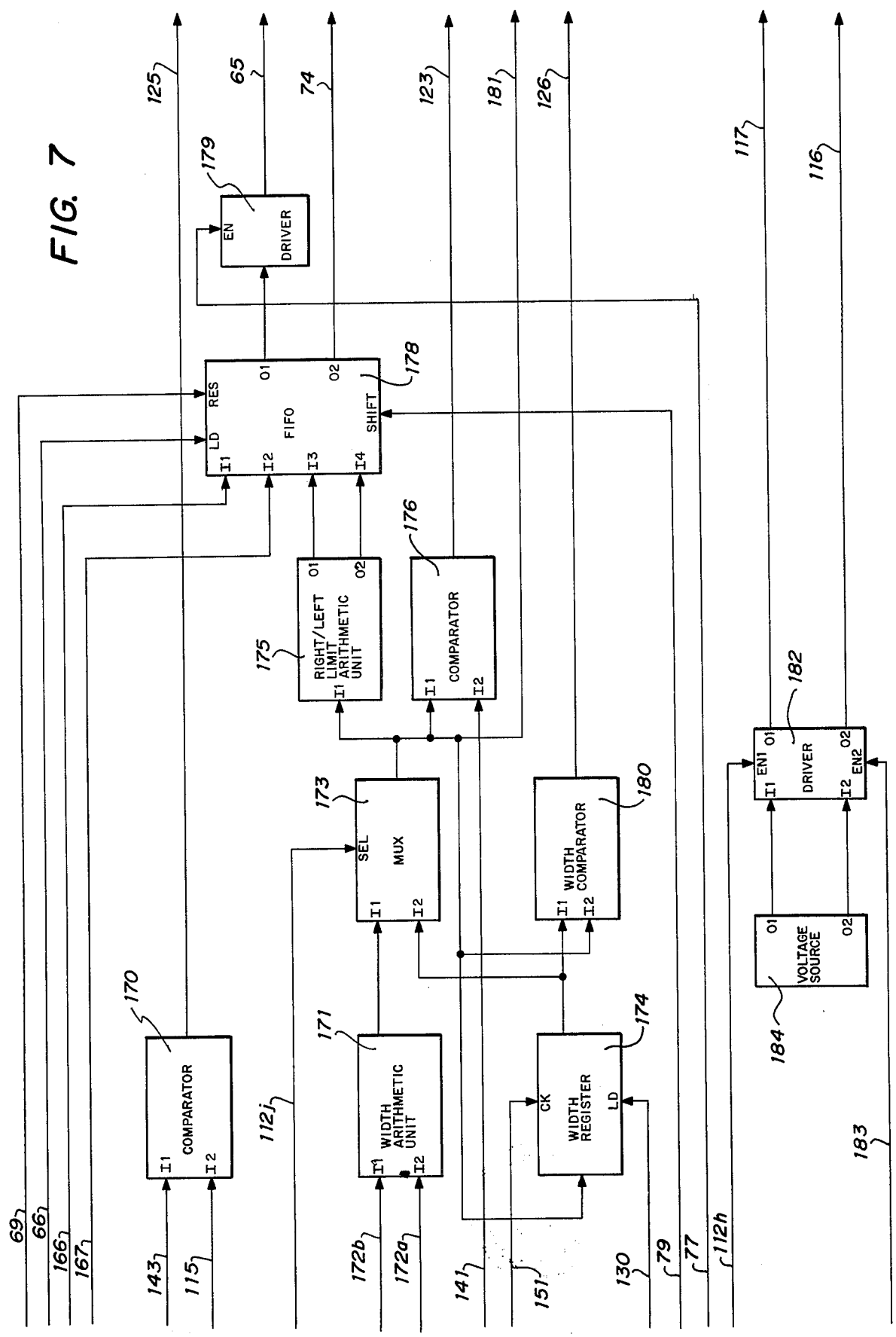
FIGS. 7 and 8 comprise a functional block diagram of the right/left limit logic unit and the width/black cell logic unit of FIG. 2.
Figure 8:
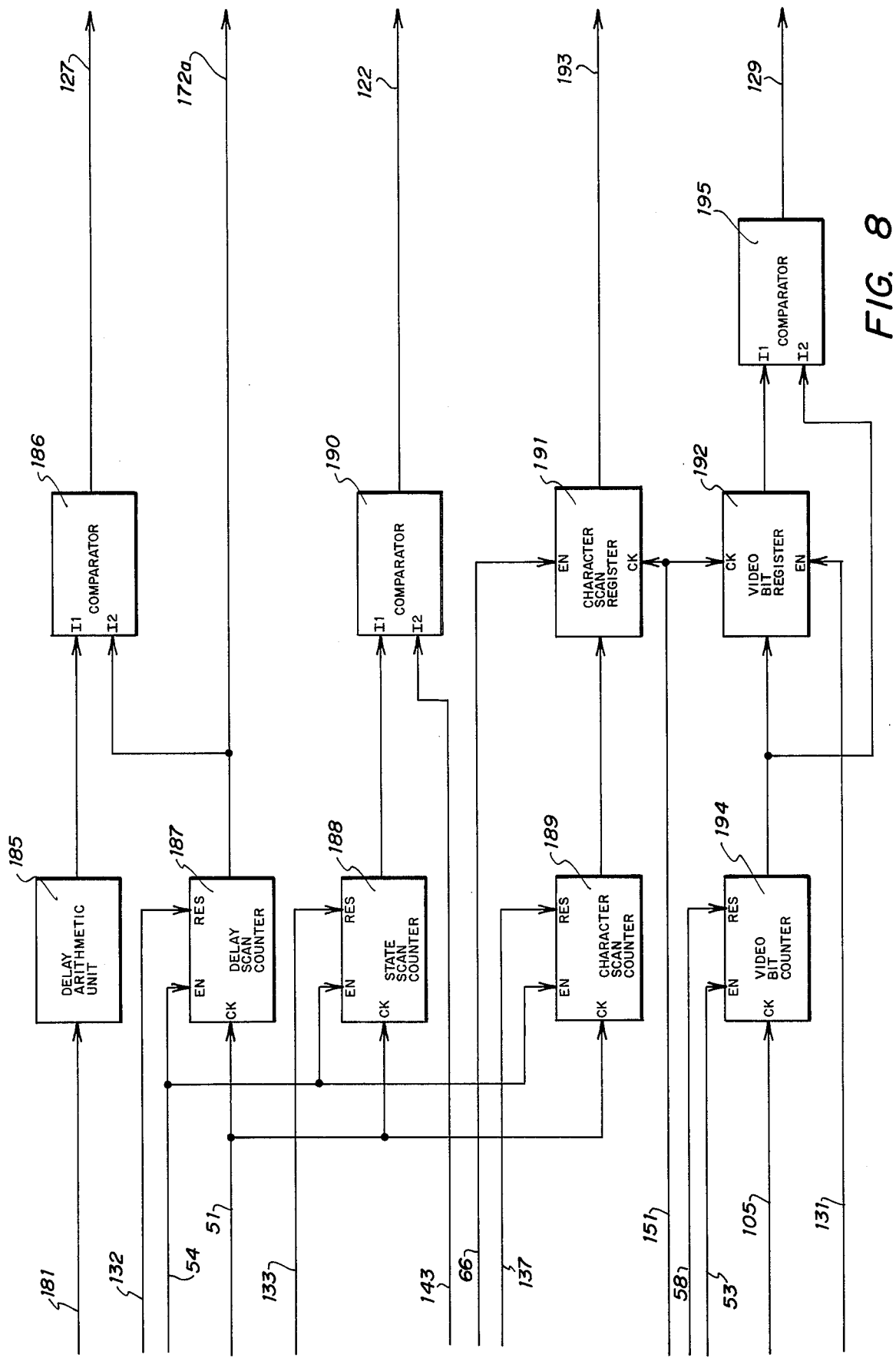

FIGS. 7 and 8

FIGS. 7 and 8 are detailed functional block diagrams of right/left limit logic unit 36 and width/black cell logic unit 37 of FIG. 2.

Referring to FIG. 7, the I2 input to a comparator 170 is connected to line 115 leading from the O3 output of driver 104 of FIG. 5, and the I1 input is connected to line 143 leading from the O4 output of parameter memory unit 138. The output of comparator 170 is applied to line 125 leading to ROM control unit 98.

The width count of counter 102 of FIG. 5 is supplied by driver 104 to a control line 172b leading to the I1 input of a width arithmetic unit 171. The I2 input of unit 171 is connected to a control line 172a, and the output of unit 171 is connected to the I1 input of a multiplexer 173. The select input to multiplexer 173 is connected to control line 112i one of the lines 112 leading to the tracker ten signal output of tracker address decoder 111 of FIG. 5, and the I2 input of the multiplexer is connected to the output of an eight-bit width register 174. The output of multiplexer 173 is connected to the I1 input of a right/left limit arithmetic unit 175, and to the I1 input of a comparator 176.

The O1 output of arithmetic unit 175 is connected to the I3 input of a 64 × 20 bit FIFO (first-in-first-out) memory unit 178, and the O2 output of unit 175 is connected to the I4 input of unit 178. The I2 input to comparator 176 is connected to line 141, and the output of the comparator is applied to line 123 leading to unit 98.

The I2 input to FIFO 178 is connected to line 167 leading from the O2 output of arithmetic unit 156, and the I1 input to FIFO 178 is connected to line 166 leading to the O1 output of arithmetic unit 156. The load input to FIFO 178 is connected to line 66 leading to the O7 output of ROM control unit 98, and the reset input to the FIFO is connected to line 69 leading to the O5 output of I/O logic unit 91 of FIG. 5. A shift input to FIFO 178 is supplied by frame control logic unit 63 of FIG. 4 by way of line 79. The 20 bit O1 output of FIFO 178 is applied to a driver 179, the enable input of which is connected by way of control line 77 to the O6 output of frame control logic unit 63. The O2 output of FIFO 178 is connected to control line 74 leading to the I5 input of frame control logic unit 63 of FIG. 4. The output of driver 179 is applied to data cable 65 leading to succeeding character recognition systems.

The output of multiplexer 173 also is applied to width register 174, a width comparator 180 and to a control line 181. The clock input to width register 174 receives a 220 nanosecond clock signal by way of line 151 leading from the CK2 output of I/O logic unit 91 of FIG. 5. The load input to width register 174 is connected by way of line 130 to the output of unit 98, and the output of the width register also is applied to the I1 input of comparator 180. The output of width comparator 180 is applied to line 126 leading to the I10 input of unit 98.

The EN1 enable input of a driver 182 is connected to the O9 output of tracker address decoder 111 by way of line 112h. The EN2 enable input of driver 182 is connected by way of a control line 183 to the O17 output of ROM 98. The I1 input to driver 182 is connected to the O1 output of a constant voltage source 184, and the I2 input to the driver is connected to the O2 output of source 184. The O1 output of driver 182 is applied to data cable 117, and the O2 output of the driver is applied to data cable 116.

In operation, comparator 170 compares the tracked cell count on line 115 with a state parameter carried by line 143. The state parameter is a measure of the minimum number of black cells which may be tracked. If less black cells than are indicated by the state parameter are tracked, the segment is avoided as ink splatter or background noise. If the number of tracked cells exceeds the state parameter threshold count, comparator 170 issues a logic one pulse to line 125 to indicate that the tracker under evaluation has a tracked cell count exceeding the threshold value.

The width arithmetic unit 171 performs a width calculation by subtracting a delay count on line 172a from a tracker width count on line 172b. If the tracker address decoder 111 supplies a tracker signal other than a tracker 10 signal, the output of arithmetic unit 171 is applied to the I1 inputs of arithmetic unit 175 and comparator 176. If the tracker decoder 111 issues a tracker 10 signal, however, multiplexer 173 is selected to the output of width register 174.

The output of multiplexer 173 is compared to a width parameter supplied by parameter memory unit 138 of FIG. 5. If the multiplexer output exceeds the width parameter, comparator 176 issues a logic one pulse to line 123 leading to ROM control unit 98. The logic one pulse indicates that the video data being tracked is wide enough to be a character.

During the period that multiplexer 173 is selected to arithmetic unit 171, the width stored in register 174 may be compared with a subsequent data width provided by arithmetic unit 171. If the subsequent width is greater than the output of register 174, comparator 180 issues a logic one pulse to line 126 leading to unit 98. Unit 98 in response thereto issues a load pulse to width register 174 to update the data width indication.

The arithmetic unit 175 determines the right and left columnar limit of a character image in a manner to be described from an evaluation of the width information supplied by multiplexer 173, and applies the limit information to the I3 and I4 inputs of FIFO 178. Top and bottom row information is supplied by arithmetic unit 156 of FIG. 6 to FIFO 178 by way of data cables 166 and 167, respectively. Upon the occurrence of a character presence signal on line 66 leading from unit 98, the top, bottom, right and left limit information is loaded into FIFO 178. After a delay during which the information stored in the FIFO becomes stabilized, the FIFO issues an output ready signal on line 74 leading to frame control logic unit 63 of FIG. 4. The frame controller thereupon senses recognition request line 70 to determine whether a transfer of data is requested by succeeding character recognition systems. If a recognition request is detected, the logic unit 63 issues a shift signal to line 79 and an enable signal to driver 179 to supply the FIFO information to data cable 65.

Voltage source 184 supplies driver 182 with constant value inputs which indicate a maximum bottom row and a minimum top row, respectively. When the tracker address decoder 111 supplies a tracker 9 signal to line 112h of lines 112, driver 182 is enabled upon command of ROM control unit 98 to supply a top row limit to line 117 and a bottom row limit to line 116.

Referring to FIG. 8, a delay arithmetic unit 185 has an input connected by way of line 181 to the output of multiplexer 173. The output of arithmetic unit 185 is applied to the I1 input of a comparator 186, the I2 input of which is connected to the output of an eight-bit delay scan counter 187. The output of comparator 186 is applied to line 127 leading to unit 98.

The enable input to counter 187 is connected to line 54 leading from the O3 output of control unit 50 of FIG. 4. The reset input to counter 187 is connected by way of line 132 to the O9 output of unit 98, and the clock input to the counter is connected by way of line 51 to the 18 MHz CK1 output of I/O logic unit 91. The output of counter 187 is applied to line 172a leading to an input of arithmetic unit 171.

Line 51 also is connected to the clock inputs of an eight-bit state scan counter 188 and a 12 bit character scan counter 189. The enable input of counter 188 is connected to the enable input of counter 189, and the reset input of counter 188 is connected by way of line 133 to the O10 output of unit 98. The output of counter 188 is applied to the I1 input of a comparator 190, the I2 input of which is connected by way of line 143 to the O4 output of parameter memory unit 138 of FIG. 5. The output of comparator 190 is applied to line 122 leading to unit 98.

The reset input to counter 189 is connected by way of line 137 to the O3 output of logic unit 91 of FIG. 5. The output of counter 189 is applied to a 12-bit character scan register 191, the clock input of which is connected to the clock input of a four-bit video bit register 192 and to line 151. The enable input to register 191 is connected by way of line 66 to the O7 output of ROM control unit 98. The output of register 191 is applied to line 193 leading to succeeding recognition systems.

The input of video bit register 192 is connected to the output of a four-bit video bit counter 194. The output of register 192 is connected to the I1 input of comparator 195, the output of which is applied to line 129 leading to unit 98. The enable input to register 192 is connected to the O8 output of unit 98 by way of line 131. The I2 input of comparator 195 is connected to the output of counter 194.

The clock input to video bit counter 194 is connected by way of line 105 to the O10 output of tracker control logic 92 of FIG. 5. The enable input to counter 194 is connected to line 53 leading to the data clock output of video memory control logic unit 50 of FIG. 4. The reset input to counter 194 is connected to line 58 leading to the output of row count decoder 57 of FIG. 4.

In operation, arithmetic unit 185 receives a width value from multiplexer 173, and provides a delay value to comparator 186. When the output of scan counter 187 is equal to the delay value, comparator 186 issues a logic one pulse to unit 98 by way of line 127 to indicate that the character image in SAM 30 has been centered horizontally. Upon receiving the pulse, unit 98 issues a character presence signal to load FIFO 178 with boundary limit information, and enables scan register 191 to clock in the output of scan counter 189.

Delay scan counter 187 is enabled to count at the clock rate upon the initialization of a video sensor scan. The scan counter continues to count until reset by unit 98 upon the occurrence of a character presence. The state scan counter 188 also is enabled at the begin scan rate and counts at the clock rate until reset by unit 98. The state scan counter counts the number of begin scans which occur after a character presence is indicated. When an equivalence occurs between the scan counter output and a state parameter supplied by parameter memory unit 138 on line 143, comparator 190 issues a logic one pulse to line 193 to indicate when a next data evaluation process may be initialized.

Character scan counter 189 and character scan register 191 are used by the succeeding recognition systems to horizontally locate a character on a document surface. Scan counter 189 is enabled upon the occurrence of a begin scan pulse, and reset upon detection of the leading edge of a first character. The scan count then indicates the location of a character from the leading edge of a document.

Video bit counter 194 is enabled by the data clock signal on line 53, and reset thereafter when the output of row count decoder 57 indicates that the last data cell in a video scan has been sensed. When an adjacent black data cell is detected and stored by a tracker, the counter 194 is incremented. At the completion of a scan of 50 data bits, counter 194 provides the total number of black cells within the scan. The video bit register 192 is loaded with the output of counter 194 upon being enabled by ROM 98. When the count of counter 194 is less than the output of register 192, comparator 195 issues a logic one pulse to line 129.

SUMMARY OF OPERATION

A more comprehensive functional description of the operation of the preferred embodiment of the invention as described herein may be provided from a review of the interrelationships between the systems illustrated in FIGS. 4–8. More particularly, a reset signal supplied by logic unit 91 to line 69 resets the counters 67 and 68, and frame control logic unit 63 of FIG. 4, and the addressing logic of ROM control unit 98. Unit 98 thereupon resets the address counter 118, and the tracker control logic unit 92 of FIG. 5. Unit 98 further resets counters 187 and 188. The tracker control logic unit 92 in turn resets counters 102 and 103 of FIG. 5.

The logic unit 91 also resets FIFO 178 of FIG. 7, and controls the loading of evaluation parameters into memory unit 138.

The evaluation of video data to detect a character image, and the centering of the character image within RAM 33 is initiated upon the occurrence of a begin scan signal on line 23 which enables memory control logic unit 50 of FIG. 4. The logic unit 50 synchronizes the begin scan, the data clock and video bit stream received from signal conditioner 11 of FIG. 1, thereby synchronizing simultaneously occurring operations. Such operations include the control of data flow to SAM 30, the tracking of character information within the data stream, detecting and locating a character image from an evaluation of tracker data, and the transfer of a character image to succeeding recognition systems.

A preferred sensor array for scanning a document is comprised of 50 vertically aligned sensor cells. As the data is transferred from logic unit 50, the row counter 52 supplies a bit count to decoder 57 which indicates the transfer of the last video data cell from a single scan of the sensor array. Under the control of logic unit 50, the video data is stored in memory matrix unit 24 at addresses indicated by the memory address counter 56. The data then is transferred serially from memory matrix unit 24 through delay logic 25 and into SAM 30. The delay logic provides a delay of a size to accommodate both tracker and character data evaluation. During the evaluation periods, those trackers tracing valid character data are identified, and the character data being traced by such trackers is centered within SAM 30 for transfer to RAM 33.

More particularly, as an active tracker traces adjacent data bits occurring in a video data stream, the top row of the data image, the bottom row of the image, the number of data bits forming the image, and an indication of the width of the image are provided by the tracker. When the tracker address decoder selects a tracker to be evaluated, the tracker top row, bottom row, tracked cell and width information are evaluated by unit 98 to determine whether the tracker has been tracing valid character information.

Upon initialization, unit 98 enters the FCM (first character mode) mode wherein tracker data is compared against height, width and tracked cell parameters to determine whether the data image exceeds size thresholds below which only noise would be indicated. Arithmetic unit 155 works in concert with comparator 165 of FIG. 6 to test for minimum height requirements, and arithmetic unit 171 works in concert with comparator 176 of FIG. 7 to test for minimum width. Further, comparator 170 tests for the occurrence of a minimum number of tracked cells. If the tracker data of the tracker under evaluation satisfies the height, width and tracked cell count criteria, unit 98 issues a valid pulse to the tracker valid storage register 99. Thereafter, the register 99 issues a valid signal to the tracker control logic of those trackers having data indicating the presence of a character. When register 99 is addressed by the tracker address counter 118, the register issues a valid pulse to the unit 98 to indicate that the addressed tracker satisfied the valid condition during the previous scan.

The unit 98 remains in the FCM mode and continues to evaluate trackers until either all trackers having a valid marker enter the complete state, or the width counter of a tracker marked valid exhibits a count greater than or equal to a first character width parameter supplied by the parameter memory unit 138. Upon exiting the FCM mode, unit 98 initiates a left boundary search.

In the preferred embodiment described herein, the left boundary search is conducted within a 10-scan period following the FCM mode. The left character boundary or edge may be indicated either by a tracker entering the complete state, or the occurrence of a video scan having a minimum number of tracked cells. More particularly, when a black video cell is detected and stored by a valid tracker, the video bit counter 194 is incremented. At the completion of the video scan, the counter provides the total number of black video cells that have occurred within the video scan. The counter is reset upon initiation of a next video scan. The output of counter 194 is loaded into video bit register 192 when a search for a left character edge is initiated by ROM control unit 98. When the bit count of counter 194 is less than the bit count stored in register 192, the comparator 195 issues a pulse to unit 98. If a tracker completion has not previously occurred during the left boundary search, a new left boundary will be indicated. Unit 98 then stores the output of counter 194 in register 192, and resets the delay scan counter 187. After unit 98 detects a valid tracker in the complete state, a pulse from comparator 195 is ignored.

After the left boundary of a character has been located, unit 98 selects the character top, bottom and width data of those trackers having valid tracker data to determine therefrom the least top register content and the largest bottom register content. The least top register content is stored in register 150 of FIG. 6, while the largest bottom register content is stored in register 157. Further, the largest data width indicated by the valid trackers is stored in width register 174 of FIG. 7.

Upon completing the data merge operation, unit 98 initiates a character evaluation operation. The information stored in top register 150, bottom register 157 and width register 174 is evaluated as before described to insure that the character data meets the minimum height and width requirements. If the character image is too small, a character space will be indicated.

If the minimum height and width requirements are met, however, the character data is subjected to tests to insure that the character image does not exceed maximum thresholds. To effect a change of parameters from memory unit 138, multiplexer 136 of FIG. 5 is selected to unit 98. The unit 98 then addresses maximum threshold parameters stored in the memory unit 138. The data stored in top register 150, bottom register 157 and width register 174 is again tested but with the new set of parameters. If the maximum conditions are exceeded by the character data, a character reject is indicated. If the character image is not too tall or too wide, however, unit 98 increments the tracker address counter 118 to provide a tracker 9 signal. In response thereto, decoder 111 enables driver 182 by way of control line 112*h*. Voltage source 184 then supplies the topmost allowable character image coordinate to control cable 117, and the lowermost allowable coordinate to control cable 116. Unit 98 thereafter senses the outputs of comparators 152 and 158 of FIG. 6 to detect a character image at the topmost and lowermost limits, respectively. If character data is detected at either limit, a character reject is indicated.

After the merged character data has been evaluated, unit 98 increments the tracker address counter 118 to provide a tracker 10 signal at the output of decoder 111. The signal is applied by way of line 112*i* to enable driver 153, and to select multiplexer 173 to the output of width register 174 of FIG. 7. The arithmetic unit 185 of FIG.

8 responds to the output of multiplexer 174 by supplying a delay value to comparator 186. The delay indicates the number of scans that have occurred between the location of the left boundary of a character and the centering of the character in SAM 30. The delay is equivalent to the scan delay provided by delay logic unit 25 plus one-half the difference between the scan width of SAM 30 and the scan width of the character image under evaluation.

Upon detecting a logic one pulse at the output of comparator 186, ROM control unit 98 issues a character presence signal to line 66. Frame control logic unit 63 is enabled thereby, and initiates a transfer of data from SAM 30 to RAM 33 beginning at the row coordinate indicated by arithmetic unit 161 of FIG. 6. Thus, arithmetic unit 185 controls the horizontal centering of the character image and arithmetic unit 161 controls the vertical centering of the image.

The occurrence of a character presence signal on line 66 further causes FIFO 178 to be loaded with character boundary limit information, the output of character scan counter 189 to be clocked into register 191, and delay scan counter 187 and state scan counter 188 to be reset. Further, the character information stored in top register 150 and bottom register 157 is supplied to the character center arithmetic unit 154. The vertical center coordinate of the character image stored in SAM 30 is determined by arithmetic unit 154, and stored in register 159. The vertical center coordinate further is supplied to arithmetic units 160 and 161.

Upon being reset by the appearance of a character presence signal on line 66, state scan counter 188 is used to count the number of succeeding begin scan signals. The unit 98 thereby is able to synchronize subsequent tracker and character evaluation operations. More particularly, comparator 190 signals the initiation of a next step in an evaluation operation when the state scan count is equal to a state parameter supplied by the parameter memory unit 138. As unit 98 proceeds to a next evaluation operation, it resets state scan counter and addresses a new state parameter in parameter memory unit 138. When the scan counter counts to the state parameter, unit 98 initiates a next operation.

Character boundary limit information is loaded into FIFO 178 upon the occurrence of a character presence signal on line 66. After a delay during which the information within the storage unit becomes stabilized, the FIFO issues an output ready signal on line 74 to the frame control logic unit 63. Upon receiving the signal, the frame control logic unit senses line 70 leading from succeeding character recognition systems to determine whether a next transfer of data is requested. If a recognition request is detected, the logic unit 63 enables driver 179 and issues a recognition clock on line 78 leading to the succeeding recognition systems. Thereafter, logic unit 63 issues a shift pulse to line 79 to shift the information stored in FIFO 178 out through driver 179 to data cable 65.

Upon a first character being transferred from SAM 30 to RAM 33, the unit 98 enters a second character mode. A first state within the second character mode is a blanking state wherein the unit 98 ignores all tracker activity for a fixed number of scans. The exact number of scans is dependent upon the delay between the memory matrix unit 24 and the SAM 30, and on the resolution of the SAM 30. The blanking state is provided to ensure that the unit 98 evaluates trackers only when they are tracking valid data. The spaces between characters thereby are substantially ignored.

In the preferred embodiment described herein, a one scan per sample resolution is employed. The character images in the video data stream are centered horizontally within SAM 30 which is 24 scans wide. Delay logic unit 25 provide a 12-scan delay between the 24 scan memory mosaics appearing in SAM 30. After unit 98 has completed the evaluation of tracker data and the marking of valid trackers in the FCM mode, a 10-scan left boundary search is initiated as before described. The tracker data thereafter is merged and evaluated, and the character image is horizontally centered within SAM 30. The blanking state is initalized immediately after the character image is centered, and is completed within two scan periods. The FCM mode, the left boundary search, the tracker data merge and character evaluation, and the blanking state all must be executed within 38 scan periods.

After the blanking state, the unit 98 enters the second character mode and proceeds through the tracker and character evaluation states as before described in the first character mode with one exception. In the second character mode, a tracker must meet not only height, width and tracked cell thresholds, but also must satisfy a center difference criteria in order to be marked valid. More particularly, the vertical center coordinate of the last character detected is stored in storage register 159. The vertical center of a current data image as provided by arithmetic unit 154 is supplied to arithmetic unit 160, which detects the difference between the center coordinate of the last detected character and the center coordinate of the current data image. The difference so detected then is compared to a difference parameter supplied by parameter memory unit 138. If the output of arithmetic unit 160 is less than the value of the difference parameter, comparator 162 issues a pulse to unit 98 to allow the tracker being evaluated to be marked valid. Thus, in the second character mode, a tracker must satisfy height, width, tracked cell and center difference criteria to be marked valid.

When a line of information having a fixed character pitch (characters per inch) is scanned, the tracker evaluation operation in the second and succeeding character modes is completed upon the occurrence of one of two events: 22 scan periods; or a tracker completion with no remaining valid trackers. If variable or proportional pitch information is scanned, the tracker evaluation operation is completed only upon the occurrence of a tracker completion with no remaining trackers marked valid.

Upon completion of the tracker evaluation operation in the second character mode, unit 98 enters into a state wherein the left edge of a character is located within ten scan periods as before described with the first character mode. Upon locating the character left edge, the unit 98 merges the valid tracker data and enters into a character evaluation state which is performed as with the first character mode except that the character center difference test also must be performed. If a valid character image is detected and centered horizontally in SAM 30, a blanking state is entered for two scan periods. After the blanking state period, the trackers are again evaluated. The second character mode is repeated continually until either a character space or a character reject occurs during a character evaluation mode. In that event, the unit 98 reenters the FCM mode instead of repeating the second character mode.

FIGURE 9

Figure 9:
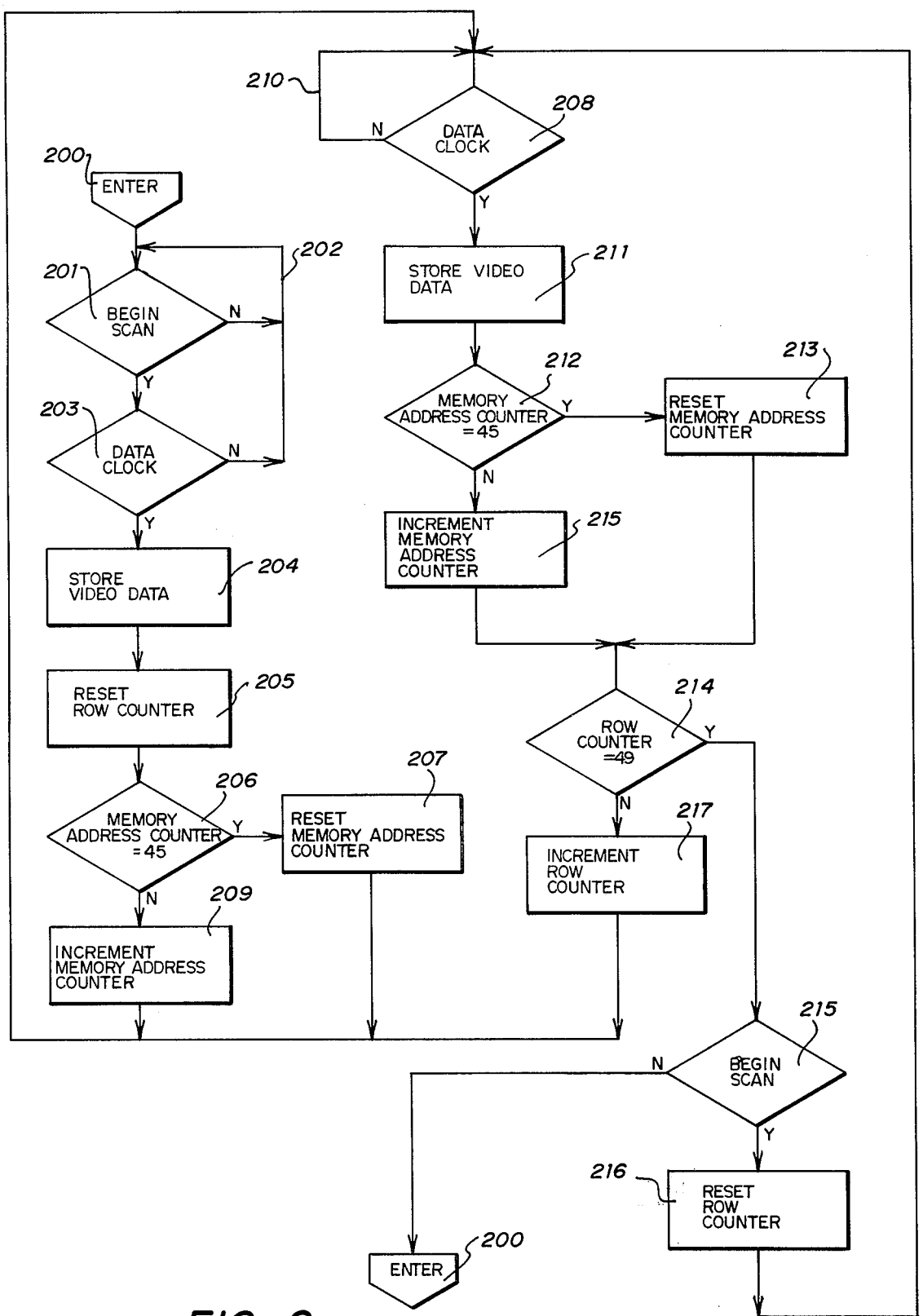
FIG. 9 is a logic flow diagram illustrating the operation of the video memory control logic unit of FIG. 4.

FIG. 9 illustrates in logic flow diagram form the operation of the video memory control logic unit 50 of FIG. 4.

Upon the occurrence of a system reset, entry is made at logic step 200 from which a transfer is made to a logic step 201. At step 201 control line 23 leading to the enable input of logic unit 50 of FIG. 4 is sensed. If a begin scan signal is not detected, the decision flow cycles about a logic path 202.

Upon detecting a begin scan signal, a transfer is made from logic step 201 to a logic step 203 where the I1 input of logic unit 50 is sensed to detect the presence of a data clock pulse. If a data clock pulse is not detected, a transfer is made to logic path 202 leading to logic step 201. If a data clock pulse is detected, however, a transfer is made from step 203 to a logic step 204 where the video data at the input of logic unit 50 is stored in the input memory matrix unit 24. From step 204, a transfer is made to a logic step 205 to reset row counter 52.

From step 205 a transfer is made to a logic step 206 where the count of memory address counter 56 is compared to the value 45. If the count is equal to 45, a transfer is made from step 206 to a logic step 207 to reset the memory address counter. From step 207 a transfer is made to a logic step 208. If the count of the memory address counter 56 is not equal to 45, a transfer is made from step 206 to a logic step 209 to increment the memory address counter. From step 209, a transfer is made to step 208.

At logic step 208, the I1 input of logic unit 50 is sensed to detect the leading edge of a data clock pulse. If no data clock pulse is detected, the decision flow cycles about a logic path 210. Upon detecting a leading edge of a data clock pulse, however, a transfer is made from step 208 to a logic step 211 where the video data at the input of logic unit 50 is stored in the input memory matrix unit 24. A transfer then is made from step 211 to a logic step 212 where the memory address counter again is sensed to detect for a 45 count. If a count of 45 is detected, a transfer is made from step 212 to a logic step 213 to reset the address counter 56. From step 213, a transfer is made to a logic step 214. If a count of 45 is not detected at step 212, however, a transfer is made from step 212 to a logic step 215 where the memory address counter 56 is incremented. A transfer then is made from step 215 to step 214.

At logic step 214, the row counter 52 is sensed to detect a count of 49. A 49 count indicates that the last data cell in a video scan has been stored in the input memory matrix 24. If a count of 49 is detected, a transfer is made from step 214 to a logic step 215 where the enable input to logic unit 50 is sensed for a begin scan signal. If a begin scan signal is detected, a transfer is made from step 215 to a logic step 216 to reset the row counter 52. A transfer then is made from step 216 to step 208 where the logic decision process continues as before described. If a begin scan signal is not detected at step 215, however, a transfer is made from step 215 to the logic step 200.

If a row count of 49 is not detected at step 214, a transfer is made to a logic step 217 where row counter 52 is incremented. A transfer then is made from step 217 to step 208 where the logic decision process continues as before described.

FIGURE 10

Figure 10:
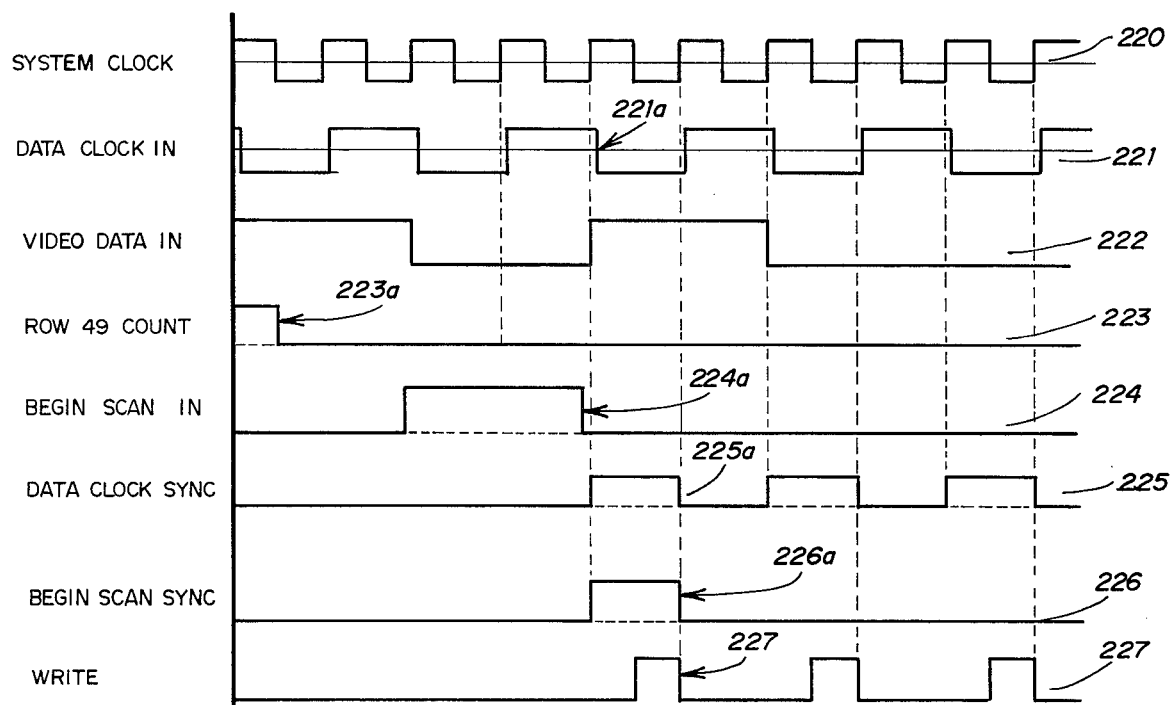
FIG. 10 is a timing diagram illustrating the operation of the video memory control logic unit of FIG. 4.

FIG. 10 is a timing diagram illustrating the operation of video memory control logic unit 50 of FIG. 4.

A discrete waveform 220 illustrates the 18 MHz clock signal supplied to the clock input of logic unit 50, and a discrete waveform 121 illustrates the 9.0 MHz data clock signal supplied to the I1 input to logic unit 50. A discrete waveform 222 illustrates the video bit data applied at the data clock rate to the data input of logic unit 50, and a discrete waveform 223 illustrates the output of row count decoder 57 upon sensing a row count of 49. Thus, upon the occurrence of the leading edge of pulse 223a of waveform 223, the last data bit of a 50-bit video scan has been addressed by logic unit 50.

A discrete waveform 224 illustrates a begin scan signal applied to the enable input of logic unit 50. A 110 nanosecond begin scan pulse occurs once each video scan, or every 5.50 microseconds.

A discrete waveform 225 illustrates the synchronized data clock signal provided at the DCK output of logic unit 50 upon the occurrence of both a begin scan pulse and a data clock pulse. More particularly, the data clock pulse 225a occurs immediately after the simultaneous occurrence of begin scan pulse 224a and data clock pulse 221a.

A discrete waveform 226 illustrates a synchronized begin scan signal comprised of 55 nanosecond pulses. The pulse 226 is in sync with the system clock of waveform 220, and occurs immediately after the simultaneous occurrence of begin scan pulse 224a and data clock pulse 221a.

A discrete waveform 227 illustrates the write signal provided at the O1 and O4 outputs of logic unit 50. The pulse 227a is in sync with the system clock of waveform 220, and occurs during the second half of the synchronous data clock signal 225a.

Figure 11A:
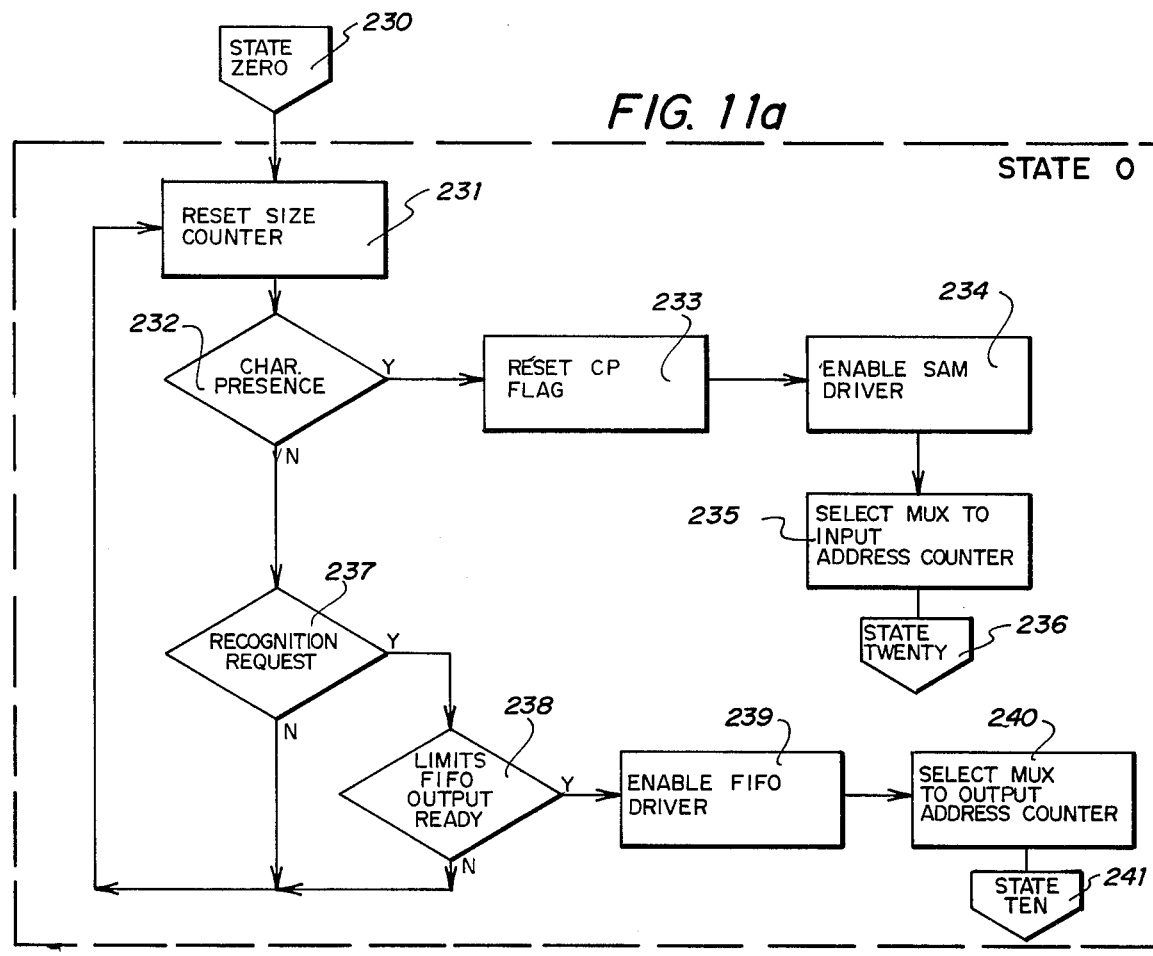
FIGS. 11a and 11b comprise a logic flow diagram illustrating the operation of the frame control logic unit of FIG. 4.
Figure 11B:
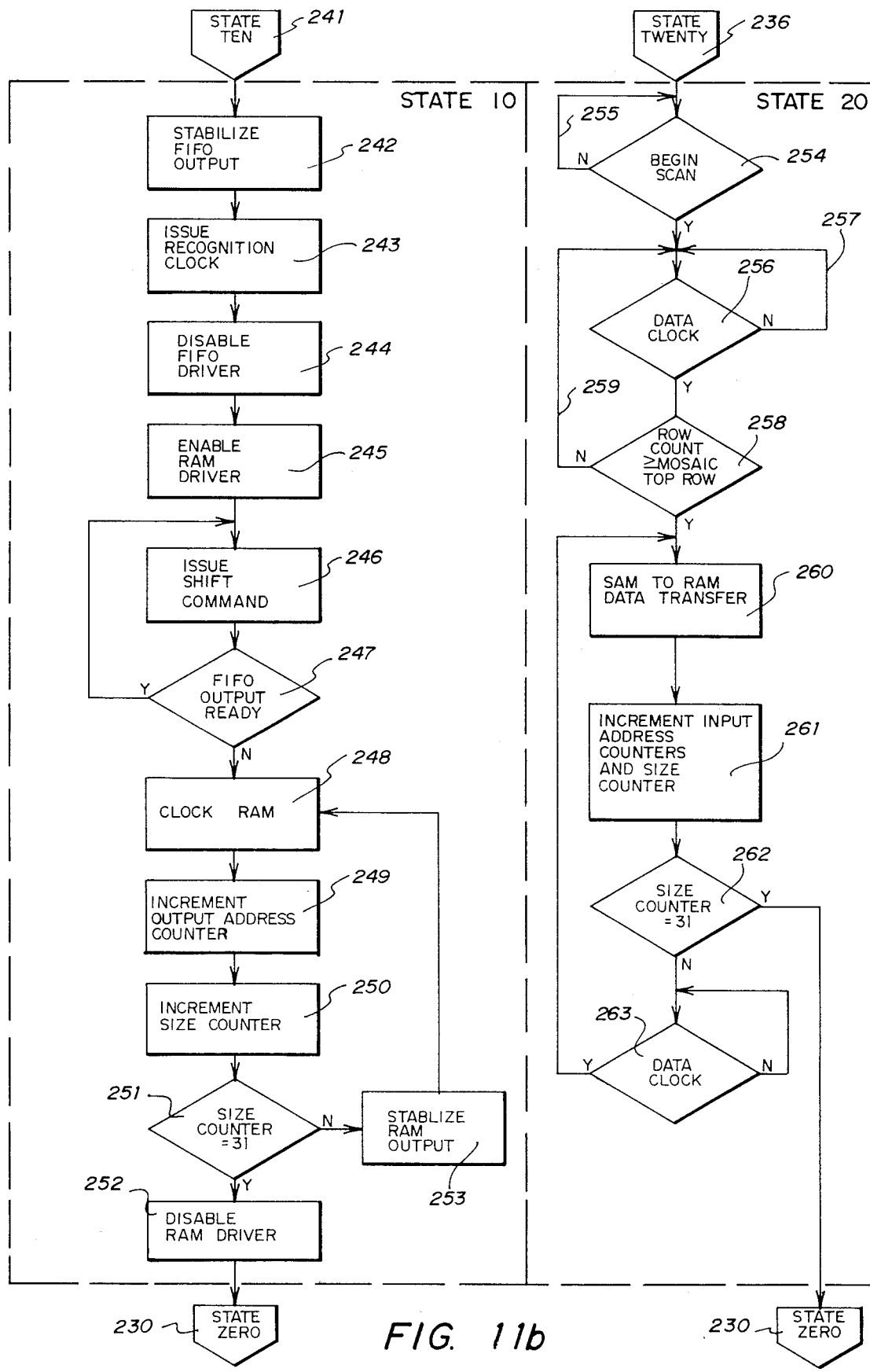

FIGS. 11a and 11b

FIGS. 11a and 11b are a logic flow diagrams of the operation of frame control logic unit 63 of FIG. 4.

The frame control logic unit 63 operates in three logic states. Upon initialization, the logic decision flow transfers from a logic step 230 to a logic step 231 of a logic state A to reset the size counter 75. From step 231, a transfer is made to a logic step 232 where the enable input of frame control logic unit 63 is sensed to detect a character presence signal. If a character presence is detected, a transfer is made from step 232 to a logic step 233 to reset an internal character presence flag. From step 233 a transfer is made to a logic step 234 where driver 61 is enabled to apply the output of SAM 30 to data cable 65. From step 234, a transfer is made to logic step 235 to select the multiplexer 80 to the output of input address counter 67. A transfer then is made from step 235 to a logic step 236 to enter a logic state B.

If a character presence is not detected at step 232, a transfer is made to a logic step 237. At step 237 the I1 input of logic unit 63 is sensed for a recognition request from succeeding character recognition systems. If a recognition request is detected, a transfer is made from step 237 to a logic step 238 where the I5 input to control logic unit 63 is sensed to detect the presence of an output ready signal from FIFO 178. If an output ready signal is detected, a transfer is made from step 238 to a logic step 239 to enable driver 179 of FIG. 7. From step 239 a transfer is made to a logic step 240 where multiplexer 80 of FIG. 4 is selected to the output address counter 68. A transfer then is made from step 240 to a logic step 241 to enter state B.

If no recognition request is detected at step 237 or if an output ready signal from FIFO 178 is not detected at step 238, logic step 231 is reentered and the logic decision flow continues as before described.

When state B is entered at step 241, a transfer is made to a logic step 242. The logic decision flow is delayed at step 242 for a period of time necessary to allow the data in FIFO 178 to stabilize. In the preferred embodiment described herein, a delay of 55 nanoseconds is required.

From step 242, a transfer is made to a logic step 243 where a recognition clock signal is issued to line 78 leading to the succeeding character recognition systems. The recognition systems thereby are notified that the output of FIFO 1 has been applied to data cable 65.

From step 243 a transfer is made to a logic step 244 to disable driver 179. A transfer then is made from step 244 to a logic step 245 where driver 64 of FIG. 4 is enabled to apply the output of RAM 33 to data cable 65. From step 245 a transfer is made to a logic step 246 to issue a shift command to FIFO 178 by way of line 79. The next available limit data then is applied to the outputs of the FIFO.

From step 246, a transfer is made to a logic step 247 where the I5 input again is sensed for an output ready signal from the FIFO 178. If a ready signal is detected, a transfer is made from step 247 to step 246. At step 246, the data in the FIFO 178 is again shifted for output to data cable 65. The logic decision flow continues to cycle through steps 246 and 247 as long as an output ready signal is detected at the I5 input of logic unit 63. If an output ready signal is not detected, however, a transfer is made from step 247 to a logic step 248 where a first 24-bit word of character information is supplied by RAM 33 to data cable 65. From step 248, a transfer is made to a logic step 249 to increment the output address counter 68, and thence to a logic step 250 where the size counter 75 is incremented. From step 250, a transfer is made to a logic step 251 where the I3 input to frame control logic unit 63 is sensed for a size count equal to 31. If a size count of 31 is detected, a transfer is made from step 251 to a logic step 252 to disable driver 64. A transfer then is made from step 252 to logic step 230 where state A is reentered.

If a size count of 31 is not detected at step 251, however, a transfer is made to a logic step 253 where the logic decision flow is delayed for a period of time to stabilize the RAM 33 output on data cable 65. In the preferred embodiment described herein, a delay of 55 nanoseconds is required. From step 253, a transfer is made to step 248 where the logic decision flow proceeds as before described.

When state C is entered at step 236, a transfer is made to a logic step 254 where the I6 input to frame control logic unit 63 is sensed to detect a begin scan signal. If a begin scan signal is not detected, the logic decision flow cycles about a logic path 255 until a begin scan signal occurs. Upon detecting a signal, a transfer is made from step 254 to a logic step 256. At step 256, the clock input to logic unit 63 is sensed for a data clock pulse. If a data clock pulse is not detected, the logic decision flow cycles about a logic path 257. Upon detecting a data clock pulse, a transfer is made from step 256 to a logic step 258 where the I2 input to logic unit 63 is sensed for a logic one signal from comparator 163 of FIG. 6. The logic one signal indicates that the row count of counter 52 of FIG. 4 is greater than or equal to the mosaic top row as determined by arithmetic unit 161 of FIG. 6. If a logic one pulse is not detected, the logic decision flow returns to step 256 by way of a logic path 259. If a logic one level is detected, however, a transfer is made from step 258 to a logic step 260 where a row of character information in SAM 30 is stored into RAM 33.

From step 260, a transfer is made to a logic step 261 to increment the input address counter 67 and the size counter 75. A transfer then is made from step 261 to a logic step 262 where the I3 input of logic unit 63 is sensed to detect a size count of 31. If a size count of 31 is detected, a transfer is made from step 262 to logic step 230 where state A is reentered. If a count other than 31 is sensed, however, a transfer is made from step 262 to a logic step 263 to sense the clock input to logic unit 63. If a data clock pulse is not detected, the logic decision flow cycles about a logic path 264. Upon the occurrence of a data clock pulse, a transfer is made from step 263 to step 260 where the logic decision flow proceeds as before described.

FIG. 12

Figure 12:
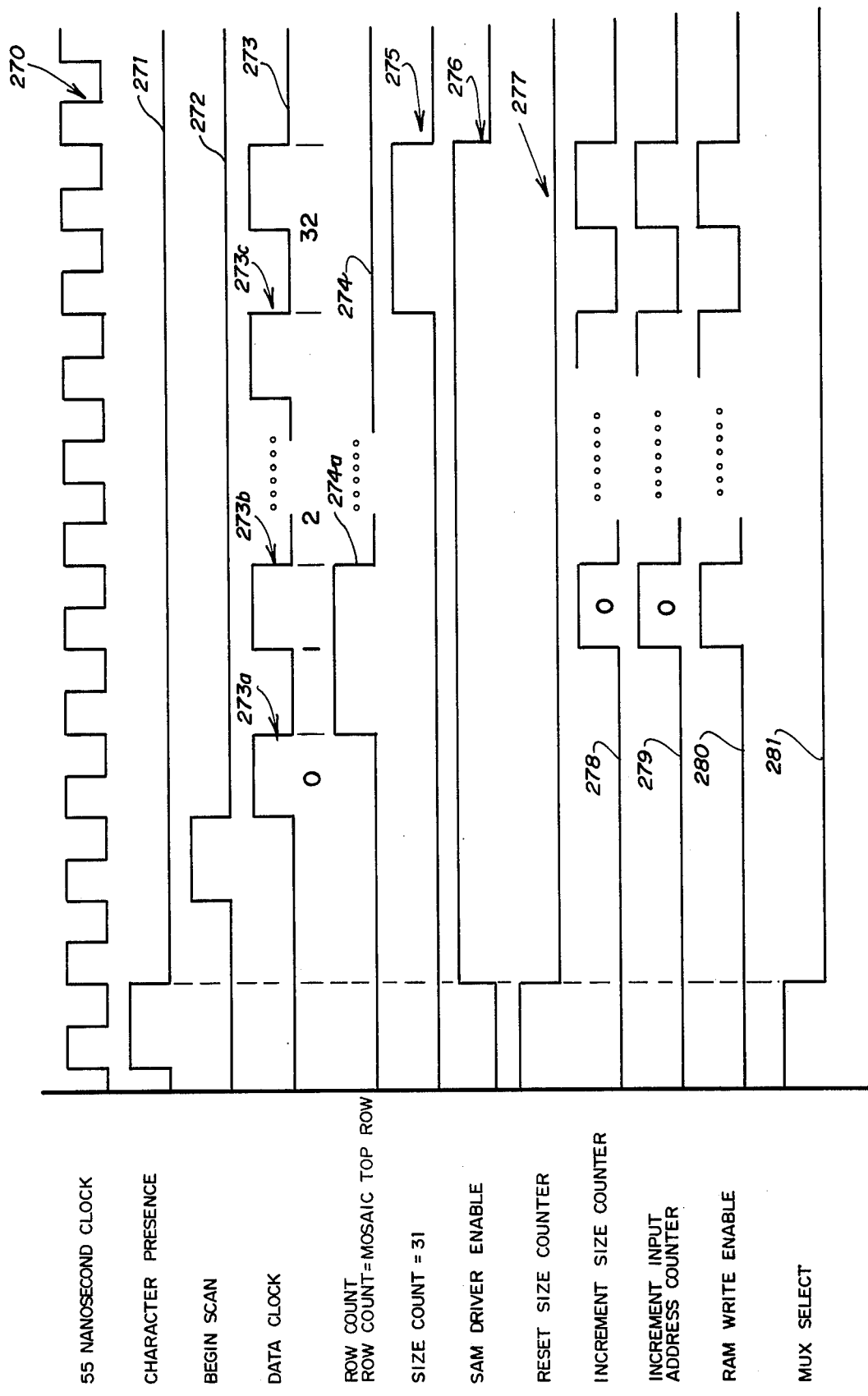
FIG. 12 is a timing diagram illustrating the operation of the frame control logic unit of FIG. 4 during a transfer of data from the SAM to the RAM.

FIG. 12 is a timing diagram illustrating the operation of the frame control logic unit 63 of FIG. 4 during a transfer of data from SAM 30 to RAM 33.

A discrete waveform 270 illustrates a 18 MHz system clock signal. A discrete waveform 271 is an illustration of the character presence signal supplied by ROM 98 of FIG. 5 to line 66. A discrete waveform 272 illustrates the begin scan signal supplied by video memory control logic unit 50 of FIG. 4 to line 54. A discrete waveform 273 illustrates the data clock signal provided by the logic unit 50 to control line 53. A discrete waveform 274 illustrates the output of comparator 163 of FIG. 6, and a discrete waveform 275 illustrates the output of size count decoder 81 of FIG. 4. A discrete waveform 276 illustrates the enable signal supplied by frame control logic unit 63 to driver 61 of FIG. 4. A discrete waveform 277 illustrates a reset signal supplied by logic unit 63 to size counter 75. A discrete waveform 278 illustrates the increment signal supplied by logic unit 63 to size counter 75, and a discrete waveform 279 illustrates the increment signal supplied by logic unit 63 to the input address counter 67. A discrete waveform 280 illustrates the write enable signal issued by logic unit 63 to the enable input of RAM 33. A discrete waveform 281 illustrates the selection command issued by logic unit 63 to the select input of multiplexer 80 of FIG. 4.

Upon the occurrence of a character presence pulse on line 66 as illustrated by waveform 271, frame control logic unit 63 is enabled. Further, driver 61 is enabled as illustrated by waveform 276, the reset input to size counter 75 is disabled as illustrated by waveform 277, and multiplexer 80 is selected to the output of input address counter 67 as illustrated by waveform 281. It is to be understood that a logic one level selects multiplexer 80 to the output address counter 68, while a logic zero level selects the multiplexer to the input address counter 67.

Upon the occurrence of a begin scan signal as illustrated by waveform 272, row counter 52 is reset. Thereafter, the row counter is incremented upon the simultaneous occurrence of a leading pulse edge of waveform 270 and a trailing pulse edge of waveform 273. More particularly, the row count is zero until the trailing edge of pulse 273a, where the row counter is incremented for a one count. Further, the row count is equal to two upon the occurrence of a trailing edge of pulse 273b, and is equal to 32 upon the occurrence of pulse 273c which occurs 31 clock periods after pulse 273b. When the row count is equal to the mosaic top row as determined by arithmetic unit 161, the output of comparator 163 of FIG. 6 transitions to a logic one level as illustrated by pulse 274a of waveform 274. A comparison of waveforms 273 and 274 shows that the top row of the memory mosaic in SAM 30 is located at row one of SAM 30.

The transfer of data from SAM 30 to RAM 33 occurs at the data clock rate as illustrated by waveforms 278–280. Each time a row of data is transferred from SAM 30 to RAM 33, size counter 75 and input address counter 67 are incremented, and a write enable pulse is issued to RAM 33 as illustrated by waveform 280.

During the write operation wherein data is transferred from SAM 30 and stored in RAM 33, the waveform 281 transitions to a logic zero to select multiplexer 80 of FIG. 4 to the input address counter 67.

FIG. 13

Figure 13:
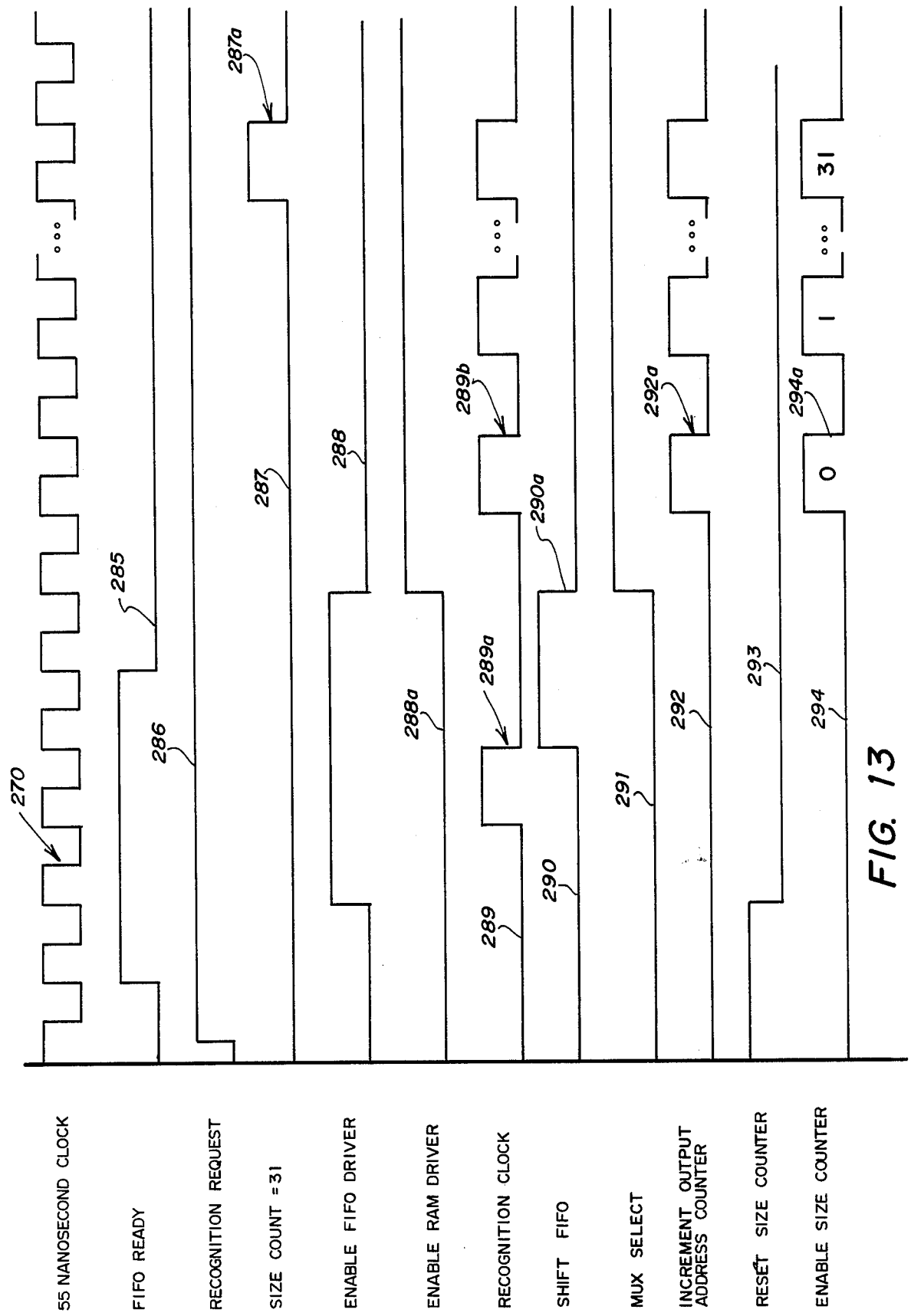
FIG. 13 is a timing diagram illustrating the operation of the frame control logic unit of FIG. 4 during a transfer of data from the RAM.

FIG. 13 is a timing diagram illustrating the operation of frame control logic unit 63 of FIG. 4 during a transfer of data from RAM 33 to data cable 65.

The waveform 270 illustrates the 18 MHz system clock signal applied to size counter 75, input address counter 67 and output address counter 68. A discrete waveform 285 illustrates the output ready signal generated by FIFO 178 upon execution of a data shift for the output of data to cable 65. A discrete waveform 286 illustrates the recognition request signal supplied by succeeding character recognition systems to the frame control logic unit 63. A discrete waveform 287 illustrates the output of decoder 81 of FIG. 4, wherein a pulse such as pulse 287a is generated when the count of size counter 75 is equal to 31.

A discrete waveform 288 illustrates the enable signal which is issued by the logic unit 63 to driver 179 of FIG. 7. A discrete waveform 288a illustrates the enable signal which is supplied by logic unit 63 to the RAM 33. A discrete waveform 289 illustrates the recognition clock generated by logic unit 63, and supplied to the succeeding character recognition systems. A discrete waveform 290 illustrates the shift command issued by logic unit 63 to FIFO 178, and a discrete waveform 291 illustrates the select command issued by logic unit 63 to multiplexer 80 of FIG. 4.

A discrete waveform 292 illustrates the signal supplied by logic unit 63 to increment the output address counter 68. A discrete waveform 293 illustrates the waveform generated by logic unit 63 to reset the size counter 75, and a discrete waveform 294 illustrates the waveform generated by logic unit 63 to enable the size counter.

Upon the occurrence of a recognition request at the I1 input of frame control logic unit 63 as illustrated by waveform 286, the I5 input to the logic unit is sensed to detect a ready signal from FIFO 178. If the ready signal as illustrated by waveform 285 is detected, the driver 179 is enabled and the size counter 75 is reset as illustrated by waveforms 288 and 293, respectively. A recognition clock pulse 289a of waveform 289 is issued 55 nanoseconds later to the succeeding character recognition system, thereby indicating that the output of the FIFO 178 appearing on data cable 65 may be stored. Upon the occurrence of the trailing edge of pulse 289a, a pulse 290a of waveform 290 is issued to command the FIFO to shift new data to cable 65. Upon the occurrence of the trailing edge of pulse 290a, waveform 291 transitions to a logic one level to select multiplexer 80 to the output address counter 68. In addition, waveform 288 transitions to a logic zero level to disable driver 179, and waveform 288a transitions to a logic one level to enable driver 64. A second recognition clock pulse 289b of waveform 289 then is issued to indicate that a first row of data from RAM 33 has been issued to data cable 65. Synchronous with the occurrence of pulse 289b, pulse 292a of waveform 292 and pulse 294a of waveform 294 are issued to increment address counter 68 and to enable size counter 75, respectively. Thereafter, a recognition clock pulse is issued each 110 nanoseconds until 32 rows of data have been transferred from RAM 33 to data cable 65.

FIG. 14

Figure 14:
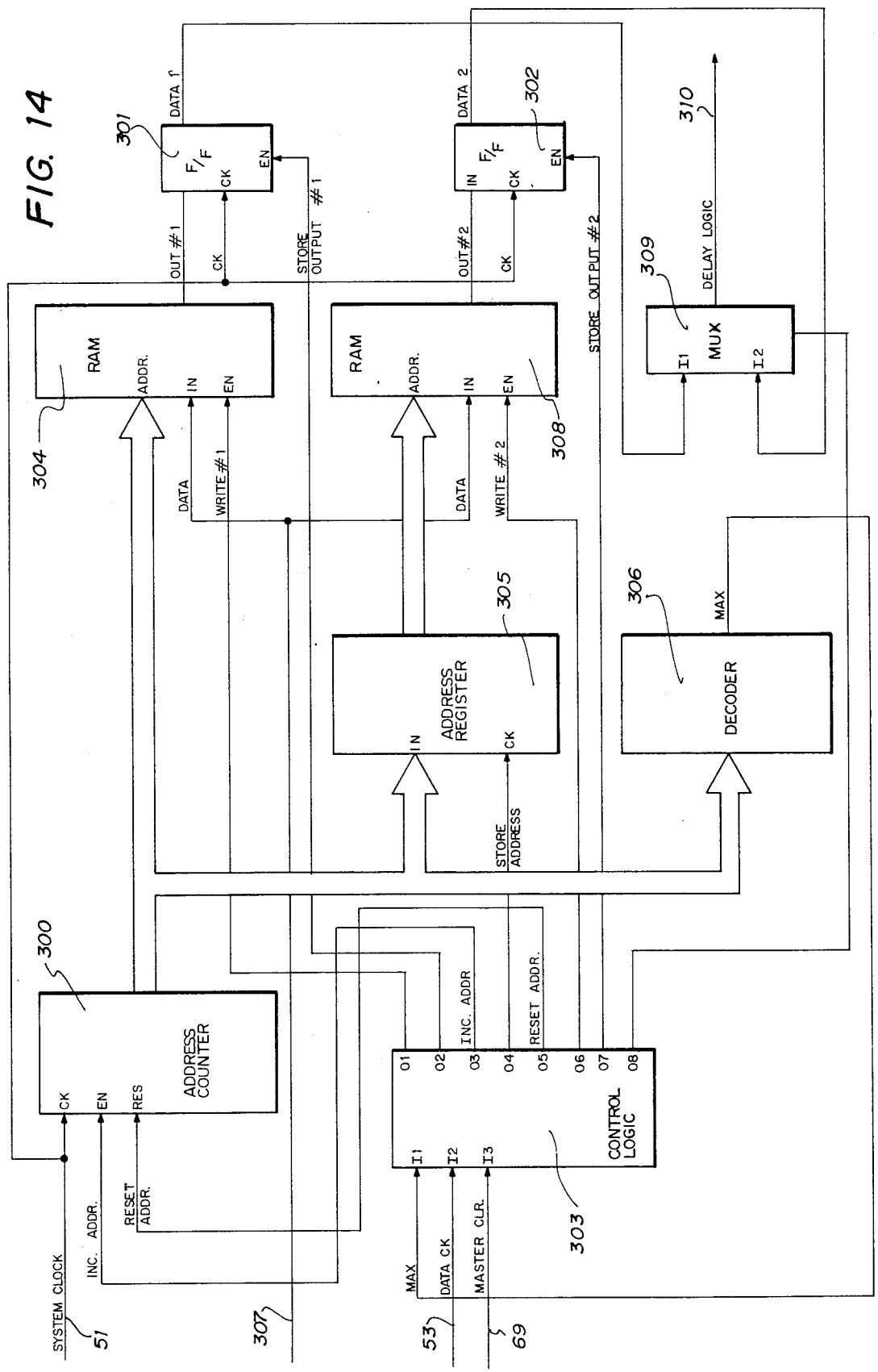
FIG. 14 is a detailed functional block diagram of the delay logic unit of FIG. 4.

FIG. 14 illustrates in a more detailed functional block diagram form the delay logic unit 25 of FIG. 4.

The 18 MHz clock on line 51 is applied to the clock inputs of a 10 bit address counter 300, a flip-flop 301 and a flip-flop 302. The enable input to counter 300 is connected to the O3 output of a control logic unit 303, and the reset input to counter 300 is connected to the O5 output of logic unit 303. The output of counter 300 is connected to the ADDR (address) input of a 1.0 × K × 1.0 bit RAM 304, to the input of a 10.0 bit address register 305 and to the input of a decoder 306.

The data input to RAM 304 is connected to the data input of a 1.0 × K × 1.0 bit RAM 308, and by way of a data line 307 to the O1 output of input memory matrix unit 24 of FIG. 4. The enable input to RAM 304 is connected to the O1 output of logic unit 303, and the output of the RAM is connected to the input of flip-flop 301.

The I1 input of logic unit 303 is connected to the output of decoder 306, and the I2 input of the logic unit is connected by way of control line 53 to the data clock output of video memory control logic unit 50 of FIG. 4. The I3 input to logic unit 303 is connected by way of control line 69 to the O5 output of logic unit 91 of FIG. 5, and the O2 output of the logic unit is connected to the enable input of flip-flop 301. The O4 output of logic unit 303 is connected to the clock input of register 305, the O6 output is connected to the enable input of RAM 308, and the O7 output is connected to the enable input of flip-flop 302. The O8 output of logic unit 303 is connected to the select input of a multiplexer 309.

The ADDR input of RAM 308 is connected to the output of register 305, and the output of RAM 308 is connected to the input of flip-flop 302. The output of flip-flops 301 and 302 are connected to the I1 and I2 inputs, respectively, of multiplexer 309. The output of multiplexer 309 in turn is applied to a data line 310 leading to the input of SAM 30 of FIG. 4.

In operation, logic unit 91 of FIG. 5 issues a reset signal on line 69 to reset control logic unit 303 during a system initialization. Upon detecting a leading edge of a 9.0 MHz data clock pulse on line 53, logic unit 303 enables RAM 304 and selects the multiplexer 309 to the output of flip-flop 301. The data stored in flip-flop 301 thereby is applied to data line 310.

Upon detecting a next leading edge of a data clock pulse, logic unit 303 issues a clock pulse to address register 305 to store the output of address counter 300, and issues enable commands to flip-flops 301 and 302 to store the outputs of RAMs 304 and 308, respectively. In addition, logic unit 303 enables counter 300 to be incremented by the system clock signal on line 51, and issues a write enable pulse to the RAM 308. Further, the mutliplexer 309 is selected to the output of flip-flop 302.

Upon detecting a next leading edge of a data clock pulse on line 53, the logic unit 303 issues a clock pulse to register 305 to store the output of address counter 300. In addition, the flip-flops 301 and 302 are enabled to store the outputs of RAMs 304 and 308, respectively. Further, logic unit 303 issues a write command to the RAM 304, and selects the multiplexer 309 to the I1 input where the system operation continues as before described.

FIG. 15

Figure 15:
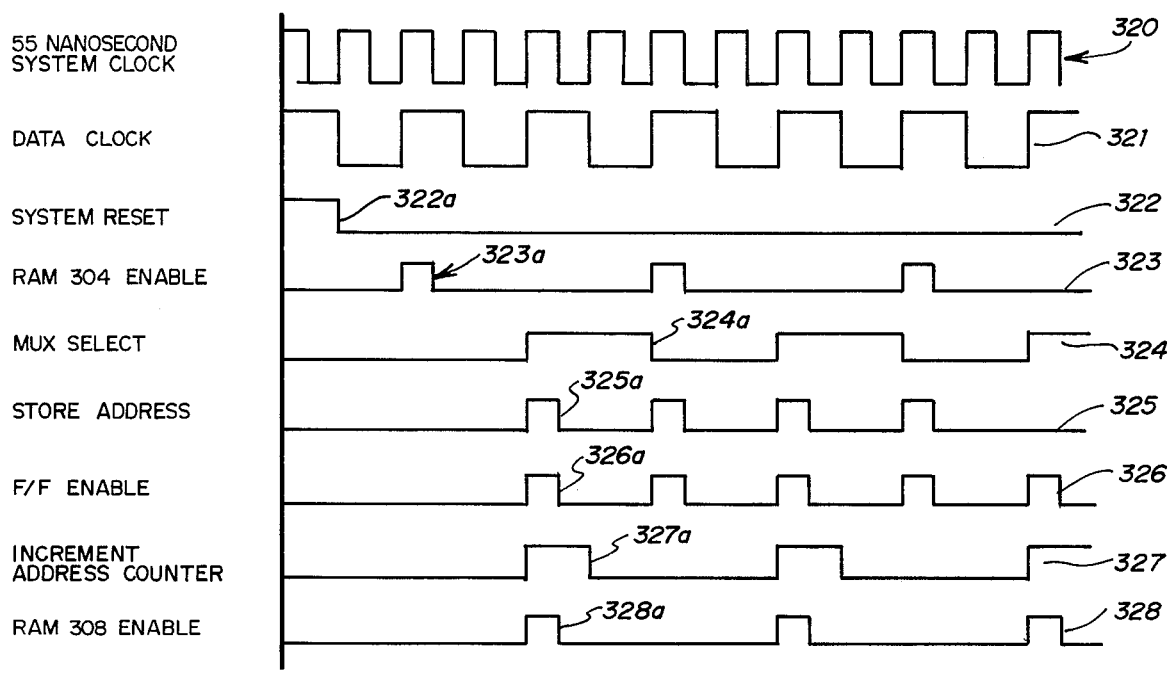
FIG. 15 is a timing diagram illustrating the operation of the control logic unit of FIG. 14.

FIG. 15 is a timing diagram of the operation of the control logic unit 303 of FIG. 14.

A discrete waveform 320 illustrates the 18 MHz system clock on line 51 leading to the clock inputs of address counter 300, and flip-flops 301 and 302. A discrete waveform 321 illustrates the 9.0 MHz data clock applied to the I2 input of control logic unit 303. A discrete waveform 322 illustrates the system reset signal, wherein a pulse 322a is issued upon system initialization.

A discrete waveform 323 illustrates the enable signal issued by control logic unit 303 to the RAM 304 to command a write operation. A discrete waveform 324 illustrates the multiplexer select signal issued by logic unit 303 to the select input of multiplexer 309, wherein the multiplexer is selected to the I1 input when waveform 324 transitions to a logic zero level and to the I2 input when waveform 324 transitions to logic one level. A discrete waveform 325 illustrates the clock signal applied by logic unit 303 to the clock input of address register 305 to store the output of counter 300. A discrete waveform 326 illustrates a flip-flop enable signal applied by logic unit 303 to flip-flops 301 and 302. A discrete waveform 327 illustrates the enable signal issued by logic unit 303 to address counter 300 to allow the counter to be incremented by the system clock on line 51. A discrete waveform 328 illustrates the enable signal issued by logic unit 303 to RAM 308 to initiate a write operation.

As may be seen from an inspection of FIG. 15, after the control logic unit 303 is reset by pulse 322a, the logic unit issues an enable pulse 323a to RAM 304. In response thereto, a data bit carried by data line 307 is stored at the RAM address indicated by the output of address counter 300. In addition, logic unit 303 selects multiplexer 309 to the output of flip-flop 301.

Upon detecting the leading edge of the next occurring data clock pulse of waveform 321, logic unit 303 issues pulse 324a of waveform 324 to select multiplexer 309 to the output of flip-flop 302, and issues a pulse 325a of waveform 325 to clock the output of address counter 300 into address register 305. The output of register 305 in turn is applied to the address input of RAM 308. In addition, logic unit 303 issues a pulse 326a of waveform 326 to enable the flip-flops 301 and 302 to store the outputs of RAMs 304 and 308, respectively. The logic unit 303 also issues a pulse 327a of waveform 327 to enable the address counter 300 to be incremented by the system clock on line 51, and issues a pulse 328a of waveform 328 to enable the RAM 308 to store a data bit on line 307 into the address indicated by the register 305. The data bits appearing on line 307 thus are alternately stored in RAMs 304 and 308.

As data is being written into a RAM, the previous output of the RAM is supplied to line 310. Further, as a current count of address counter 300 is stored in address register 305, a first data bit on data line 307 is stored in the address of RAM 304 indicated by the output of the address counter. A next occurring data bit is stored in the address of RAM 308 as indicated by the output of address register 305.

When the 10-bit address counter 300 has addressed each of 1000 addresses within RAMs 304 and 308, decoder 306 issues a pulse to the I1 input of control logic unit 303. Upon receiving the decoder pulse, logic unit 303 resets the address counter 300.

Figure 16A:
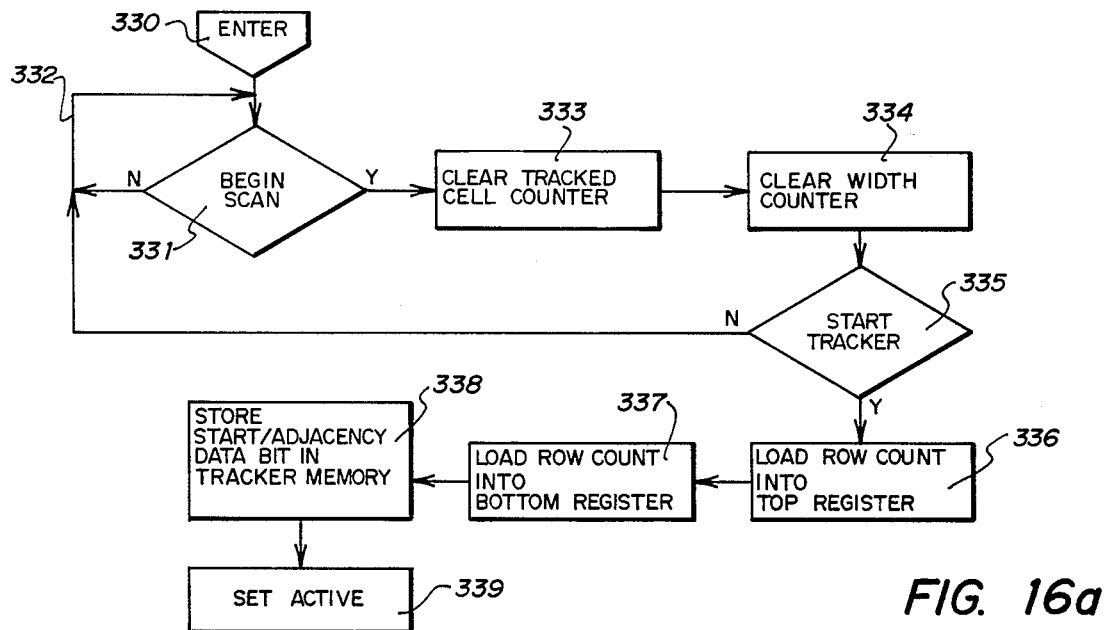
FIGS. 16a and 16b comprise a logic flow diagram illustrating the operation of the tracker control logic unit of FIG. 5.
Figure 16B:
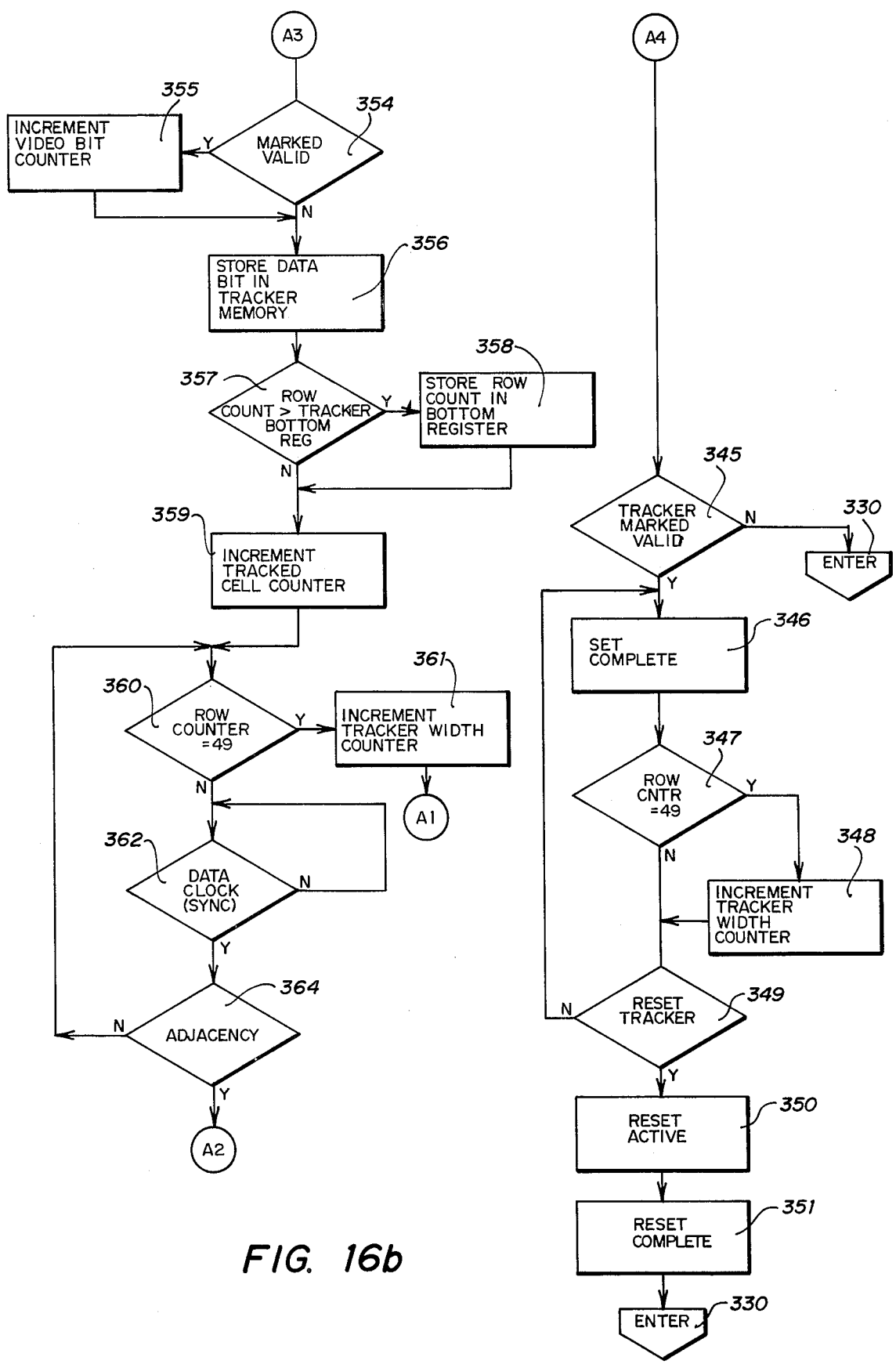

FIGS. 16a and 16b

FIGS. 16a and 16b are a logic flow diagram illustrating the operation of the tracker control logic unit 92 of FIG. 5.

Entry is made at a logic step 330 from which a transfer is made to a logic step 331. At step 331, the enable input to logic unit 92 is sensed to detect a begin scan pulse. If a pulse is not detected, the logic decision flow cycles about a logic path 332. If a pulse is detected, however, a transfer is made from logic step 331 to a logic step 333, where the tracked cell counter 103 is cleared. A transfer then is made from step 333 to a logic step 334 to clear the tracker width counter 102. From step 334, a transfer is made to a logic step 335 where the I5 input of logic unit 92 is sensed to detect a start pulse issued by tracker sequence controller 97. If no start pulse is detected, the logic decision flow reenters step 331. If a start pulse is detected, however, a transfer is made from step 335 to a logic step 336 to load the count of row counter 52 into the tracker top register 101. From step 336, a transfer is made to a logic step 337 where the row count is loaded into the tracker bottom register 100. A transfer then is made from step 337 to a logic step 338 where an initial data bit satisfying a tracker start condition is stored in tracker video memory 90. From step 338, a transfer is made to a logic step 339 where a pulse is issued to the I2 input of driver 104 to indicate that the tracker is active.

A transfer then is made from step 339 to a logic step 340 to test for the occurrence of a data clock pulse at the clock input of logic unit 92. If no data clock pulse is detected, the logic decision flow cycles about a logic path 341. If a data clock pulse is detected, however, a transfer is made from step 340 to a logic step 342 to test for the occurrence of an adjacency condition. If no adjacency condition has been indicated by arithmetic unit 93 of FIG. 5, a transfer is made from step 342 to a logic step 343 where the output of row counter 52 is sensed to determine whether an end of scan condition exists. If the row count is other than a count of 49, a transfer is made from step 343 to reenter step 340. If an end of scan condition exists, however, a transfer is made from step 343 to a logic step 344 to increment the tracker width counter 102. From step 344, a transfer is made to a logic step 345.

At logic step 345, the I7 input to logic unit 92 is sensed to determine whether the tracker has been marked as valid. If not, the logic decision flow transfers from step 345 to step 330 where the logic decision process continues as before described. If the tracker is marked valid, however, a transfer is made from step 345 to a logic step 346 where a logic one pulse is issued to the I2 input of driver 104 to indicate that the tracker has entered a complete state. From step 346, a transfer is made to a logic step 347 to sense the output of row counter 52. If a count of 49 is detected, a transfer is made from step 347 to a logic step 348 to increment the tracker width counter 102. A transfer then is made from step 348 to a logic step 349. If a count of 49 is not detected at step 347, however, a direct transfer to logic step 349 is made.

At logic step 349, the I6 input of logic unit 92 is sensed to detect a tracker reset pulse from ROM control unit 98. If the pulse is not detected, a transfer is made from step 349 to reenter step 346. If the tracker reset pulse is detected, however, a transfer is made from step 349 to a logic step 350 to reset the active signal supplied to the O7 output of logic unit 92. From step 350, transfer is made to a logic step 351 to reset the complete signal applied to the I2 input of driver 104. A transfer then is made from step 351 to logic step 330 where the logic decision process 10 continues as before described.

If an adjacency condition is detected at step 342, a transfer is made to a logic step 352 to sense the output of comparator 95. If a logic one level is detected, a transfer is made from step 352 to a logic step 353 where the row count of counter 52 is loaded into the tracker top register 101. From step 353, a transfer is made to a logic step 354. If a logic zero level is detected at the output of comparator 95, however, a transfer is made from step 352 to logic step 354 where the I7 input to the logic unit 92 is sensed for a valid indication. If a valid indication is detected, a transfer is made from step 354 to a logic step 355 to increment the video bit counter 194 of FIG. 8. From step 355, a transfer is made to a logic step 356. If a valid indication is not detected at step 354, a direct transfer is made to logic step 356 where the video bit register 192 is enabled to store the count of video bit counter 194. From step 356, a transfer is made to a logic step 357 to sense the output of comparator 96 of FIG. 5. If a logic one level is detected, a transfer is made from step 357 to a logic step 358 where the row count of counter 52 is loaded into the tracker bottom register 100. From step 358, a transfer is made to a logic step 359. Further, if the output of comparator 96 is at a logic zero level, a transfer is made from step 357 to step 359 where the tracked cell counter 103 is incremented. From step 359, a transfer is made to a logic step 360 to determine whether an end of scan condition exists. If the row count of counter 52 is equal to 49, a transfer is made from step 360 to a logic step 361 to increment the tracker width counter 102. From step 361, a transfer is made to reenter logic step 340. If a count other than 49 is detected at step 360, a transfer is made to a logic step 362 where the clock input to the logic unit 92 is sensed. If a data clock pulse is not detected, the logic decision flow cycles about a logic path 363. Upon detecting a data clock pulse, a transfer is made from step 362 to a logic step 364 to again test for an adjacency condition. If the arithmetic unit 93 indicates that an adjacency condition exists, a transfer is made from step 364 to reenter step 352. If no adjacency condition is indicated, however, a transfer is made from step 364 to the logic step 360 to again test for an end of scan condition.

Figure 17A:
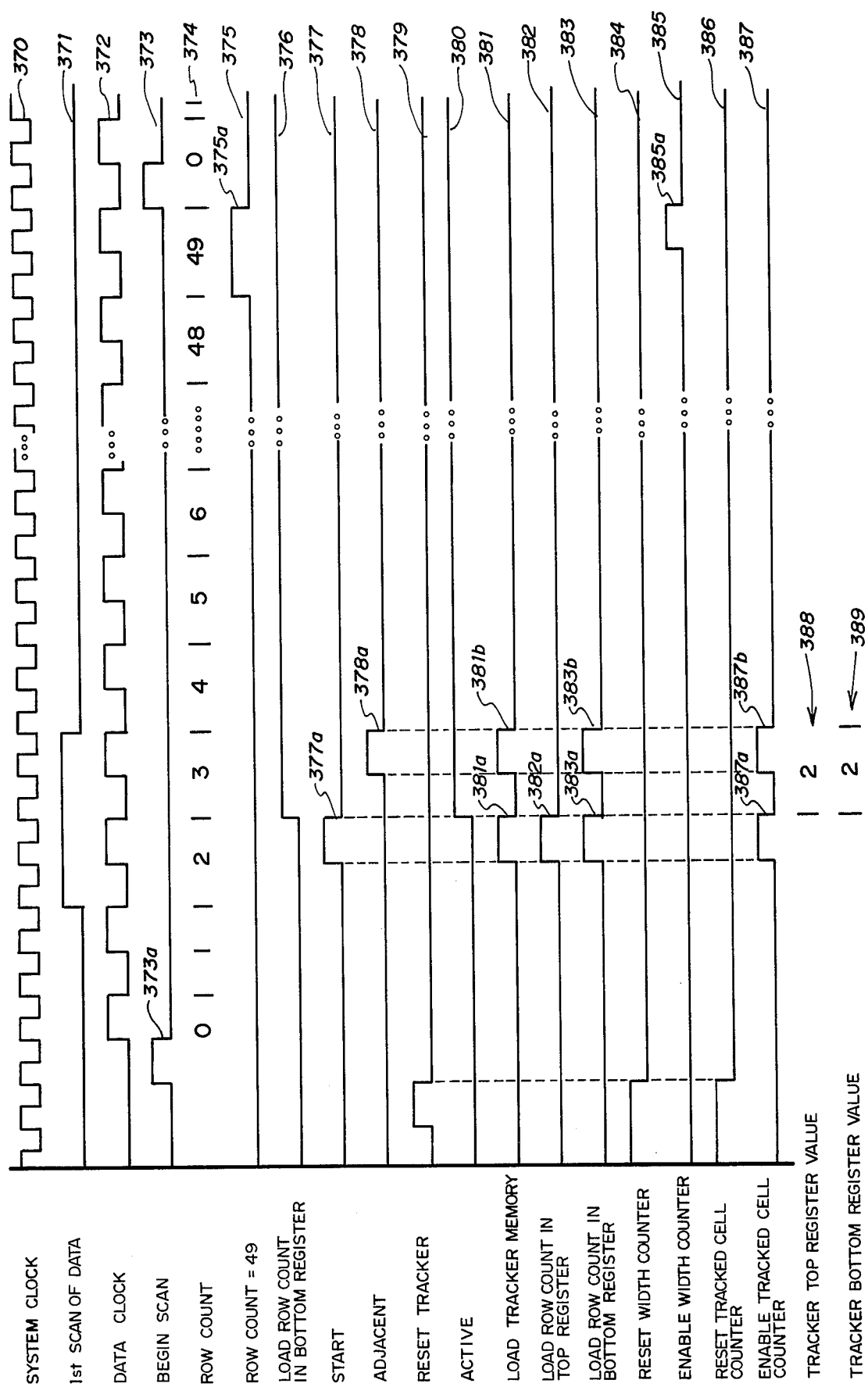
FIGS. 17a-17c are timing diagrams illustrating the operation of the tracker control logic unit of FIG. 5 through three data scans.
Figure 17B:
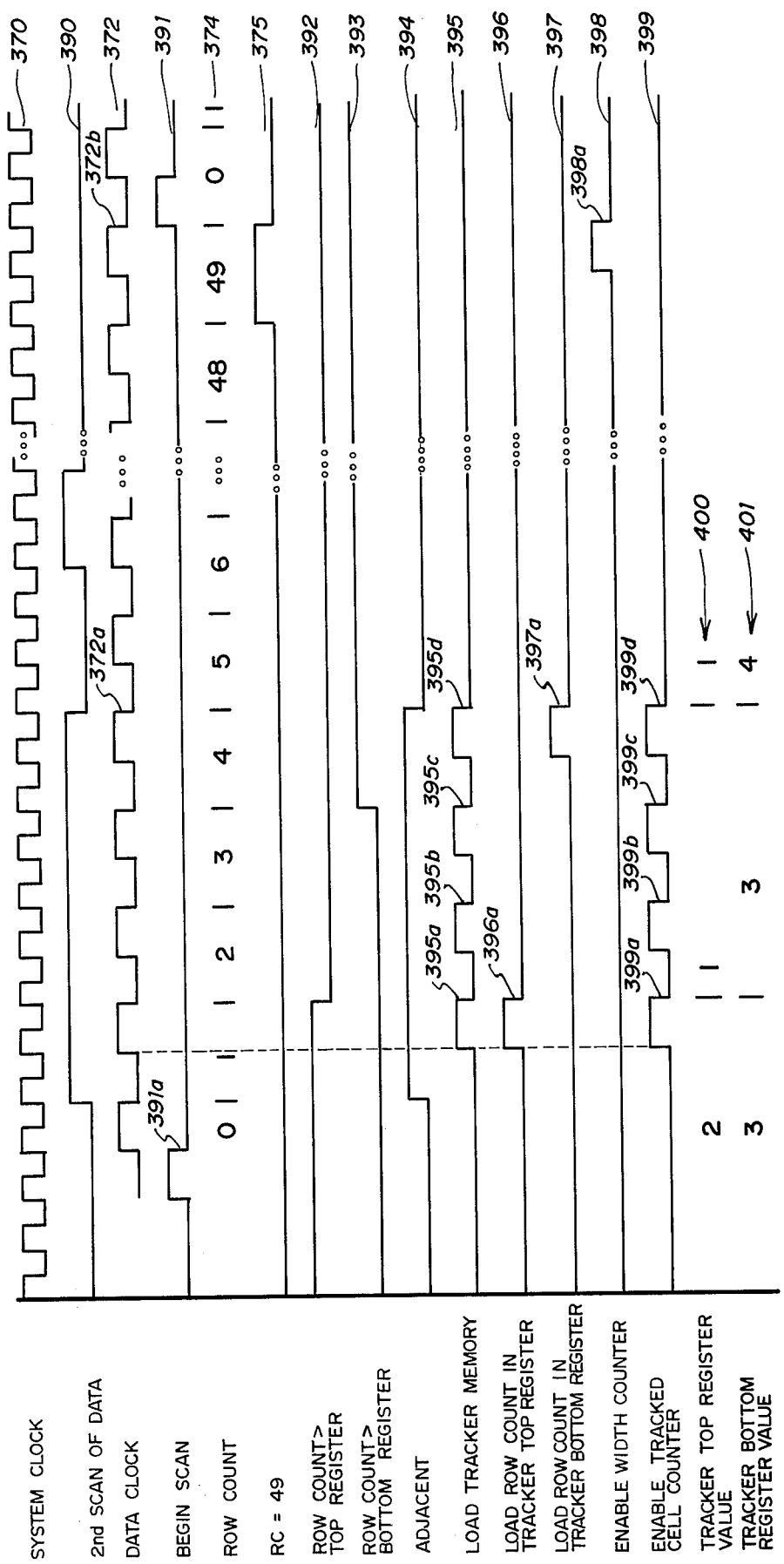
Figure 17C:
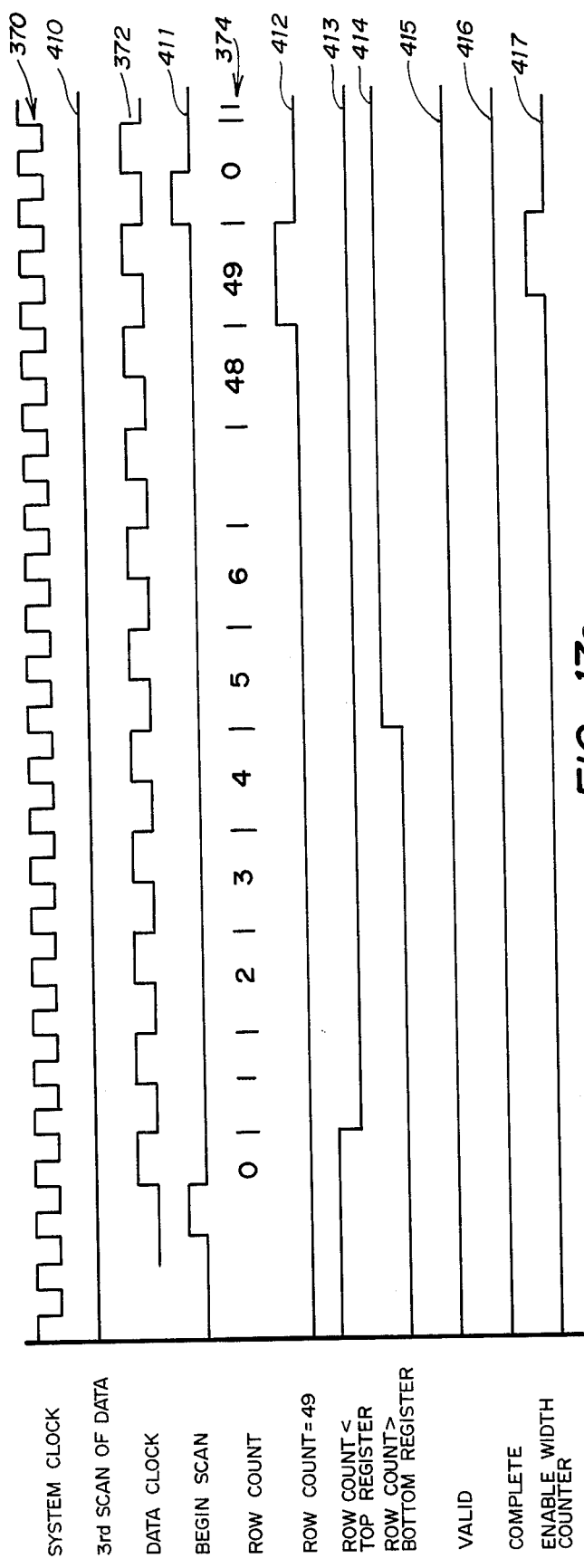

FIGS. 17a-17c

FIGS. 17a-17a are timing diagrams illustrating the operation of the tracker control logic unit 92 through three data scans.

Referring to FIG. 17a, a 18 MHz system clock signal is illustrated by a discrete waveform 370. A discrete waveform 371 illustrates the video data bit stream generated during a first scan of the sensor array. A discrete waveform 372 illustrates the 9.0 MHz data clock signal.

A discrete waveform 373 illustrates the begin scan signal comprised of 55 nanosecond pulses signaling the initialization of a video sensor scan.

A time dependent row count diagram 374 illustrates the operation of row counter 52 of FIG. 4 during a data scan. A discrete waveform 375 illustrates the output of row count decoder 57, and a discrete waveform 376 illustrates the output of comparator 96 of FIG. 5. A discrete waveform 377 illustrates the O1 output of tracker sequence controller 97 indicating a tracker 1 state, and a discrete waveform 378 illustrates the output of adjacency arithmetic unit 93. A discrete waveform 379 illustrates the reset tracker signal issued by ROM control unit 98 to the I6 input of tracker control logic unit 92.

A discrete waveform 380 illustrates the O9 output of tracker control logic unit 92 from which an active signal is provided. A discrete waveform 381 illustrates the load signal supplied by the tracker control logic unit 92 to the tracker video memory unit 90. A discrete waveform 382 illustrates the load signal supplied by the logic unit 92 to the tracker top register 101, and a discrete waveform 383 illustrates the load signal supplied by the logic unit 92 to the tracker bottom register 100. A discrete waveform 384 illustrates the reset signal supplied by the logic unit 92 to the tracker width counter 102, and a discrete waveform 385 illustrates the enable signal supplied by the logic unit to the tracker width counter. A discrete waveform 386 illustrates the reset signal supplied by the logic unit 92 to the tracked cell counter 103, and a discrete waveform 387 illustrates the enable signal supplied by the logic unit 92 to the counter 103. Time dependent diagrams 388 and 389 illustrate the content of the tracker top register 101 and the tracker bottom register 100, respectively, during a first data scan as illustrated by FIG. 17a.

Upon system initialization, ROM 98 issues a tracker reset signal to the I6 input of tracker control logic unit 92 as illustrated by waveform 379, and the logic unit 92 in response thereto resets width counter 102, and the tracked cell counter 103. In addition, the logic unit 92 enables the tracker width counter 102 to be incremented by the system clock signal on line 51.

When a scanning of the video sensor is initialed, a begin scan pulse 373a of waveform 373 is issued to enable the tracker control logic unit 92. During the scanning of the first sensor cell of the video sensor, the row count is zero as illustrated by diagram 374. The row counter 52 continues to count at the data clock rate until a row count of 49 occurs. At that time, the row count decoder 57 issues a pulse 375a to the logic unit 92. In response thereto, logic unit 92 enables the width counter 102 as illustrated by waveform 385. Thereafter, the width counter is clocked by the system clock signal of waveform 370 to indicate that a single scan of the video sensor has occurred.

When a start pulse 377a of waveform 377 is received from the tracker sequence controller 97, the logic unit 92 generates a pulse 381a of waveform 381 to load the data bits on line 60 into the tracker video memory 90. In addition, the logic unit 92 issues a pulse 382a of waveform 382 to load the count of row counter 52 into the tracker top register 101, and a pulse 383a of waveform 383 to load the row count into the bottom register 100. As indicated by the diagrams 388 and 389, the tracker top register and tracker bottom register each then indicate a count of 2. Further, the logic unit 92 issues a pulse 387a of waveform 387 to enable the tracked cell counter 103 to be clocked to a count of 1.

Concurrent with the trailing edge of pulse 377a, the waveform 380 transitions to a logic one level to indicate that the tracker is active. At the next occurring data clock pulse, the data bit provided by sensor cell three satisfies an adjacency condition as indicated by pulse 378a of waveform 378. Upon receiving adjacency pulse 378a, the logic unit 92 issues pulses 381b, 383b and 387b. The adjacent data bit then is loaded into the tracker video memory unit 90, and the bottom register is updated with the current row count of 3. In addition, the tracked cell counter again is enabled to be clocked to a count of 2.

As the video data waveform 371 does not indicate any video information after a row count of 3, no further activity occurs within the logic unit 92 until the row count decoder 57 indicates an end of scan condition. At that time, the logic unit 92 issues pulse 385a of waveform 385 to increment the tracker width counter 102.

A second data scan operation is illustrated by FIG. 17b, where a discrete waveform 390 illustrates the video data stream during the second scan of the video sensor. A discrete waveform 391 illustrates the begin scan signal comprised of 55 nanosecond pulses signaling the beginning and end of the second scan of the video sensor. A discrete waveform 392 illustrates the output of comparator 95 of FIG. 5, and a discrete waveform 393 illustrates the output of comparator 96. A discrete waveform 394 illustrates the output of arithmetic unit 93 during the second video sensor scan, and a discrete waveform 395 illustrates the load signal issued by the logic unit 92 to the tracker video memory unit 90. A discrete waveform 396 illustrates the load signal supplied by the logic unit 92 to the tracker top register 101, and a discrete waveform 397 illustrates the load signal issued by the logic unit 92 to the tracker bottom register 100. A discrete waveform 398 illustrates the enable signal supplied by logic unit 92 to the enable input of tracker width counter 102, and a discrete waveform 399 illustrates the enable signal issued by the logic unit to the tracked cell counter 103. Time dependent diagrams 400 and 401 illustrate the content of the tracker top register and tracker bottom register, respectively, during the second video sensor scan.

Upon the initialization of the second video sensor scan, the video memory control logic unit 50 issues a begin scan pulse 391a. As illustrated by waveform 390 and row count diagram 374, video data is generated during the scanning of the first through fourth sensor cells and the sixth and seventh sensor cells. The adjacency condition as illustrated by waveform 394 is satisfied by the video data generated by the first through fourth sensor cells, but it is not satisfied by the video data generated by the sixth and seventh sensor cells. Upon the occurrence of a leading edge of a next data clock after an adjacency condition is indicated by waveform 394, the logic unit 92 issues pulses 395a, 396a and 399a. The video data bit generated during the scanning of sensor cell then is loaded into the tracker video memory unit 90. In addition, a row count of 1 is loaded into the tracker top register 101, and the tracked cell counter 103 is enabled to be clocked to a count of 3. Concurrent with the trailing edges of pulses 395a, 396a and 399a, the waveform 392 transitions to a logic zero to indicate that the row count is greater than or equal to the content of the tracker top register 101.

Upon the occurrence of a next data clock leading edge, the tracker control logic unit 92 issues pulses 395b and 399b to respectively load the next occurring data bit into the tracker video memory unit 90, and to clock the tracked cell counter 103 to a count of 4. Upon detecting a next data clock leading edge, the logic unit 92 issues pulses 395c and 399c to respectively load another adjacent data bit into the tracker video memory 90, and to clock the tracked cell counter to indicate a count of 5. Concurrent with the trailing edges of pulses 395c and 399c, the waveform 393 transitions to a logic one level to indicate that the row count has become greater than the content of the tracker bottom register 100.

Upon the occurrence of the leading edge of pulse 372a of waveform 372, the logic unit 92 issues a pulse 397a to load the row count into the tracker bottom register 100. As indicated by diagram 401, the tracker bottom register then contains a count of 4. Concurrent with pulse 397a, the logic unit 92 issues pulses 395d and 399d to load the tracker video memory unit 90 with another adjacent data bit and to clock the tracked cell counter 103 to a count of 6, respectively. As waveform 394 thereafter is at a logic zero level, no further activity occurs during the second scan period until the decoder 57 indicates an end of scan as illustrated by pulse 375a of waveform 375. Concurrent with the leading edge of a next data clock pulse 372b, logic unit 92 issues pulse 398a to enable the tracker width counter 102 to be clocked to a count of 2. The completion of two scans thereby is indicated.

Referring to FIG. 17c, a third scan of the video sensor is illustrated. A discrete waveform 410 illustrates the video data stream during the third video scan, and a discrete waveform 411 illustrates the begin scan signal generated by video memory control logic unit 50 during the video scan. A discrete waveform 412 indicates the output of row count decoder 57 during the third video scan. A discrete waveform 413 illustrates the output of comparator 95, while a discrete waveform 414 illustrates the output of comparator 96. A discrete waveform 415 illustrates the O1 output of tracker valid storage register 99 of FIG. 5, and a discrete waveform 416 illustrates the O8 output of the tracker control logic unit 92. A discrete waveform 417 illustrates the enable signal issued by the logic unit 92 to width counter 102 during the third video scan.

Waveform 410 indicates that there is no video data generated during the third video sensor scan. As before described, when a video sensor scan is encountered having no video data therein, one of two conditions occurs. If the video data stored in the tracker top, bottom and width registers, exceeds or equals minimum threshold criteria, then the tracker is marked valid.

Preferable parameter values stored in parameter memory unit 138 and used for tracker and character evaluation in the FCM and second character modes are itemized in Table I.

The tracker illustrated by FIGS. 17a–17c has a width count of 3, a tracked cell count of 6, a row count of 1 in the top register 101 and a row count of 4 in the bottom register 100 at the conclusion of the third video sensor scan. Since none of these values exceed or equal the minimum threshold criteria as represented by Table I, the tracker is not marked valid upon the conclusion of the video scan as illustrated by the logic zero level of waveform 415. Thus, the tracker enters an inactive rather than a complete state as indicated by the logic zero level of waveform 416. It is to be understood that if the tracker had traced valid character information prior to encountering the void video sensor scan, then the tracker would have entered the complete rather than the inactive state.

TABLE I
Tracker Evaluation Parameters

Minimum Height = 8
Minimum Width = 8
Maximum Center Difference (ΔY) = 16
Minimum Tracked Cell Count = 24
First Character Width = 20
Maximum Height = 35
Maximum Width = 36

FIG. 18

Figure 18:
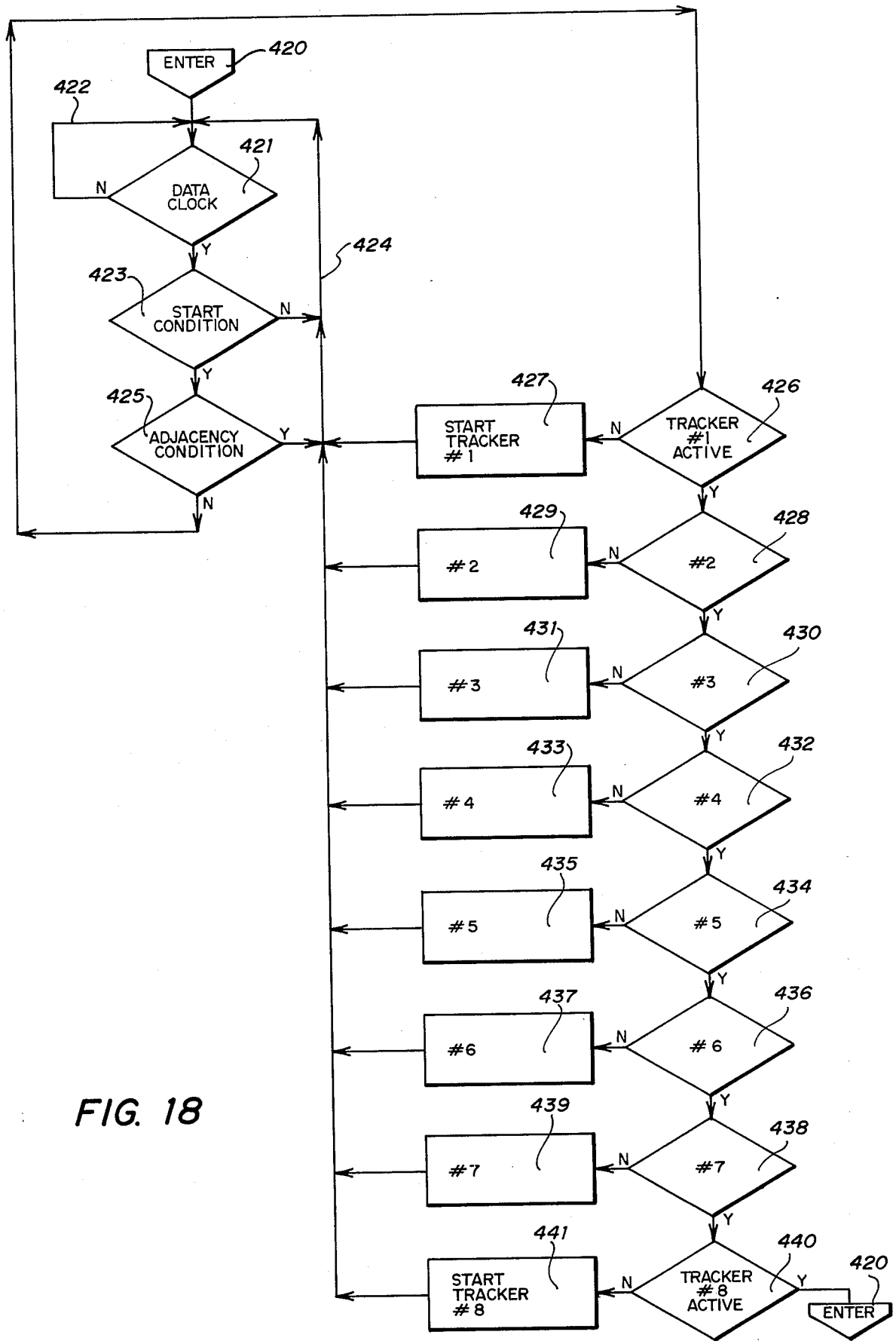
FIG. 18 is a logic flow diagram illustrating the operation of the tracker sequence controller of FIG. 5.

FIG. 18 is a logic flow diagram illustrating the operation of the tracker sequence controller 97 of FIG. 5.

Upon receiving an adjacency condition signal at the EN1 enable input or a start condition signal at the EN2 input of the tracker sequence controller 97, the logic decision flow enters at a logic step 420. From step 420, a transfer is made to a logic step 421 where the clock input to controller 97 is sensed to detect a leading edge of the data clock signal on line 53. If a leading edge is not detected, the logic decision flow cycles about a logic path 422. Upon detecting a leading edge of a data clock pulse, however, a transfer is made from step 421 to a logic step 423 where the EN2 input is sensed to determine whether a start condition has occurred. If a start condition is not detected, the logic decision flow returns to logic step 421 by way of a logic path 424. If a start condition is detected, however, a transfer is made from step 423 to a logic step 425 to test for the existence of an adjacency condition as indicated by the output of OR gate 94. If an adjacency condition exists, a transfer is made from step 425 to reenter logic step 421. If the adjacency condition is not detected, however, a transfer is made from step 425 to a logic step 426 where the tracker control logic of tracker 1 is sensed to detect an active condition. If tracker 1 is not active, a transfer is made from step 426 to a logic step 427 to issue a start signal to tracker 1. A transfer then is made from step 427 to reenter step 421.

If tracker 1 is active, a transfer is made from step 426 to a logic step 428 to determine whether tracker 2 is active. If tracker 2 is not active, a transfer is made from step 428 to a logic step 429 where a start pulse is issued to tracker 2. A transfer then is made from step 429 to reenter step 421. Trackers 3-8 are tested in like manner at logic steps 430-441. If no inactive tracker is found, a transfer is made from logic step 440 to logic step 421 where the logic decision process begins anew.

It is thus seen that after a start condition occurs and a first tracker is activated to begin tracking the video data from scan to scan, such tracker continues in its active state until an adjacency condition is not met. At that time, the highest priority tracker which is inactive is activated to begin tracking the video data.

FIG. 19

Figure 19:
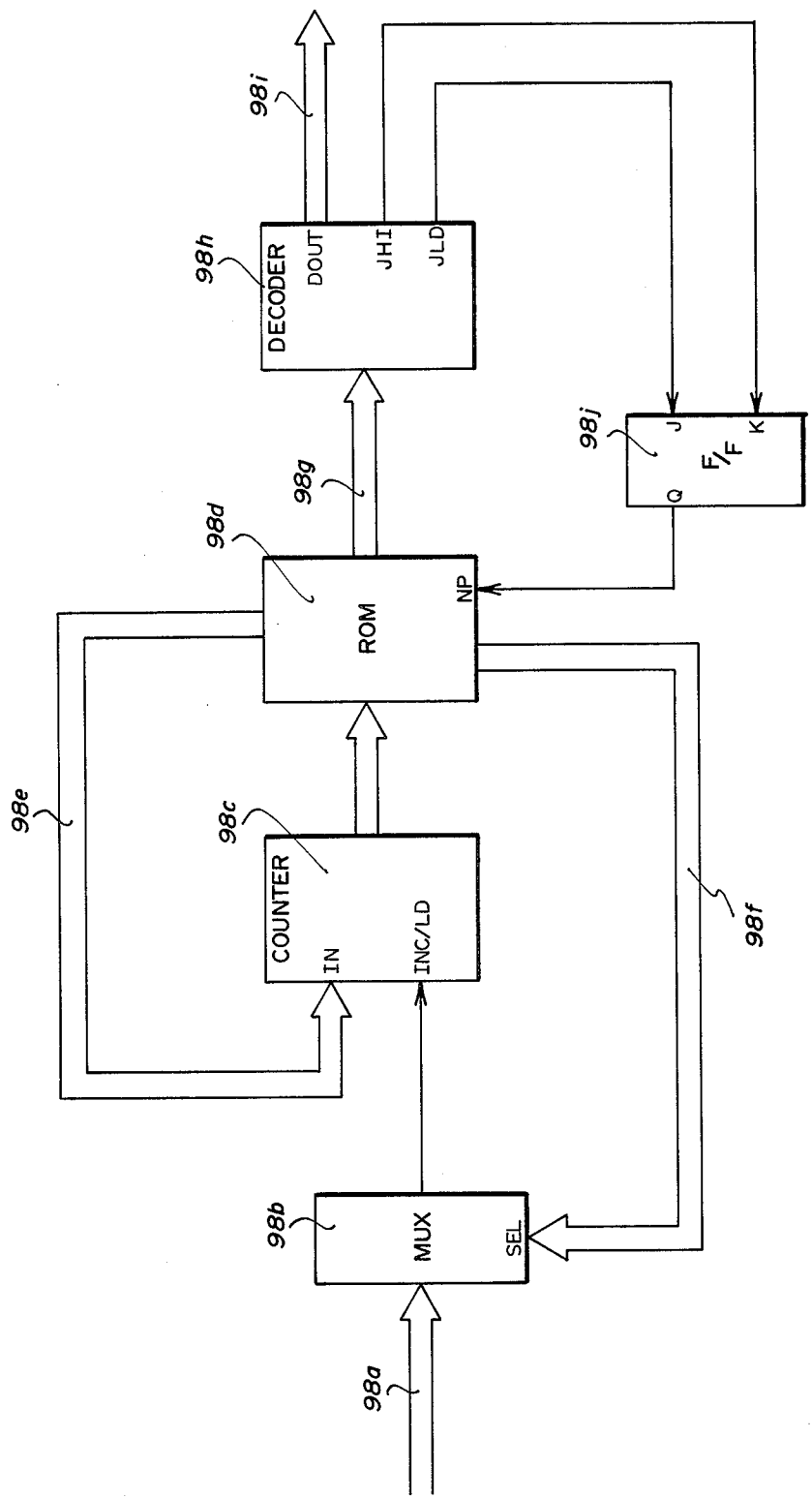
FIG. 19 is a functional block diagram of the ROM control unit of FIG. 5.
Figure 20A:
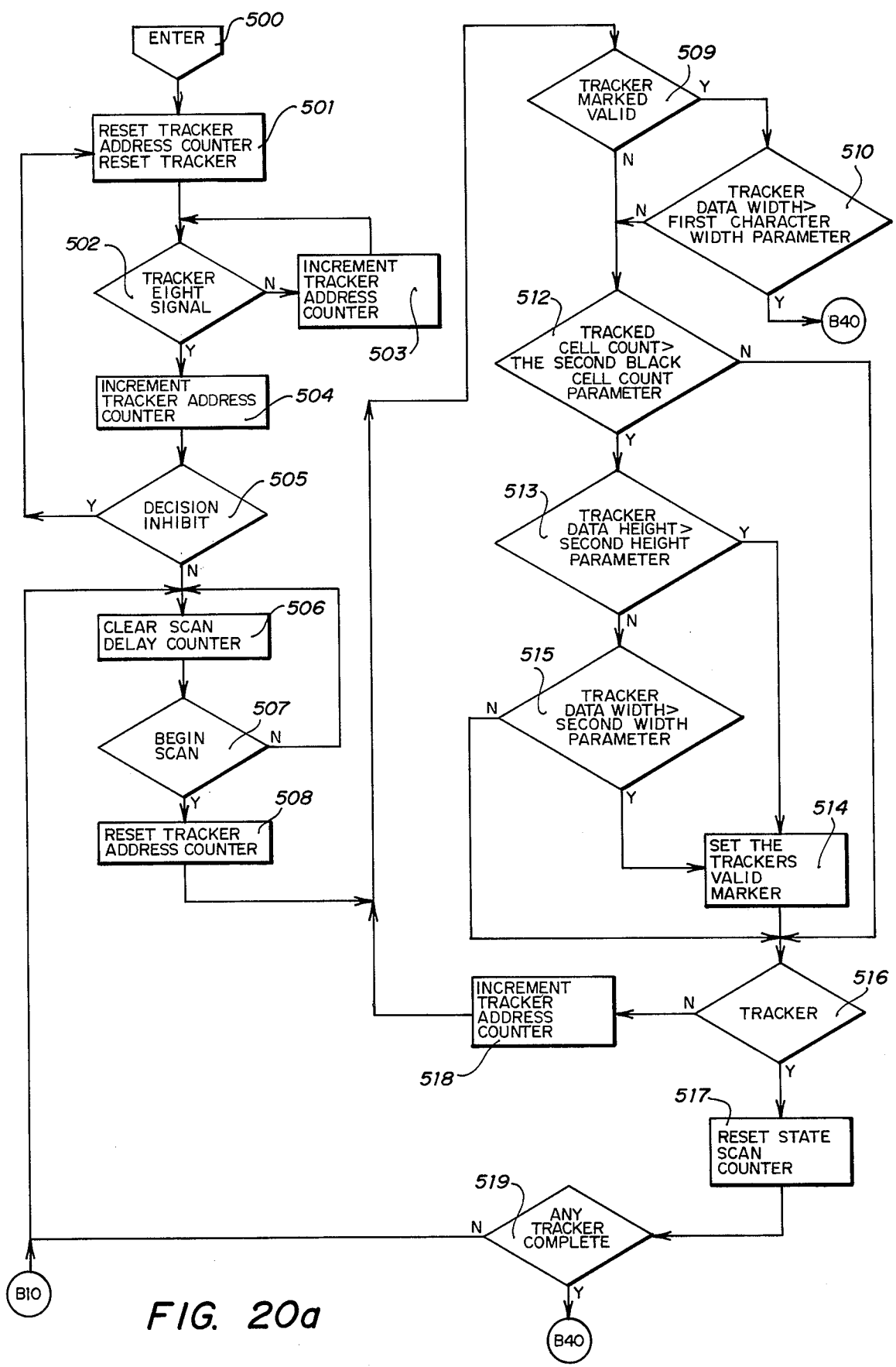
FIGS. 20a-20f comprise a logic flow diagram illustrating the operation of the ROM control unit of FIG. 5.
Figure 20B:
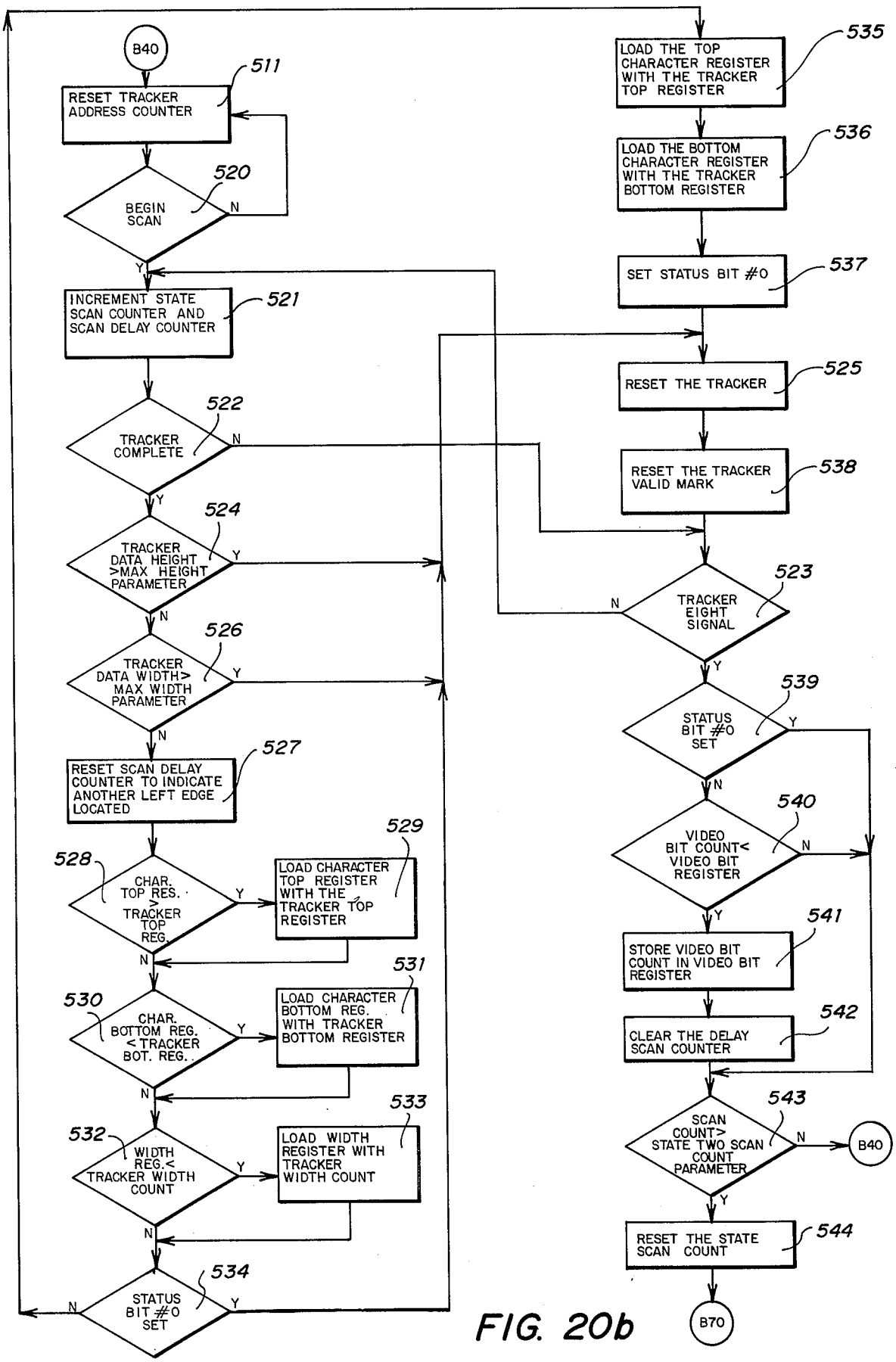
Figure 20C:
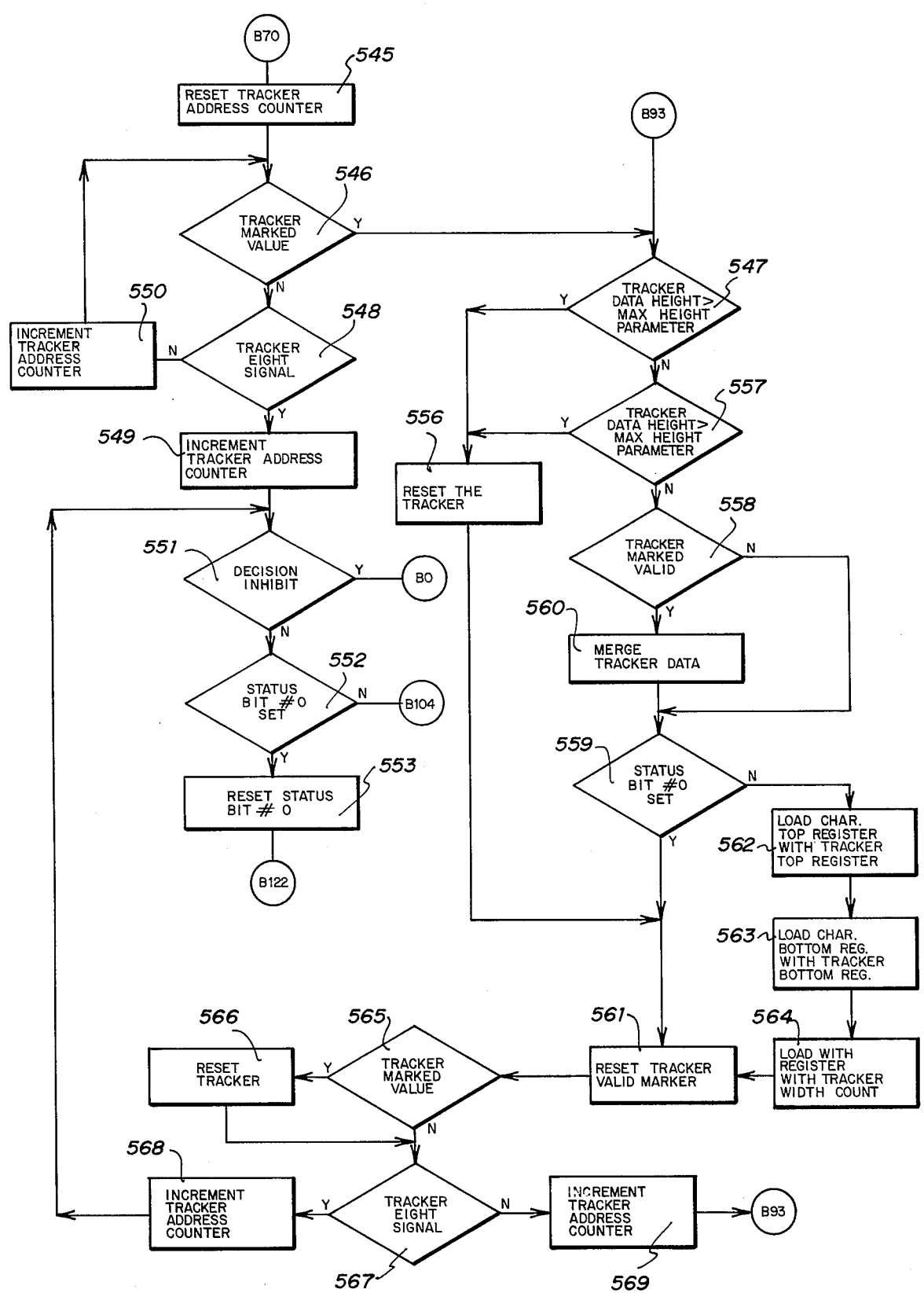
Figure 20D:
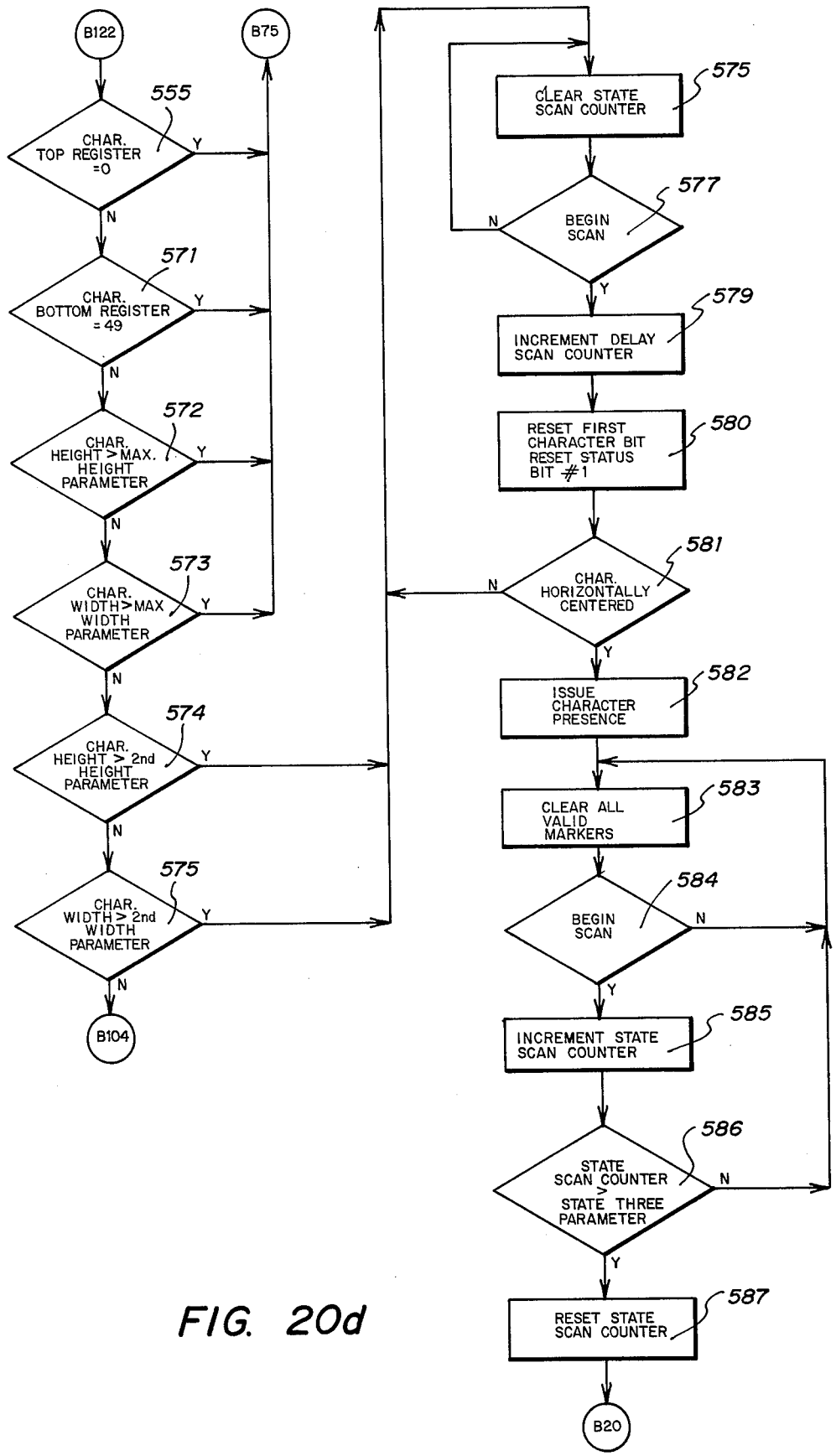
Figure 20E:
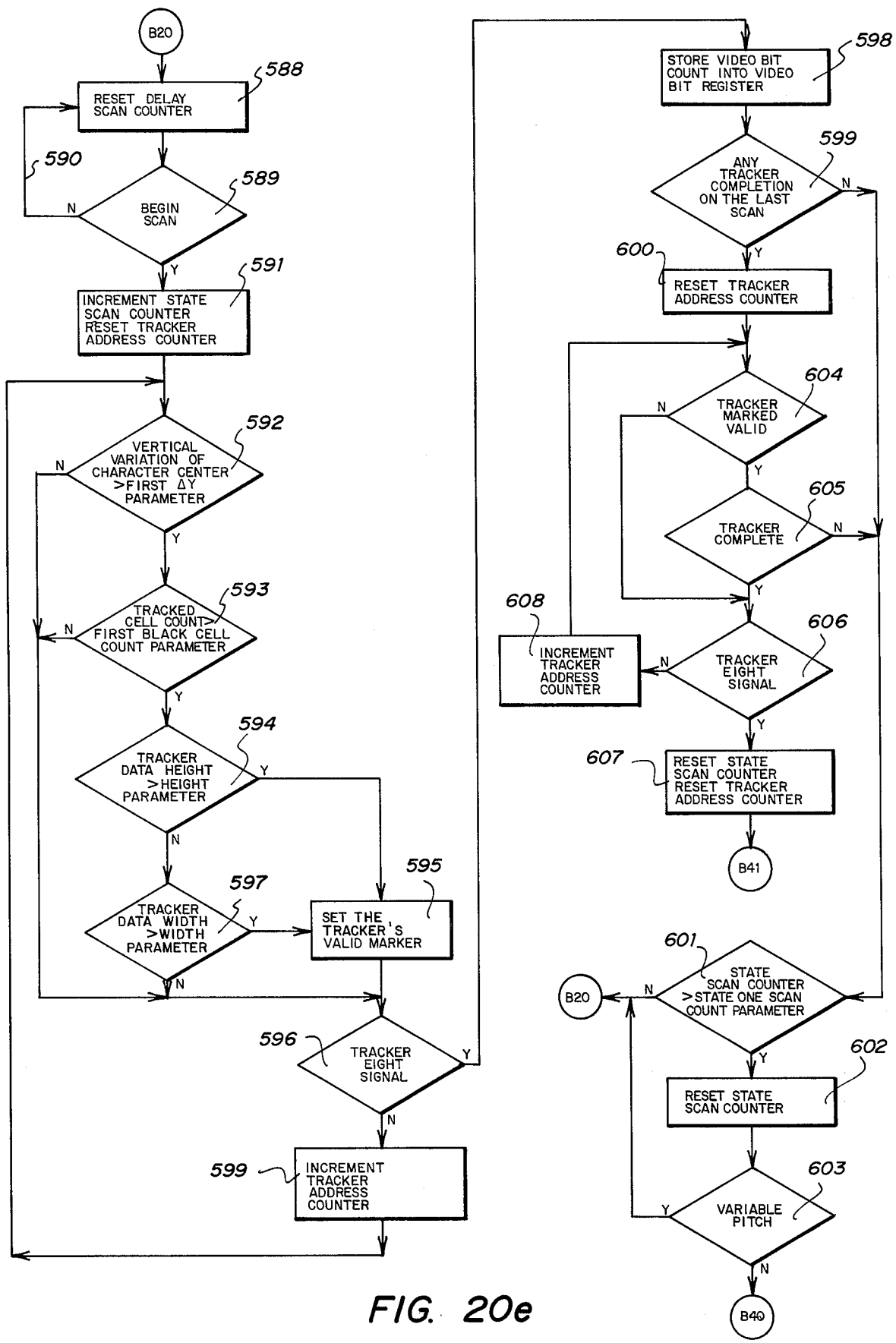
Figure 20F:
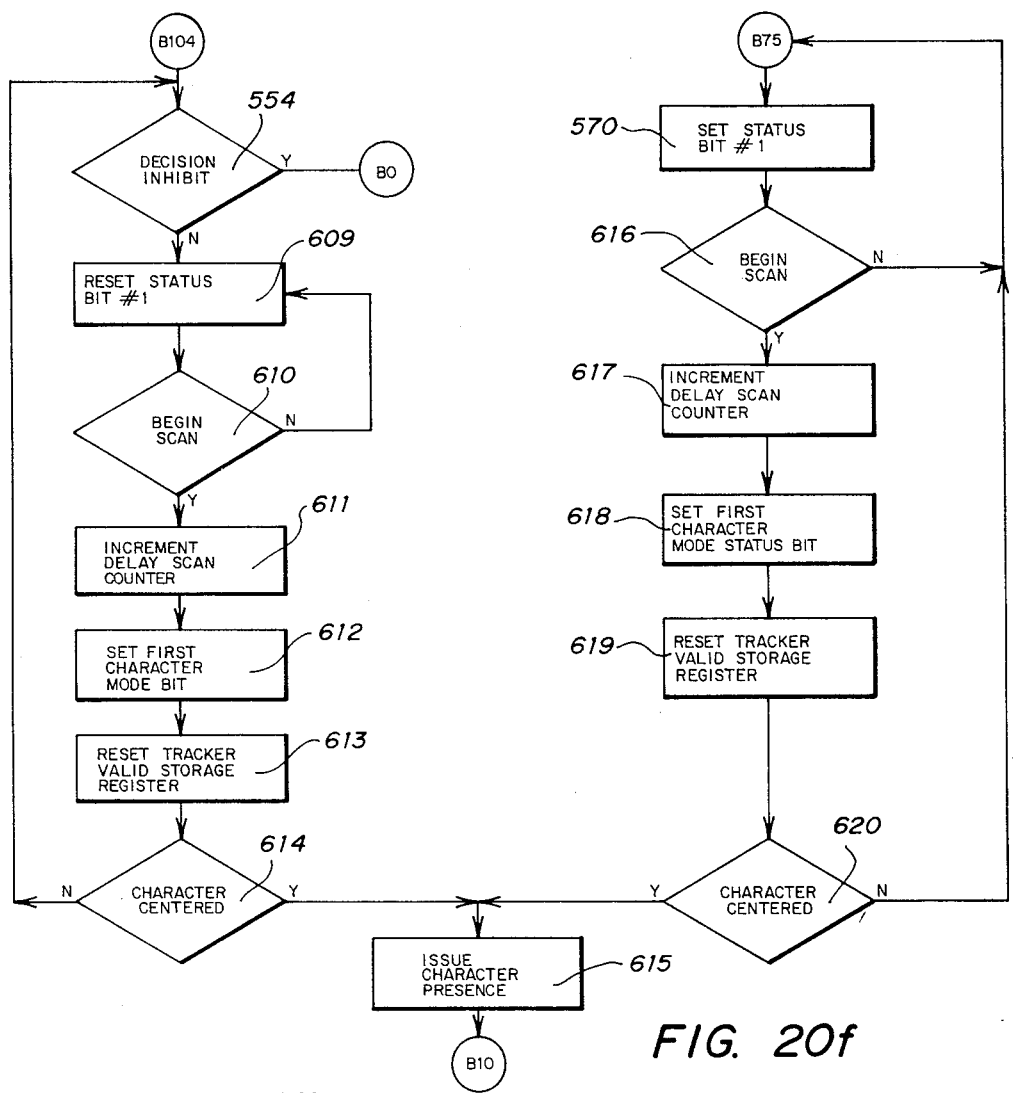

FIG. 19 is a detailed functional block diagram of the ROM control unit 98 of FIG. 5.

A 32-bit data cable 98a is connected to the input of a 32-bit multiplexer 98b. The output of the multiplexer is connected to the increment/load input of a six-bit counter 98c. The six-bit output of the counter addresses a 16 × 256 bit ROM 98d.

A first output of ROM 98d is applied by way of a six-bit data cable 98e to the input of counter 98c. A second output of ROM 98d is applied by way of a five-bit data cable 98f to the SEL (select) input of multiplexer 98b. Further, a five-bit output of the ROM is applied by way of a data cable 98g to a decoder 98h providing up to 32 output conditions. The outputs of decoder 98h is applied to a data cable 98i. In addition, the JHI output of the decoder is connected to the J input of a J-K flip-flop 98j, and the JLO output of the decoder is connected to the K input of the flip-flop. The Q output of the flip-flop is connected to the NP (next page) input of ROM 98d.

In operation, ROM 98d selects multiplexer 98b to one of 32 inputs on data cable 98a. If the selected input is a logic one, the counter is incremented. Otherwise, the counter is loaded with the six-bit ROM output on cable 98e.

The ROM 98d is formatted into two pages each having 64 words. The relative address within a page of ROM 98d is supplied by counter 98c. The page to which the address relates is selected by the Q output of flip-flop 98. The instruction at the indicated ROM address is supplied to decoder 98h, which decodes the instruction to supply commands to cable 98i.

FIGS. 10a-20f

FIGS. 20a-20f are logic flow diagrams of the operation of the ROM 98 of FIG. 5.

Upon system initialization, entry is made at a logic step 500 from which a tranfer is made to a logic step 501. At step 501, tracker address counter 118 of FIG. 5 is reset, and a tracker reset signal is issued to the tracker control logic unit 92. From step 501 a transfer is made to a logic step 502 where the I15 input of the ROM control unit 98 of FIG. 5 is sensed to determine whether tracker 8 is being addressed by the tracker address decoder 111. If no tracker 8 signal is detected, a transfer is made from step 502 to a logic step 503 where the tracker address counter 118 is incremented. From step 503, a transfer is made to again test for a tracker 8 signal at step 502. If a tracker 8 signal is detected at step 502, however, a transfer is made to a logic step 504 to increment the tracker address counter 118. From step 504, a transfer is made to a logic step 505 where the I14 input to unit 98 is sensed for a decision inhibit signal. If an inhibit signal is detected, a transfer is made from step 505 to reenter logic step 501. If an inhibit signal is not detected, a transfer is made from step 505 to a logic step 506 where the first character made is entered, and the delay scan counter 187 of FIG. 8 is reset. A transfer then is made from step 506 to a logic step 507 where the enable input to unit 98 is sensed for the occurrence of a begin scan signal. if no begin scan signal is detected, the logic decision flow reenters step 506. If a begin scan signal is detected, a transfer is made from step 507 to a logic step 508 to reset the tracker address counter 118. From step 508, a transfer is made to a logic step 509 where the valid output of the tracker valid storage register 99 of FIG. 5 is sensed to detect a valid tracker condition. If a valid mark is detected, a transfer is made from step 509 to a logic step 510 where the output of comparator 176 is sensed for a logic one indication. If a logic one is detected, a transfer is made from step 510 to a logic step 511 to commence the search for the left boundary of a character. If a logic one is not detected at step 510, a transfer is made to a logic step 512. Further, if no tracker is found that is marked valid at step 509, a direct transfer from step 509 to logic step 512 is made. At step 512, the tracked cell count of the tracker under evaluation is compared to a black cell counter parameter supplied by the parameter memory unit 138 of FIG. 5. If the tracked cell count is greater than the black cell count parameter, a transfer is made from step 512 to a logic step 513 to sense the output of comparator 165 of FIG. 6. If the tracker data height is greater than a height parameter, a transfer is made from step 513 to a logic step 514 where a valid marker is set in the tracker valid storage register 99. If the tracker data height is less than or equal to the height parameter, however, a transfer is made from step 513 to a logic step 515 where the output of comparator 176 of FIG. 7 is sensed. If the tracker data width is greater than a width parameter, a transfer is made from step 515 to logic step 514 to set the valid marker of the tracker under evaluation. If the tracker data width is less than or equal to the width parameter, however, a transfer is made from step 515 to a logic step 516 where the I15 input of ROM control unit 98 is sensed to determine if tracker 8 is being addressed. If tracker 8 is addressed a transfer is made from step 516 to a logic step 517. If the tracker 8 is not addressed, however, a transfer is made from step 516 to a logic step 518 where the tracker address counter 118 is incremented. From step 518, a transfer is made to step 509 where the logic decision flow continues as before described.

If the tracked cell count is less than or equal to the black cell count parameter at step 512, a transfer is made to logic state 516. If the tracker 8 is addressed by the tracker address counter 118, a transfer is made from step 516 to step 517 to reset the state scan counter 188. From step 517, a transfer is made to a logic step 519 where the tracker drivers are sensed to detect a tracker in the complete state. If no tracker is found that is in the complete state, a transfer is made from step 519 to reenter step 506. If a tracker is found in the complete state, however, a transfer is made from step 519 to step 511 to initiate the search for a left character boundary.

At step 511, the tracker address counter 118 of FIG. 5 is reset, and a transfer is made to a logic step 520 to test for the occurrence of a begin scan signal. If a begin scan signal is detected, a transfer is made from step 520 to a logic step 521. If no begin scan signal is detected, a transfer is made from step 520 to reenter step 511.

At step 521, the state scan counter 188 and the scan delay counter 187 are incremented. A transfer then is made from step 521 to a logic step 522 where the tracker drivers are sensed to detect a tracker in the complete state. If no tracker is found in the complete state, a transfer is made from step 522 to a logic step 523 to determine whether tracker 8 is being addressed. If the tracker under evaluation is in the complete state, a transfer is made from step 522 to a logic step 524 where the tracker data height is compared to a maximum height parameter. If the tracker data height is greater than the maximum height parameter as indicated by the output of comparator 165 of FIG. 6, a transfer is made from step 524 to a logic step 525 to issue a reset signal to the tracker control logic of the tracker under evaluation. If the tracker data height is less than or equal to the maximum height parameter, however, a transfer is made from step 524 to a logic step 526 where the tracker data width is compared to a maximum width parameter. If the tracker data width is greater than the maximum width parameter as determined by the output of comparator 176 of FIG. 7, a transfer is made from step 526 to step 525. If the tracker data width is less than or equal to the maximum width parameter, however, a transfer is made from step 526 to a logic step 527 to reset the scan delay counter 187 of FIG. 8. From step 527, a transfer is made to a logic step 528 where the row count stored in the character top register 150 is compared to the row count stored in the top register of the tracker under evaluation. If the output of the character top register is greater than that of the tracker top register, a transfer is made from step 528 to a logic step 529 to load the character top register 150 with the output of the tracker top register. A transfer then is made from step 529 to a logic step 530. If the output of the character top register is not greater than the output of the tracker top register, a transfer is made from step 528 to a logic step 530. At step 530, the output of the character bottom register 157 is compared to the output of the bottom register of the tracker under evaluation. If the output of the character bottom register is less than the output of the tracker bottom register, a transfer is made from step 530 to a logic step 531 where the character bottom register is loaded with the output of the tracker bottom register. From step 531 a transfer is made to a logic step 532. Further, if the output of character bottom register is greater than or equal to the output of the tracker bottom register at step 530, a transfer is made from step 530 to step 532.

At logic step 532, the output of width register 174 of FIG. 7 is compared to the tracker width count of the tracker under evaluation. If the output of the width register 174 is less than the tracker width count, a transfer is made from step 532 to a logic step 533 to load the width register 174 with the tracker width count. From step 533, a transfer is made to a logic step 534. Further, if the output of the width transfer 174 is greater than or equal to the tracker width count, a transfer is made from step 532 to step 534.

At step 534, ROM status bit zero is sensed to determine whether a previous data merger has occurred. If the status bit is set, a transfer is made from step 534 to step 525. If the status bit is not set, a transfer is made from step 534 to a logic step 535. At step 535, the character top register 150 is loaded with the top register output of the tracker under evaluation. A transfer then is made from step 535 to a logic step 536 to load the character bottom register 157 with the bottom register output of the tracker. From step 536, a transfer is made to a logic step 537 where the status bit zero is set. A transfer then is made from step 537 to step 525 where a tracker reset signal is issued to the tracker control logic of the tracker under evaluation. From step 525, a transfer is made to a logic step 538 to reset the valid mark for the tracker under evaluation. From step 538, a transfer is made to step 523 to sense the output of tracker address decoder 111 to detect a tracker 8 signal. If a tracker 8 signal is detected, a transfer is made from step 523 to a logic step 539. If the tracker 8 signal is not detected, a transfer is made from step 523 to reenter logic step 521.

The status bit zero of ROM 98d of FIG. 19 is sensed at step 539. If the status bit has been set, a transfer is made from step 539 to a logic step 543. If the status bit has not been set, however, a transfer is made from step 539 to a logic step 540 where the video bit count of counter 194 of FIG. 8 is compared with the output of video bit register 192. If the video bit count is less than the video bit register output, a transfer is made from step 540 to a logic step 541 to store the output of video bit counter 194 into the video bit register 192. If the video bit count is greater than or equal to the video bit register output, a transfer is made from step 540 to logic step 543.

From step 541, a transfer is made to a logic step 542 to reset the delay scan counter 187 to indicate a new character left boundary. A transfer then is made from step 542 to a logic step 543 where the count of the state scan counter 188 is compared to a scan count parameter. If the scan count is greater than the parameter, a transfer is made from step 543 to a logic step 544 to reset the state scan counter 188. If the scan count is less than or equal to the parameter, however, a transfer is made from step 543 to logic step 511 to initiate a new left character boundary search.

From step 544 a transfer is made to a logic step 545 where a merge operation is initiated. More particularly, the tracker address counter 118 of FIG. 5 is reset, and a transfer is made from step 545 to a logic step 546 to sense the valid signal output of the register 99. If a valid mark signal is detected for the tracker under evaluation, a transfer is made from step 546 to a logic step 547. If no valid mark signal is detected, however, a transfer is made from step 546 to a logic step 548 where the output of tracker address decoder 111 is sensed to detect a tracker 8 signal. If a tracker 8 signal is detected, a transfer is made from step 548 to a logic step 549 to increment the tracker address counter 118. If a tracker signal other than tracker 8 is detected, a transfer is made from step 548 to a logic step 550 where the tracker address counter 118 is incremented. From step 550, a transfer is made to reenter step 546.

From step 549, a transfer is made to a logic step 551 where the I14 input of ROM control unit 98 is sensed for a decision inhibit condition. If no decision inhibit is detected, a transfer is made from step 551 to a logic step 552 where the status bit zero of the ROM 98d is sensed. If a decision inhibit is detected, however, a transfer is made from step 551 to logic step 500 where the logic decision flow continues as before described.

If the status bit zero is set at step 552, a transfer is made to a logic step 553 to reset the status bit. From step 553, a transfer is made to a logic step 555 to test for the occurrence of a valid character. If the status bit is not set at step 552, a transfer is made from step 552 to a logic step 554 where the tracker data is evaluated for the occurrence of a character space.

At logic step 547, the output of comparator 165 of FIG. 6 is sensed to detect a tracker data height greater than a maximum height parameter supplied by a parameter memory unit 138 of FIG. 5. If the tracker data height is greater than the parameter, a transfer is made from step 547 to a logic step 556 to issue a tracker reset signal to the tracker control logic unit. If the tracker data height is less than or equal to the maximum height parameter, a transfer is made from step 547 to a logic step 557 where the tracker data width is compared with a maximum width parameter. If the tracker data width exceeds the parameter value, a transfer is made from step 557 to step 556. If the tracker data width is less than or equal to the parameter value, a transfer is made from step 557 to a logic step 558 where the valid output of register 99 is sensed for a valid indication. If no valid indication is provided, a transfer is made from step 558 to a logic step 559 to sense the status bit zero. If a valid indication is detected, a transfer is made from step 558 to a logic step 560 where the tracker data is merged into the character top register 150, the character bottom register 157 and the width register 174 as before described.

From step 560, a transfer is made to step 559. If the status bit zero is set, a transfer is made from step 559 to a logic step 561. If the status bit is not set, however, a transfer is made from step 559 to a logic step 562 where the character top register 150 is loaded with the output of the tracker top register. A transfer then is made from step 562 to a logic step 563 where the character bottom register 157 is loaded with the output of the tracker bottom register. From step 563, a transfer is made to a logic step 564 where the width register 174 is loaded with the tracker width count. From step 564, a transfer is made to step 561 to reset the valid marker of the tracker which is stored in register 99.

Upon resetting the valid marker at step 561, a transfer is made to a logic step 565 to sense the valid marker output of register 99. If a valid tracker is detected, a transfer is made from step 565 to a logic step 566 where a tracker reset signal is provided at the O1 output of ROM control unit 98. From step 566, a transfer is made to a logic step 567. If no valid tracker is detected at step 565, a direct transfer is made from step 565 to step 567.

At step 567, the output of tracker address decoder 111 is sensed to detect a tracker 8 signal. If a tracker 8 signal is detected, a transfer is made from step 567 to a logic step 568 to increment the tracker address counter 118. From step 568, a transfer is made to reenter step 551. If the tracker 8 signal is not detected, a transfer is made from step 567 to a logic step 569 to increment the tracker address counter 118. From step 569, a transfer is made to reenter step 547.

Upon entering the character evaluation mode, the character top register 150 is sensed at logic step 555 to detect a row zero indication. If the row zero is detected, a transfer is made from step 555 to a logic step 570. If the row zero indication is not detected, a transfer is made from step 555 to a logic step 571 where the output of the character bottom register 157 is sensed for a row 49 count. If a row 49 count is detected, a transfer is made to step 570. If the row count is other than 49, a transfer is made from step 571 to a logic step 572 where the output of comparator 165 is sensed to determine whether the character data height is greater than a maximum height parameter. If the character height is greater, a transfer is made from step 572 to logic step 570. If the character height is less than or equal to the height parameter, a transfer is made from step 572 to a logic step 573 where the output of comparator 176 is sensed to determine whether the character width is greater than a maximum width parameter. If the character width is greater, a transfer is made to step 570. If the character width is not greater, a transfer is made from step 573 to a logic step 574 to compare the character height with a height parameter.

If the height of the character as determined from top register 150 and bottom register 157 exceeds the height parameter, a transfer is made from step 574 to a logic step 575. If the character height is less than or equal to the height parameter, however, a transfer is made from step 574 to a logic step 576 where the character width of width register 174 is compared to a width parameter. If the character width exceeds the width parameter, a transfer is made from step 576 to step 575. If the character width is less than or equal to the width parameter, a transfer is made from step 576 to logic step 554.

Upon detecting the presence of a valid character, the state scan counter 188 is reset at step 575, and a transfer is made from step 575 to a logic step 577 to await the occurrence of a begin scan signal. If a begin scan signal is not detected at step 577, the logic decision flow reenters step 575 by way of a logic path 578. Upon detecting a begin scan signal, a transfer is made from step 577 to a logic step 579 to increment the delay scan counter 187. From step 579, a transfer is made to a logic step 580 to reset a first character status bit and a status bit one signal supplied by ROM 98*d* to the I1 and I2 inputs, respectively, of logic unit 91. A transfer then is made from step 580 to a logic step 581 where the output of comparator 186 is sensed to determine whether the character information in SAM 30 has been horizontally centered. If the character has been centered, a transfer is made from step 581 to a logic step 582 to issue a character presence signal to line 66 of FIG. 5. If the character information in SAM 30 has not been horizontally centered, a transfer is made from step 581 to reenter step 575.

From step 582, a transfer is made to a logic step 583 to enter a tracker blanking mode, and to reset the tracker valid storage register 99. From step 583, a transfer is made to a logic step 584 where the enable input of unit 98 is sensed for the presence of a begin scan signal. If a begin scan signal is detected, a transfer is made from step 584 to a logic step 585. If a begin scan signal is detected, a transfer is made from step 584 to reenter step 583.

At step 585, the state scan counter 188 is incremented, and a transfer is made to a logic step 586. The count of the state scan counter is compared to a state parameter at step 586, and a transfer is made to a logic step 587 if the scan count exceeds the value of the parameter. If the scan count is less than or equal to the state parameter, a transfer is made from step 586 to reenter logic step 583. At step 587, the state scan counter 188 is reset, and a transfer is made from step 587 to a logic step 588.

A valid tracker search mode is entered at step 588, and the delay scan counter 187 is reset. From step 588, a transfer is made to a logic step 589 to detect the occurrence of a begin scan signal. If no signal is detected, the logic decision flow returns to step 588 by way of a logic path 590. IF a begin scan signal is detected, however, a transfer is made from step 589 to a logic step 591 where the state scan counter 188 is incremented and the tracker address counter 118 is reset. From step 591, a transfer is made to a logic step 592 to sense the output of comparator 162. If the vertical difference between a current character and a previous character exceeds a difference parameter, a transfer is made from step 592 to a logic step 593 where the output of comparator 170 of FIG. 7 is sensed. If the vertical difference does not exceed the parameter, a transfer is made from step 592 to a logic step 596. If the tracked cell count of a tracker exceeds a black cell count parameter supplied by memory unit 138, a transfer is made from step 593 to a logic step 594. If the tracked cell count is less than or equal to the count parameter, however, a transfer is made from step 593 to logic step 596.

At logic step 594, the tracker data height is compared to a height parameter supplied by parameter memory unit 138. If the tracker data height exceeds the height parameter, a transfer is made from step 594 to a logic step 595 where the valid marker of the tracker under evaluation is set in tracker valid storage register 99. From step 595, a transfer is made to a logic step 596. If the tracker data height is less than or equal to the height parameter at step 594, a transfer is made to a logic step 597 where the output of comparator 176 is sensed to determine whether the tracker data width is greater than a width parameter. If the tracker width exceeds the width parameter, a transfer is made from step 597 to step 595. If the tracker data width is less than or equal to the width parameter, however, a transfer is made from step 597 to logic step 596.

At step 596, the output of tracker address decoder 111 is sensed to detect a tracker 8 signal. If a tracker 8 signal is detected, a tranfer is made from step 596 to a logic step 598. If not, a transfer is made from step 596 to a logic step 599 to increment the tracker address counter 118. From step 599, a transfer is made to reenter step 592.

Upon entering the valid tracker search mode at step 598, the count of video bit counter 194 is stored into the video bit register 192. From step 598, a transfer is made to a logic step 599 where the tracker driver outputs are sensed to detect a tracker completion. If a tracker completion is detected, a transfer is made from step 599 to a logic step 600 to reset the tracker address counter 118. If a tracker completion is not detected, a transfer is made from step 599 to a logic step 601 where the count of state scan counter 188 is compared to a scan count parameter supplied by the parameter memory unit 138. If the state scan count exceeds the count parameter, a transfer is made from step 601 to a logic step 602 to reset the state scan counter. If the state scan count is less than or equal to the scan count parameter, a transfer is made from step 601 to logic step 588.

After the state scan counter is reset at step 602, a transfer is made to a logic step 603 to test for the presence of variable pitch in the character information stream. More particularly, the 119 input to ROM control unit 98 is sensed for a logic one level. If a logic one level is detected, a transfer is made from step 603 to logic step 558. If a logic one level is not detected, a transfer is made from step 603 to logic step 511.

After the tracker address counter 118 is reset at step 600, a transfer is made to a logic step 604 where the valid marker output of register 99 is sensed for a valid tracker indication. If a valid tracker signal is detected, a transfer is made from step 604 to a logic step 605 where the tracker driver outputs are scanned to detect a tracker completion. If a tracker completion is not detected, a transfer is made from step 605 to logic step 601. If a tracker completion is detected, however, a transfer is made from step 605 to a logic step 606. Further, if a valid tracker signal is not detected at step 604, a direct transfer is made from step 604 to logic step 606.

At step 606, the output of the tracker address decoder 111 is sensed for a tracker 8 signal. If the tracker 8 signal is detected, a transfer is made from step 606 to a logic step 607 to reset a state scan counter 188 and tracker address counter 118. Upon resetting the state scan and tracker address counters at step 607, a transfer is made to logic step 522 where the logic decision flow continues as before described. If a tracker signal other than a tracker 8 signal is detected at step 606, a transfer is made to a logic step 608 where the tracker address counter 118 is incremented. From step 608, a transfer is made to reenter step 604.

The character space mode is entered at logic step 554, where the 114 input of ROM control unit 98 is sensed to detect a decision inhibit signal. if a decision inhibit is detected, a transfer is made from step 554 to the logic step 500 where the the logic decision flow continues as before described. If a a decision inhibit is not detected, a transfer is made from step 554 to a logic step 609 where the ROM status bit one is reset. A transfer then is made from step 609 to a logic step 610 to sense the enable input of unit 98 to detect the occurrence of a begin scan signal. If no begin scan signal is detected, a transfer is made from step 610 to reenter logic step 609. If a begin scan is detected, however, a transfer is made from step 610 to a logic step 611 where the delay scan counter 187 is incremented. From step 611, a transfer is made to a logic step 612 where the first character mode bit of ROM 98d is set. A transfer then is made from step 612 to a logic step 613 to reset the tracker valid storage register 99. From step 613, a transfer is made to a logic step 614 to test for a centered character condition. The output of comparator 186 of FIG. 8 is sensed for a logic one condition to indicate whether character information is SAM 30 has been horizontally centered. If slo, a transfer is made from step 614 to a logic step 615 where a character presence signal is issued to line 66 of FIGS. 5. If the character information in SAM 30 has not been centered, a transfer is made from step 614 to reenter logic step 554.

The character reject mode is entered at step 570 to set the ROM status bit one. From step 570, a transfer is made to a logic step 616 where the enable input of unit 98 is sensed for the presence of a begin scan signal. If a begin scan signal is not detected, a transfer is made from step 616 to reenter logic step 570. If a begin scan signal is detected, however, a transfer is made from step 616 to a logic step 617 where the delay scan counter 187 is incremented. From step 617, a transfer is made to a logic step 618 to set the first character mode status bit of ROM 98d. A transfer then is made from step 618 to a logic step 619 to reset the tracker valid storage register 99. From step 619, a transfer is made to a logic step 620 where the output of comparator 186 is sensed. If a character centered signal is not detected, a transfer is made from step 620 to logic step 570 where the logic decision flow continues as before described. If a character centered signal is detected, a transfer is made from step 620 to logic step 615 where a character presence signal is issued. From step 615, a transfer is made to logic step 506 to reenter the first character mode.

The bit pattern of ROM 98d is tabulated in Table II. The ROM 98 is addressed by a maximum of 32 bits, and provides a maximum output of 32 bits. Upon receiving an absolute address, the instruction at the equivalent relative page address is executed. In the ROM format, a page is comprised of 64 addresses. Thus, 128 absolute addresses may be formatted into two pages each having 64 words.

The Instruction to be executed at an addressed ROM location is represented in hexadecimal code, a binary code and in an assembly language. Referring to the assembly language Instruction column, it may be seen that each instruction is comprised of a three-column test condition, a two-column page address to which the logic decision flow transfers in the event that the test condition is false, and a three-column output condition which is performed at the current address regardless of the result of the test condition.

The binary representation of the instruction is comprised of four binary codes corresponding to the four 4 × 256 bit ROMs comprising ROM 98d. Each four-bit code thus represents one IC circuit.

TABLE II

| ABSOLUTE ADDRESS | RELATIVE PAGE ADDRESS | HEX CODE | BINARY CODE | | | | INSTRUCTION | | |
|---|---|---|---|---|---|---|---|---|---|
| 0 | 0 | FFFF | 1111 | 1111 | 1111 | 1111 | LTI | 63 | NOP |
| 1 | 1 | FFE1 | 1111 | 1111 | 1110 | 0001 | LTI | 63 | RTC |
| 2 | 2 | FFFB | 1111 | 1111 | 1111 | 1011 | LTI | 63 | RTR |
| 3 | 3 | 2043 | 0010 | 0000 | 0100 | 0011 | T8T | 2 | ITC |
| 4 | 4 | FFE7 | 1111 | 1111 | 1110 | 0111 | LTI | 63 | S1B |
| 5 | 5 | FFE9 | 1111 | 1111 | 1110 | 1001 | LTI | 63 | SFC |
| 6 | 6 | FFE6 | 1111 | 1111 | 1110 | 0110 | LTI | 63 | ROB |
| 7 | 7 | 501F | 0101 | 0000 | 0001 | 1111 | DIN | 0 | NOP |
| 8 | 8 | FFFF | 1111 | 1111 | 1111 | 1111 | LTI | 63 | NOP |
| 9 | 9 | FFFF | 1111 | 1111 | 1111 | 1111 | LTI | 63 | NOP |
| 10 | 10 | B14D | 1011 | 0001 | 0100 | 1101 | BSM | 10 | CDC |
| 11 | 11 | 01E1 | 0000 | 0001 | 1110 | 0001 | GFL | 15 | RTC |
| 12 | 12 | 59E4 | 0101 | 1001 | 1110 | 0100 | T8C | 15 | STV |
| 13 | 13 | 394E | 0011 | 1001 | 0100 | 1110 | CLS | 10 | CSS |
| 14 | 14 | 050A | 0000 | 0101 | 0000 | 1010 | GFL | 40 | RFC |
| 15 | 15 | B99F | 1011 | 1001 | 1001 | 1111 | TMV | 12 | NOP |
| 16 | 16 | 89DF | 1000 | 1001 | 1101 | 1111 | WGF | 14 | NOP |
| 17 | 17 | 019F | 0000 | 0001 | 1001 | 1111 | GFL | 12 | NOP |
| 18 | 18 | FFFF | 1111 | 1111 | 1111 | 1111 | LTI | 63 | NOP |
| 19 | 19 | FFFF | 1111 | 1111 | 1111 | 1111 | LTI | 63 | NOP |
| 20 | 20 | B28D | 1011 | 0010 | 1000 | 1101 | BSM | 20 | CDC |
| 21 | 21 | FFE1 | 1111 | 1111 | 1110 | 0001 | LTI | 63 | RTC |
| 22 | 22 | 22C4 | 0010 | 0010 | 1100 | 0100 | T8T | 22 | STV |
| 23 | 23 | 3B3E | 0011 | 1011 | 0011 | 1110 | CLS | 25 | SBS |
| 24 | 24 | 0481 | 0000 | 0100 | 1000 | 0001 | GFL | 36 | RTC |
| 25 | 25 | 829E | 1000 | 0010 | 1001 | 1110 | SG1 | 20 | SBS |
| 26 | 26 | 03DF | 0000 | 0011 | 1101 | 1111 | GFL | 30 | NOP |
| 27 | 27 | CD9F | 1100 | 1101 | 1001 | 1111 | HLM | 44 | NOP |
| 28 | 28 | D59F | 1101 | 0101 | 1001 | 1111 | WGM | 44 | NOP |
| 29 | 29 | 0712 | 0000 | 0111 | 0001 | 0010 | GFL | 56 | MTR |
| 30 | 30 | 0A9F | 0000 | 1010 | 1001 | 1111 | DT1 | 20 | NOP |
| 31 | 31 | 050E | 0000 | 0101 | 0000 | 1110 | GFL | 40 | CSS |
| 32 | 32 | FFFF | 1111 | 1111 | 1111 | 1111 | LTI | 63 | NOP |
| 33 | 33 | FFFF | 1111 | 1111 | 1111 | 1111 | LTI | 63 | NOP |
| 34 | 34 | 0521 | 0000 | 0101 | 0010 | 0001 | GFL | 41 | RTC |
| 35 | 35 | 015F | 0000 | 0001 | 0101 | 1111 | GFL | 10 | NOP |
| 36 | 36 | 14DF | 0001 | 0100 | 1101 | 1111 | VC1 | 38 | NOP |
| 37 | 37 | 6B3F | 0110 | 1011 | 0011 | 1111 | TCO | 25 | NOP |
| 38 | 38 | 2483 | 0010 | 0100 | 1000 | 0011 | T8T | 36 | ITC |
| 39 | 39 | 044E | 0000 | 0100 | 0100 | 1110 | GFL | 34 | CSS |
| 40 | 40 | B501 | 1011 | 0101 | 0000 | 0001 | BSM | 40 | RTC |
| 41 | 41 | 6DDF | 0110 | 1101 | 1101 | 1111 | TCO | 46 | NOP |
| 42 | 42 | 037F | 0000 | 0011 | 0111 | 1111 | GFL | 27 | NOP |

TABLE II-continued

| ABSOLUTE ADDRESS | RELATIVE PAGE ADDRESS | HEX CODE | BINARY CODE | | | | INSTRUCTION | | |
|---|---|---|---|---|---|---|---|---|---|
| 43 | 43 | FFE5 | 1111 | 1111 | 1110 | 0101 | LTI | 63 | SOB |
| 44 | 44 | FFFB | 1111 | 1111 | 1111 | 1011 | LTI | 63 | RTR |
| 45 | 45 | FFF5 | 1111 | 1111 | 1111 | 0101 | LTI | 63 | RVM |
| 46 | 46 | 2523 | 0010 | 0101 | 0010 | 0011 | T8T | 41 | ITC |
| 47 | 47 | 769F | 0111 | 0110 | 1001 | 1111 | SB0 | 52 | NOP |
| 48 | 48 | ED1F | 1110 | 1101 | 0001 | 1111 | SG2 | 40 | NOP |
| 49 | 49 | 066E | 0000 | 0110 | 0110 | 1110 | GFL | 51 | CSS |
| 50 | 50 | 001F | 0000 | 0000 | 0001 | 1111 | GFL | 0 | NOP |
| 51 | 51 | 0676 | 0000 | 0110 | 0111 | 0110 | GFL | 51 | JHI |
| 52 | 52 | 2E1F | 0010 | 1110 | 0001 | 1111 | BNL | 48 | NOP |
| 53 | 53 | FFFE | 1111 | 1111 | 1111 | 1110 | LTI | 63 | SBS |
| 54 | 54 | 060D | 0000 | 0110 | 0000 | 1101 | GFL | 48 | CDC |
| 55 | 55 | FFFF | 1111 | 1111 | 1111 | 1111 | LTI | 63 | NOP |
| 56 | 56 | 774D | 0111 | 0111 | 0100 | 1101 | SBO | 58 | CDC |
| 57 | 57 | 057F | 0000 | 0101 | 0111 | 1111 | GFL | 43 | NOP |
| 58 | 58 | FFF8 | 1111 | 1111 | 1111 | 1000 | LTI | 63 | LDT |
| 59 | 59 | FFF9 | 1111 | 1111 | 1111 | 1001 | LTI | 63 | LDB |
| 60 | 60 | 057A | 0000 | 0101 | 0111 | 1010 | GFL | 43 | LDW |
| 61 | 61 | FFFF | 1111 | 1111 | 1111 | 1111 | LTI | 63 | NOP |
| 62 | 62 | 709F | 0111 | 0000 | 1001 | 1111 | SBO | 4 | NOP |
| 63 | 63 | 017F | 0000 | 0001 | 0111 | 1111 | GFL | 11 | NOP |
| 64 | 0 | FFE5 | 1111 | 1111 | 1110 | 0101 | LTI | 63 | SOB |
| 65 | 1 | 721F | 0111 | 0010 | 0001 | 1111 | SBO | 16 | NOP |
| 66 | 2 | B895 | 1011 | 1000 | 1001 | 0101 | TMV | 4 | RVM |
| 67 | 3 | FFFB | 1111 | 1111 | 1111 | 1011 | LTI | 63 | RTR |
| 68 | 4 | 23A3 | 0010 | 0011 | 1010 | 0011 | T8T | 29 | ITC |
| 69 | 5 | 061F | 0000 | 0110 | 0001 | 1111 | GFL | 48 | NOP |
| 70 | 6 | FFE1 | 1111 | 1111 | 1110 | 0001 | LTI | 63 | RTC |
| 71 | 7 | B93F | 1011 | 1001 | 0011 | 1111 | TMV | 9 | NOP |
| 72 | 8 | 03A7 | 0000 | 0011 | 1010 | 0111 | GFL | 29 | S1B |
| 73 | 9 | 20E3 | 0010 | 0000 | 1110 | 0011 | T8T | 7 | ITC |
| 74 | 10 | 061F | 0000 | 0110 | 0001 | 1111 | GFL | 48 | NOP |
| 75 | 11 | B167 | 1011 | 0001 | 0110 | 0111 | BSM | 11 | S1B |
| 76 | 12 | A1C9 | 1010 | 0001 | 1100 | 1001 | DGD | 14 | SFC |
| 77 | 13 | 0173 | 0000 | 0001 | 0111 | 0011 | GFL | 11 | CAV |
| 78 | 14 | FFF0 | 1111 | 1111 | 1111 | 0000 | LTI | 63 | OCH |
| 79 | 15 | 047F | 0000 | 0100 | 0111 | 1111 | GFL | 35 | NOP |
| 80 | 16 | FFF8 | 1111 | 1111 | 1111 | 1000 | LTI | 63 | LDT |
| 81 | 17 | FFF9 | 1111 | 1111 | 1111 | 1001 | LTI | 63 | LDB |
| 82 | 18 | FFFA | 1111 | 1111 | 1111 | 1010 | LTI | 63 | LDW |
| 83 | 19 | 001F | 0000 | 0000 | 0001 | 1111 | GFL | 0 | NOP |
| 84 | 20 | 0297 | 0000 | 0010 | 1001 | 0111 | GFL | 20 | JLO |
| 85 | 21 | B2AE | 1011 | 0010 | 1010 | 1110 | BSM | 21 | CSS |
| 86 | 22 | A30A | 1010 | 0011 | 0000 | 1010 | DGD | 24 | RFC |
| 87 | 23 | 02A8 | 0000 | 0010 | 1010 | 1000 | GFL | 21 | R1B |
| 88 | 24 | 0490 | 0000 | 0100 | 1001 | 0000 | GFL | 36 | OCH |
| 89 | 25 | FFFF | 1111 | 1111 | 1111 | 1111 | LTI | 63 | NOP |
| 90 | 26 | B35F | 1011 | 0011 | 0101 | 1111 | BSM | 26 | NOP |
| 91 | 27 | DB5F | 1101 | 1011 | 0101 | 1111 | SG3 | 26 | NOP |
| 92 | 28 | 0297 | 0000 | 0010 | 1001 | 0111 | GFL | 20 | JLO |
| 93 | 29 | CC1F | 1100 | 1100 | 0001 | 1111 | HLM | 32 | NOP |
| 94 | 30 | D41F | 1101 | 0100 | 0001 | 1111 | WGM | 32 | NOP |
| 95 | 31 | 0031 | 0000 | 0000 | 0011 | 0001 | GFL | 1 | MIV |
| 96 | 32 | 005B | 0000 | 0000 | 0101 | 1011 | GFL | 2 | RTR |
| 97 | 33 | 041F | 0000 | 0100 | 0001 | 1111 | GFL | 32 | NOP |
| 98 | 34 | FFE7 | 1111 | 1111 | 1110 | 0111 | LTI | 63 | S1B |
| 99 | 35 | 0477 | 0000 | 0100 | 0111 | 0111 | GFL | 35 | JLO |
| 100 | 36 | B493 | 1011 | 0100 | 1001 | 0011 | BSM | 36 | CAV |
| 101 | 37 | DC9F | 1101 | 1100 | 1001 | 1111 | SG3 | 36 | NOP |
| 102 | 38 | 028E | 0000 | 0010 | 1000 | 1110 | GFL | 20 | CSS |
| 103 | 39 | FFFF | 1111 | 1111 | 1111 | 1111 | LTI | 63 | NOP |
| 104 | 40 | FFFF | 1111 | 1111 | 1111 | 1111 | LTI | 63 | NOP |
| 105 | 41 | B528 | 1011 | 0101 | 0010 | 1000 | BSM | 41 | R1B |
| 106 | 42 | A1C9 | 1010 | 0001 | 1100 | 1001 | DGD | 14 | SFC |
| 107 | 43 | 0533 | 0000 | 0101 | 0011 | 0011 | GFL | 41 | CAV |
| 108 | 44 | FFFF | 1111 | 1111 | 1111 | 1111 | LTI | 63 | NOP |
| 109 | 45 | FFFF | 1111 | 1111 | 1111 | 1111 | LTI | 63 | NOP |
| 110 | 46 | FFFF | 1111 | 1111 | 1111 | 1111 | LTI | 63 | NOP |
| 111 | 47 | FFFF | 1111 | 1111 | 1111 | 1111 | LTI | 63 | NOP |
| 112 | 48 | 565F | 0101 | 0110 | 0101 | 1111 | DIN | 50 | NOP |
| 113 | 49 | 07DF | 0000 | 0111 | 1101 | 1111 | GFL | 62 | NOP |
| 114 | 50 | 0057 | 0000 | 0000 | 0101 | 0111 | GFL | 2 | JLO |
| 115 | 51 | 00DF | 0000 | 0000 | 1101 | 1111 | GFL | 6 | NOP |
| 116 | 52 | C967 | 1100 | 1001 | 0110 | 0111 | HLM | 11 | S1B |
| 117 | 53 | D17F | 1101 | 0001 | 0111 | 1111 | WGM | 11 | NOP |
| 118 | 54 | FFE8 | 1111 | 1111 | 1110 | 1000 | LTI | 63 | R1B |
| 119 | 55 | 4529 | 0100 | 0101 | 0010 | 1001 | VC2 | 41 | SFC |
| 120 | 56 | 02AA | 0000 | 0010 | 1010 | 1010 | GFL | 21 | RFC |
| 121 | 57 | FFFF | 1111 | 1111 | 1111 | 1111 | LTI | 63 | NOP |
| 122 | 58 | 1E83 | 0001 | 1110 | 1000 | 0011 | TOB | 52 | ITC |
| 123 | 59 | 017F | 0000 | 0001 | 0111 | 1111 | GFL | 11 | NOP |
| 124 | 60 | 0017 | 0000 | 0000 | 0001 | 0111 | GFL | 0 | JLO |
| 125 | 61 | 0163 | 0000 | 0001 | 0110 | 0011 | GFL | 11 | ITC |
| 126 | 62 | 753F | 0111 | 0101 | 0011 | 1111 | SBO | 41 | NOP |
| 127 | 63 | 0746 | 0000 | 0111 | 0100 | 0110 | GFL | 58 | ROB |

The test conditions comprising the ROM instruction set are tabulated in Table III.

| | |
|---|---|
| GFL | False Ground |
| DT1 | Control Bit From I/O Logic |
| VC1 | Minimum Requirements Met |
| T0B | Character Top = 0 or Character Bottom = 49 |
| T8T | Tracker #8 Addressed; Use First Conditions |
| BNL | Tracked Cell Count Less Than Previous Count |
| CLS | Completion Last Scan |
| VC2 | Valid With Second Conditions |
| DIN | Decision Inhibit |
| T8C | Tracker #8 Addressed |
| TAC | Tracker Active |
| TC0 | Tracker Complete |
| SB0 | Status Bit 0 |
| SB1 | Status Bit 1 |
| SG1 | State Scan Counter State One Count |
| WGF | Width First Character Width Parameter |
| FCM | First Character Mode |
| DGD | Delay Counter Delta |
| BSM | Begin Scan |
| TMV | Tracker Marked Valid |
| HLM | Height Less Than Maximum Height Parameter |
| WGM | Width Less than or Equal to Maximum Width Parameter |
| SG3 | State Scan Counter Blanking Parameter |
| SG2 | State Scan Counter State Two Parameter |
| LTI | Transfer to Next Address |

Referring to Table III, the first test condition GFL is merely a false ground condition. The test condition DT1 directs the ROM 98d to remain in the tracker evaluation mode when a logic one level indicating a variable character pitch is received from the I/O logic unit 91 at the I19 input. More particularly, a transfer is made to the next succeeding page address. If a logic zero is received, however, a transfer is made to the address specified by the address code of the ROM instruction. Normally, ROM 98d exits from the tracker evaluation mode when the count of the state scan counter is equal to a state parameter count. Thereafter, the ROM enters the left character edge search mode.

A VC1 test condition occurs when tracker data of a tracker under evaluation has satisfied not only the height, width and tracked cell minimum requirements, but also the character center constraint.

The TOB test condition directs the ROM to test for the occurrence of either a character image top in row zero or a character image bottom in row 47. Referring to FIG. 7, the driver 182 transfers two constant values to the character top and bottom registers, respectively, when the tracker address decoder 111 supplies a tracker 9 signal. More particularly, the character top 150 register is loaded with a constant zero value referring to row zero, and the character bottom register 157 is loaded with a constant row 47 indication.

The T8T test condition directs the ROM to sense the output of the tracker address decoder 111 for a tracker 8 signal.

The BNL test condition refers to a comparison between a current tracked cell count and a previous tracked cell count of a prior scan under evaluation. A test is made to determine whether the current tracked cell count is lower than the previous tracked cell count. The test condition is true when the output of comparator 195 of FIG. 8 transitions to a logic one level.

The CLS test condition refers to a tracker completion which occurs during a last video scan.

The VC2 test condition directs the ROM to determine whether a second set of parameters provided by the parameter memory unit 138 is being used for a character evaluation mode. The VC1 test condition, as previously described, may be said to test for the occurrence of a first set of parameters for the tracker evaluation mode.

The DIN test condition is enabled by a decision inhibit signal from I/O logic unit 91. When the 114 input of the ROM transitions to a logic one level, the logic decision flow proceeds a system initialization mode without transferring data from SAM 30 to the RAM 33.

The T8C test condition refers to the addressing of tracker 8 by the tracker address decoder 111, and the use of a second group of state parameters. As before described, the parameter memory unit 138 is a 15 × 8 bit storage unit having stored therein four sets of parameters. Each parameter is an eight-bit value.

The TAC test condition directs the ROM to test for an active condition relative to a currently addressed tracker.

The TCO test condition refers to a test for a complete condition relative to a currently addressed tracker.

The SB0, SB1 and FCM test conditions are status conditions used by the ROM in its processing. In addition, the SB1 and FCM status conditions are forwarded to the I/O logic unit 91 to indicate one of three conditions in a character which has been located. The three conditions include the valid character condition, the character space condition, and the character reject condition.

The SG1 test condition refers to the occurrence of a state scan count which is greater than a state parameter used in the tracker evaluation mode.

The WGF test condition refers to the occurrence of a width value which is greater than a first character width parameter. Such condition is signaled by the comparator 176.

The DGD test condition refers to the condition wherein the count of the delay scan counter 187 is greater than the output of the delay arithmetic unit 185. Such condition is signaled by comparator 186 of FIG. 8.

The BSM test condition directs the ROM to test for the occurrence of a begin scan signal. The TMV test condition directs the ROM to mark a currently addressed tracker valid.

The HLM test condition refers to the occurrence of a height value at the output of arithmetic unit 155 which is less than a height parameter supplied by parameter memory unit 138. Such condition is signaled by comparator 165 of FIG. 6.

The WGM test condition directs the ROM to test for the condition wherein the width value at the output of the arithmetic unit 171 is less than or equal to a width parameter. The test condition is true when the output of comparator 176 of FIG. 7 is at a logic zero level.

The SG3 test condition refers to the condition wherein the state scan count of counter 188 is greater than a blanking parameter supplied by parameter memory unit 138.

The SG2 test condition refers to the condition wherein the state scan count is greater than a state parameter used during the left character boundary search.

The LTI test condition refers to a condition wherein the ROM 98 transfers from a current state in a page to a next succeeding state.

The output conditions comprising the ROM instruction set are tabulated in Table IV. Referring to Table IV, the RTC output condition indicates that the ROM shall address tracker 1 by resetting the tracker address counter 118.

TABLE IV

| OUTPUT CONDITIONS | |
|---|---|
| RTC | Address Tracker #1 (Reset Tracker Center) |
| ITC | Address Next Tracker (Increment Tracker Center) |
| STV | Set Tracker Valid |
| SOB | Set Status Bit 0 |
| ROB | Reset Status Bit 0 |

TABLE IV-continued
OUTPUT CONDITIONS

| | |
|---|---|
| S1B | Set Status Bit 1 |
| R1B | Reset Status Bit 1 |
| SFC | Set First Character Mode |
| RFC | Reset First Character Mode |
| CDC | Clear Delay Scan Counter |
| CSS | Clear State Scan Counter |
| OCH | Output Character |
| MIV | Merge If Valid |
| MTR | Merge Tracker |
| CAV | Clear All Valid Markers |
| SVM | Set Valid Marker |
| RVM | Reset Valid Marker |
| JHI | Jump High |
| JLO | Jump Low |
| LDT | Load Top Register |
| LDB | Load Bottom Register |
| LDW | Load Width Register |
| RTR | Reset Tracker |
| SBS | Store Black in Scan |
| NOP | No Operation |

The ITC output condition indicates that the next succeeding tracker shall be addressed by incrementing the tracker address counter 118. The STV output condition indicates that the currently addressed tracker shall be marked valid. The S0B output condition indicates that the status bit zero shall be set, and the R0B output condition indicates that the status bit zero shall be reset. The S1B output condition indicates that the status bit one shall be set, and the R1B output condition indicates that the status bit one shall be reset.

The SFC output condition indicates that the first character mode status bit shall be set. The RFC output condition indicates that the first character mode status bit shall be reset.

The CDC output condition indicates that the delay scan counter shall be reset. The CSS output condition indicates that the state scan counter shall be reset.

The OCH output condition indicates that the ROM shall issue a character presence signal. The MIV output condition indicates that the ROM shall control the merging of tracker information into the character top and bottom registers if a valid marker has been set for the tracker. The MTR output condition indicates that the tracker information shall be merged regardless of whether a valid marker has been set.

The CAV output condition indicates that the tracker valid storage register 99 shall be reset. The SVM output condition indicates that the ROM shall set a valid marker for a tracker being evaluated. The RVM output condition indicates that the ROM shall reset the valid marker of a tracker under evaluation.

The JHI output condition indicates that the ROM logic decision flow shall jump to a next succeeding page. The JLO output condition indicates that the ROM logic decision flow shall jump to a preceding page.

The LDT output condition indicates that the character top register 150 shall be loaded, and the LDB output condition indicates that the character bottom register 157 shall be loaded. The LDW output condition indicates that the width register 174 shall be loaded.

The RTR output condition indicates that the ROM shall issue a reset tracker signal to the tracker control logic unit of the currently addressed tracker. The SBS output condition indicates that the black cells detected in a video data stream shall be stored in the video bit register 192. The NOP output condition indicates a non-operational condition wherein no action is taken.

FIG. 21

Figure 21:
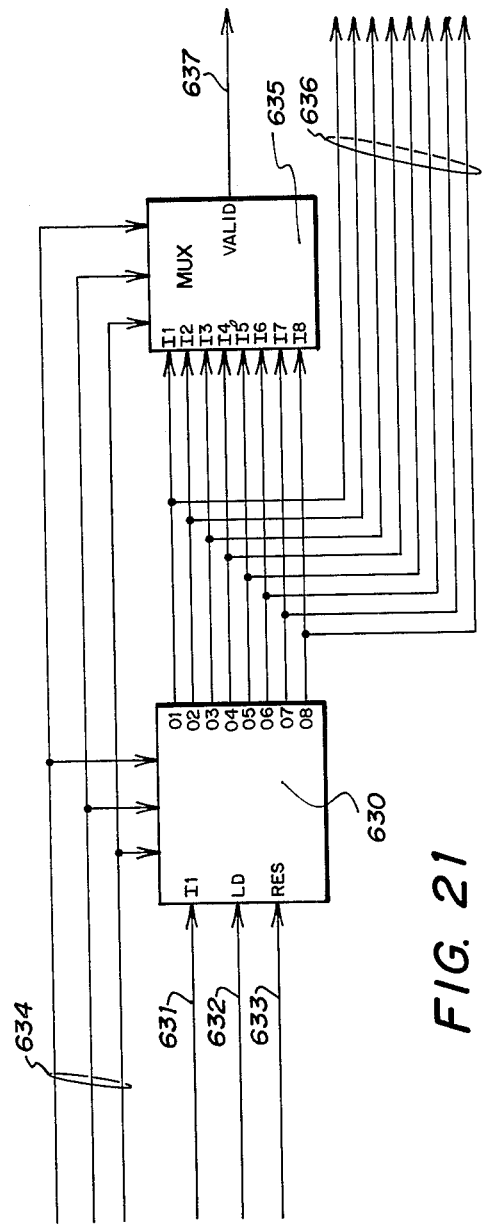
FIG. 21 is a logic diagram of the tracker valid storage register of FIG. 5.

FIG. 21 is a logic diagram of the tracker valid storage register 99 of FIG. 5.

The I1 input of an addressable latch 630 is connected by way of a control line 631 to the O16 output of ROM control unit 98. The load input to the latch is connected by way of a control line 632 to the O2 output of unit 98, and the reset input to the latch is connected by way of a control line 633 to the O3 output of unit 98.

The three least significant bits of the tracker address counter 118 address both the latch 630 and an eight-to-one multiplexer 635. The O1-O8 outputs of latch 630 are connected to the I1-I4 I8 inputs, respectively, of multiplexer 635. In addition, the O1-O8 outputs of latch 630 are applied by way of control lines 636 to the tracker control logic units of trackers 1-8, respectively. The valid output of multiplexer 635 is connected by way of a control line 637 to the I17 input of unit 98.

In operation, the addressable latch 630 and multiplexer 635 are addressed by the binary signals from tracker address counter 118 on lines 634. The counter 118 in turn is controlled by unit 98 which resets the counter to address tracker 1. Unit 98 thereafter addresses each succeeding tracker by incrementing the counter.

When a tracker under evaluation is to be designated a valid tracker, unit 98 applies a logic one valid marker signal by way of line 631 to the I1 input of latch 630. The unit 98 also applies a load command by way of control line 632 to load the valid marker signal into the addressed memory location. After each tracker has been evaluated, and the valid trackers marked by an appropriate signal stored in latch 630, unit 98 disables the load input to latch 630 and resets counter 118. As each tracker is addressed, the logic signal stored in the corresponding address of latch 630 is applied to multiplexer 635 and by way of lines 636 to the tracker control logic unit of the addressed tracker. The unit 98 thus is provided with a indication as to the valid status of an address tracker by way of control line 637, and those trackers having a valid marker are enabled to enter a complete state.

Upon command of unit 98, the memory locations of addressable latch 630 may be cleated by a pulse applied by way of control line 633 to the reset input of latch 630.

FIG. 22

Figure 22:
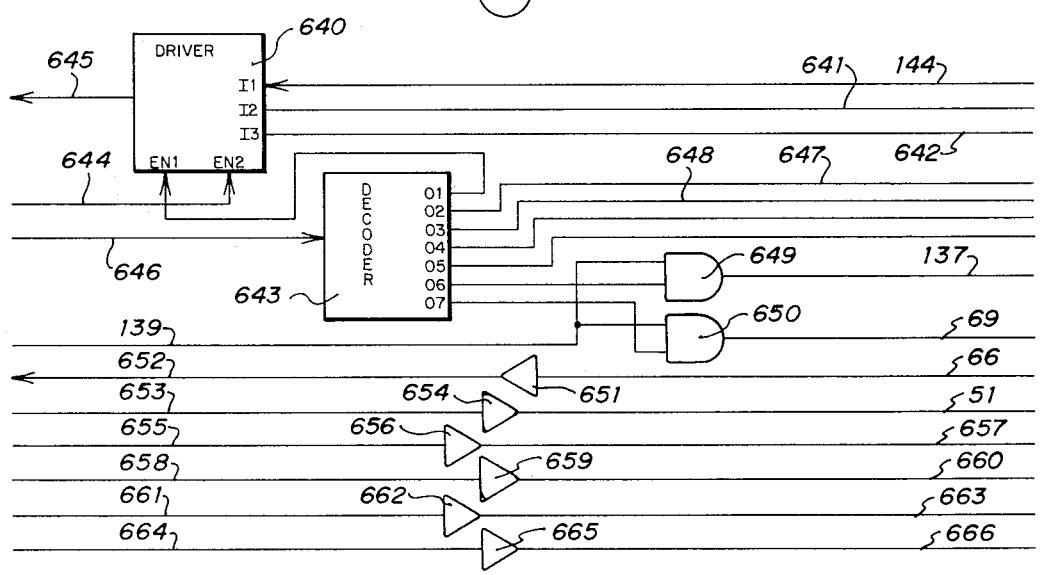
FIG. 22 is a logic diagram of the I/O logic unit of FIG. 5.

FIG. 22 is a logic diagram illustration of the I/O logic unit 91 of FIG. 5.

The I1 input of a driver 640 is connected by way of control cable 193 to the output of character scan register 191 of FIG. 8. The I2 input of driver 640 is connected by way of a control line 641 to the O15 output of ROM control unit 98, and the I3 input of the driver is connected by way of a control line 642 to the O14 output of unit 98. The EN1 enable input of driver 640 is connected to the O1 output of a decoder 643, and the EN2 enable input of the driver is connected by way of a control line 644 to an output of the I/O interface unit 17 of FIG. 1. The output of driver 640 is applied to a control cable 645 leading to an input of the interface unit 17.

Driver 640 is a tristate driver of a type such as that manufactured and sold by Texas Instruments, Incorporated of Dallas, Texas, and identified as Model No. SN74368.

The input to decoder 643 is a three-bit code carried by a data cable 646 leading from an output of interface unit 17. The O2 output of decoder 643 is connected to a control line 647 leading to the select input of multiplexer 136. The O3–O5 outputs of decoder 643 are applied to the I2 input of multiplexer 136. The O6 output of decoder 643 is connected to one input of a NAND gate 649, the output of which is applied to control line 137 leading to the reset input of character scan counter 189 of FIG. 8. The O7 output of decoder 643 is connected to one input of an AND gate 650, the second input of which is connected to the second input of gate 649 and to data cable 139. The output of AND gate 650 is applied to control line 69 leading to the reset inputs of unit 98, Frame control logic unit 63, input address counter 67, output address counter 68 and FIF0 178. The O7 output of unit 98 is connected by way of control line 66 to the input of a line driver 651. The output of driver 651 is applied by way of a control line 652 to an input of interface unit 17 of FIG. 1. A 55 nanosecond clock signal is carried by a control line 653 leading from an output of interface unit 17 to the input of a line receiver 654. The output of receiver 654 is applied to control line 51. A 220 nanosecond clock signal is carried by a control line 655 leading from an output of interface unit 17 to the input of a line receiver 656. The output of receiver 656 is connected to a control line 657 leading to the clock inputs of tracker valid storage register 99, tracker address counter 118 and ROM control unit 98 of FIG. 5.

A control line 658 is connected to an output of interface unit 17 and to the input of a line receiver 659, the output of which is applied to a control line 660 leading to the load input of parameter memory unit 138 of FIG. 5. A control line 661 is connected to an output of interface unit 17 and to the input of a line receiver 662. The output of receiver 662 is connected by way of a control line 663 to the I14 input of unit 98. A control line 664 is connected to an output of interface unit 17 and to the input of a line receiver 665, the output of which is connected by way of a control line 666 to the I19 input of unit 98.

In operation, the system controller 18 of FIG. 1 applies a unit code to the input of decoder 643 to select multiplexer 136 to the O3–O5 outputs of the decoder. In addition, the system controller 18 applies a logic one pulse to cable 139 to enable gate 649 and 650. The character presence unit 12 of FIG. 1 thereby is initialized.

After system initialization, the system controller 18 applies parameter data to cable 139 for storage in the parameter memory unit 138. The parameter storage operation occurs under the control of unit code applied by way of data cable 646 to decoder 643. Thus, a parameter occurring on data cable 139 is stored into the parameter memory unit 138 at the address indicated by the O3–O5 output of decoder 643.

Upon receipt of video data, the character presence unit 12 detects and locates character information within RAM 33 of FIG. 4. During such processing, system controller 18 provides a 55 nanosecond clock and a 220 nanosecond clock to the character presence system by way of line receivers 654 and 656, respectively. In addition, the system controller synchronizes the operation of the character presence unit 12 with the units 13–16 of FIG. 1 by issuing an inhibit signal by way of line receiver 662. The system controller also signals the occurrence of variable pitch characters within an information stream by way of line receiver 665.

ROM 98 supplies a character presence signal by way of line 66 to driver 651, a status bit one signal to to line 641 and a first character mode status signal to line 642. The lines 641 and 642 comprise a two-bit code identifying the occurrence of a valid character, a character space or a character reject condition.

The character scan count of character scan register 191 of FIG. 8 is applied by way of line 144 to the I1 input of driver 640. When both the EN1 and EN2 input of driver 640 are enabled, the I1–I3 inputs are applied to control cable 645 leading to interface unit 17. Thus, during a character presence operation, the system controller 18 receives a character presence signal, a status bit one signal, a first character mode status signal, and a character scan count.

FIG. 23

Figure 23:
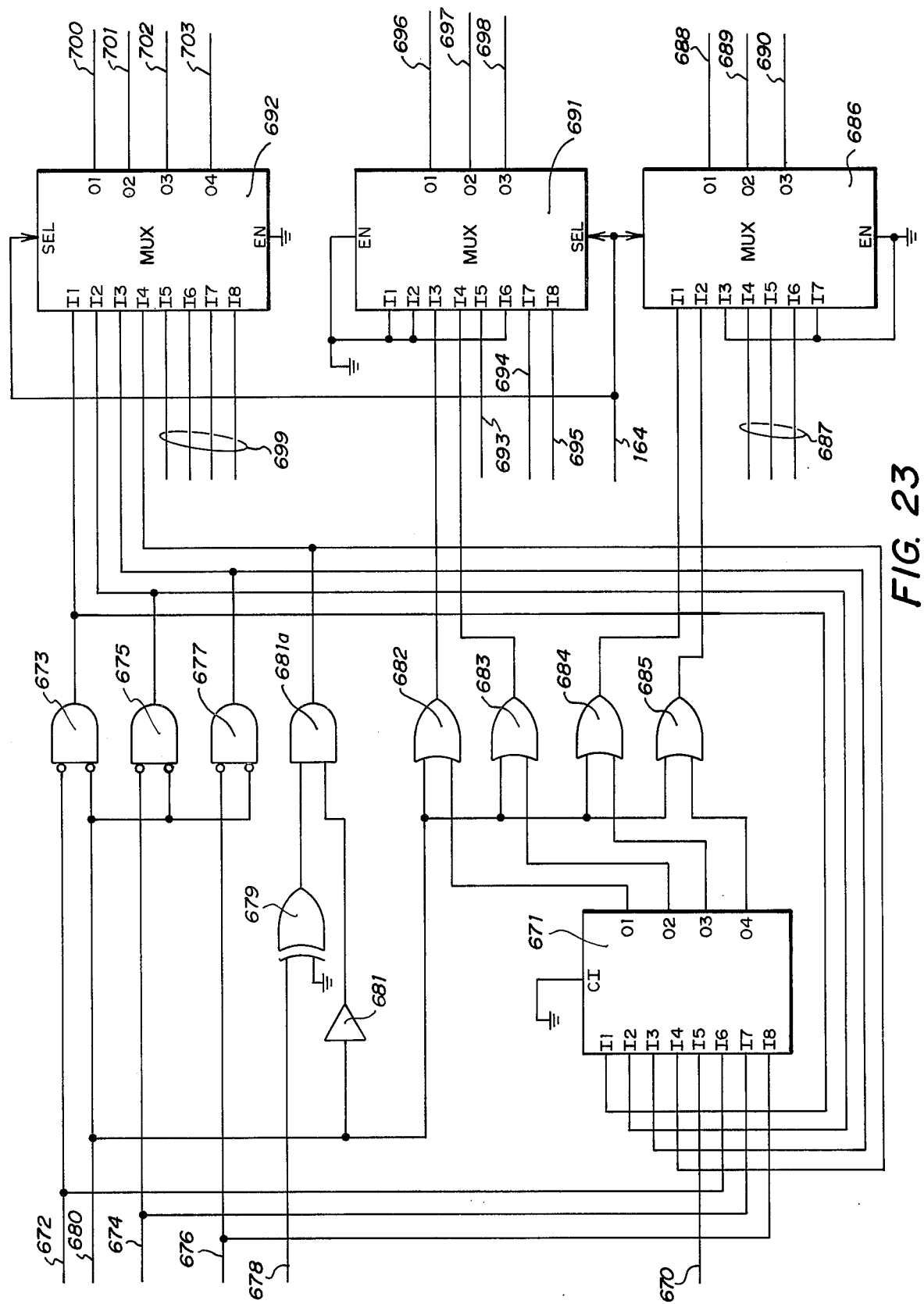
FIG. 23 is a logic diagram of the top/bottom limit arithmetic unit of FIG. 6.

FIG. 23 is a logic diagram of the top/bottom limit arithmetic unit 156 of FIG. 6.

The bit one or most significant bit of the six-bit output of arithmetic unit 155 is carried by a control line 670 to the I5 input of an adder 671. The bit two output of arithmetic unit 155 is applied by way of a control line 672 to one input of a NAND gate 673 and to the I6 input of adder 671. The bit three output of arithmetic unit 155 is connected by way of a control line 674 to one input of a NAND gate 675 and to the I7 input of adder 671. The bit four output of arithmetic unit 155 is applied by way of a control line 676 to one input of a NAND gate 677 and to the I8 input of adder 671. The bit five output of arithmetic unit 155 is applied by way of a control line 678 to one input of an EXCLUSIVE OR gate 679. The bit six output of arithmetic unit 155 is connected by way of a control line 680 to second inputs of gates 673, 675, and 677. Control line 680 also is connected to the input of an inverter 681 and to one input of OR gates 682–685. The output of inverter 681 is connected to one input of an AND gate 68a, the second input of which is connected to the output of gate 679.

The CI (carry in) input to adder 671 is connected to ground, and the O1 output of the adder is connected to a second input of OR gate 682. The O2 output of adder 671 is connected to a second input of OR gate 683, and the O3 output of the adder is connected to a second input of OR gate 684. The O4 output of adder 671 is connected to a second input of OR gate 685, the output of which is connected to the I2 input of a multiplexer 686.

The I1 input to multiplexer 686 is connected to the output of Or gate 684, and the I3 and I7 inputs are each connected to the enable input of the multiplexer and to ground. The I4–I6 inputs to multiplexer 686 are connected by way of lines 687 to the bit three-bit five lines of control cable 116, respectively. The O1–O3 outputs of multiplexer 686 are applied to lines 688–690, respectively. The select input to multiplexer 686 is connected to the select input of a multiplexer 691, to the select input of a multiplexer 692 and to control line 164.

The I1, I2, I6 and enable inputs to multiplexer 691 are connected to ground. The I3 input to multiplexer 691 is connected to the output of OR gate 682, and the I4 input to the multiplexer is connected to the output of OR gate 683. The I5 input to multiplexer 691 is connected by way of a control line 693 to the bit five line of the six bit control cable 117. The I7 and I8 inputs of multiplexer 691 are connected by way of control lines 694 and 695 to the bit one and bit two lines, respectively, of control cable 116. The O1–O3 outputs of multiplexer 691 are applied to control lines 696–698, respectively.

The enable input to multiplexer 692 is connected to ground. The I5-I8 inputs to multiplexer 692 are connected by way of control lines 699 to the bit one-bit four lines, respectively, of control cable 117. The I1 input to multiplexer 692 is connected to the output of NAND gate 673 and to the I1 input of adder 671. The I2 input to multiplexer 692 is connected to the output of NAND gate 675 and to the I2 input of adder 671. The I3 input to multiplexer 692 is connected to the output of NAND gate 677 and to the I3 input to adder 671. The I4 input to multiplexer 692 is connected to the output of AND gate 686 and to the I4 input to adder 671. The O1-O4 outputs of multiplexer 692 are connected to control lines 700–703, respectively.

In operation, arithmetic unit 155 detects the height of a character within a 24 × 32 bit memory mosaic stored in SAM 30. The six-bit output of arithmetic unit 155 is applied to lines 670, 672, 674, 676, 678 and 680.

A logic one level on line 680 indicates that the character image has a height exceeding the 32-bit memory mosaic length in SAM 30. When control line 680 transitions to a logic one level, the output of adder 671 provides a row 31 indication. If the line 680 is at logic zero level, however, the output of adder 671 provides a row number equivalent to the top row of the character image as provided to its I1-I4 inputs plus the height of the character image as supplied by arithmetic unit 155. The outputs of OR gates 682–685 thus either indicate the bottom row of a character image, or indicate that the character image is too tall. The output of NAND gates 673, 675 and 677, and AND gate 686 provide the difference between the height of the character image divided by 2 and the value 15. If the character image is too tall, however, the outputs of the gates are forced to a logic zero level.

The output of character top register 150 and character bottom register 157 of FIG. 6 are applied to multiplexers 686, 691 and 692 by way of cables 116 and 117 as before described. Under the control of the mosaic top arithmetic unit 161, the multiplexers are selected to either the outputs of the character top and bottom registers, or the outputs of NAND gates 673, 675, and 677, AND gate 686, and OR gates 682–685. If the arithmetic unit 161 senses that the top of the character image exceeds the top row of the 24 × 32 bit memory mosaic in SAM 30, then the arithmetic unit applies a logic one pulse by way of line 164 to the select input of the multiplexers. The multiplexers are then selected to the character top and bottom register outputs. If line 164 is at a logic zero level, however, the multiplexers are selected to the outputs of the logic gates.

The O1-O4 outputs of multiplexer 692 and the O1 output of multiplexer 691 collectively provide a top character limit. The O2 and O3 outputs of multiplexer 691, and the O1-O3 outputs of multiplexer 686 collectively provide a character bottom limit. When the line 164 is at a logic one level, the output of the character top register 150 is selected as the character top limit. Further, the output of the character bottom register 157 is selected as the character bottom limit. When the control line 164 is at a logic zero level, however, the character top limit is equivalent to the difference between the character image height divided by 2 and the value 15 if the character image is not too tall. The character bottom limit is equivalent to the top row of the character image plus the height of the character image. If the character image is too tall, the character top limit is forced to zero, and the character bottom limit is forced to the value 31.

FIG. 24

Figure 24:
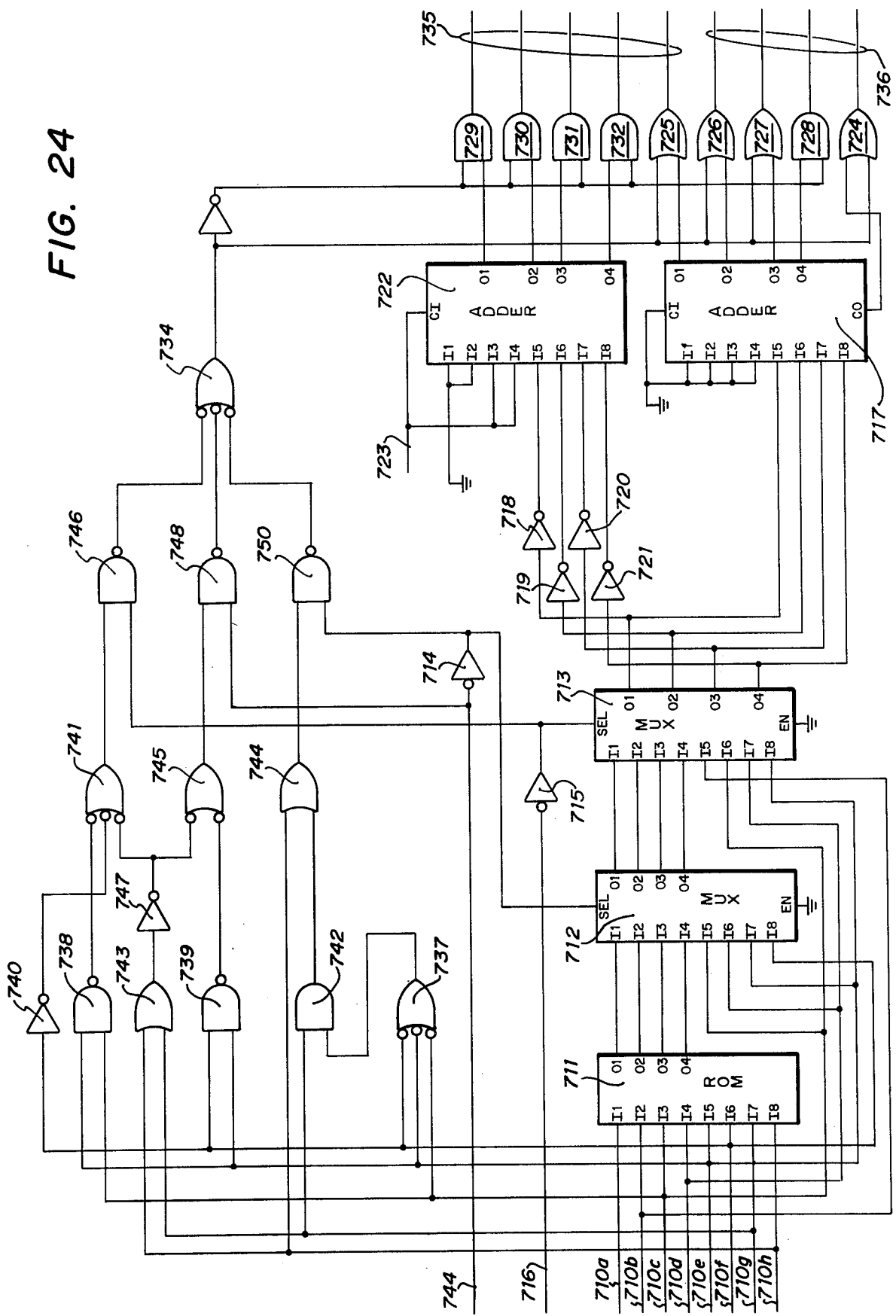
FIG. 24 is a logic diagram of the right/left limit arithmetic unit of FIG. 7.

FIG. 24 illustrates the right/left limit arithmetic unit 175 of FIG. 7 in logic diagram form.

The eight-bit output of multiplexer 173 of FIG. 7 is connected by way of control lines 710a–710h to the I1-I8 inputs of a 256 × 4 bit ROM 711. The O1-O4 outputs of ROM 711 are connected to the I1-I4 inputs, respectively, of a multiplexer 712. The I5-I8 inputs to multiplexer 712 are connected to lines 710c–710f, respectively. The enable input to the multiplexer is connected to ground. The O1-O4 outputs of multiplexer 712 are connected to the I1-I4 inputs, respectively, of a multiplexer 713. The select input of multiplexer 712 is connected to the output of an inverter 714.

The I5 input to multiplexer 713 is connected line 710b, the I6 input is connected to line 710c, and I7 input is connected to line 710d, and the I8 input is connected to line 710e. The select input to multiplexer 713 is supplied by the output of an inverter 715, the input to which is connected by way of a control line 716 to an operator control panel (not shown). The enable input to multiplexer 713 is connected to ground. The O1-O4 outputs of multiplexer 713 are applied to the I5-I8 inputs, respectively, of an adder 717. The O1-O4 outputs also are applied through inverters 718–721 to the I5-I8 inputs, respectively, of an adder 722.

The CI (carry-in) input to adder 717 is connected to the I1 and I2 inputs of the adder and to ground. The I3 and I4 inputs to adder 717 are connected to a logic one source 723. The CO (carry-out) output of adder 717 is connected to one input of an OR gate 724, and the O1 output of the adder is connected to one input of an OR gate 725. The O2 output of adder 717 is connected to one input of an OR gate 726, and the O3 output of the adder is connected to one input of an OR gate 727. The O4 output of adder 717 is connected to one output of an AND gate 728.

The CI input of adder 722 is connected to the logic one source 723, and to the I3 and I4 inputs of the adder. The I1 and I2 inputs of adder 722 are each connected to ground. The O1 output of adder 722 is connected to one input of an AND gate 729, and the O2 output of the adder is connected to one input of an AND gate 730. The O3 output of adder 722 is connected to one input of an AND gate 731, and the O4 output of the adder is connected to one input of an AND gate 732.

Second inputs to AND gates 729–732 and AND gate 728 are connected to the output of an inverter 733, the input of which is connected to second inputs of OR gates 725–727. The input to inverter 733 also is connected to the output of a NOR gate 734, and to the second input of OR gate 724.

The outputs of AND gates 729–732 collectively indicate the left boundary limit of a character image, and are applied by way of lines 735 to the I3 input of FIF0 178 of FIG. 7. The outputs of OR gates 725–727, AND gate 728 and OR gate 724 collectively indicate the right limit of a character image which is applied by way of lines 736 to the I4 input of FIF0 178.

Line 710c also is applied to one input of a NOR gate 737 and to one input of a NAND gate 738. Line 710e also is connected to a second input of NOR gate 737, to one input of a NAND gate 739 and to a second input of NAND gate 738. Line 710f further is connected to a third input of NOR gate 737, to a second input of NAND gate 739 and through an inverter 740 to one input of a NOR gate 741. Line 710g also is connected to one input of a NAND gate 742, and to one input of an OR gate 743. Line 710h further is connected to one input of an OR gate 744 and to a second input of OR gate 743.

The output of NAND gate 738 is connected to a second input of NOR gate 741, the output of which is connected to one input of a NAND gate 746. The output of OR gate 743 is applied through an inverter 747 to a third input of NOR gate 741 and to a second input of NOR gate 745. The output of NOR gate 737 is connected to a second input of NAND gate 742, the output of which is applied to a second input of OR gate 744. The output of NOR gate 745 is applied to one input of a NAND gate 748, the output of which is applied to one input of NOR gate 734. A second input to NAND gate 748 is connected to the input of inverter 714 and to a control line 749 leading to the operator console.

A second input to NAND gate 746 is connected to the output of inverter 715, and the output of NAND gate 746 is connected to a second input of NOR gate 734. The output of OR gate 744 is connected to one input of a NAND gate 750, the second input to which is connected to the output of inverter 714 and to the select input of multiplexer 712. The output of NAND gate 750 is connected to a third input of NOR gate 734.

In operation, the eight-bit character width output of multiplexer 173 is applied to the (I1-)I1-I8 inputs of ROM 711, to the I5-I8 inputs of multiplexer 712 and to the I5-I8 inputs of multiplexer 713. The six least significant bits of the width value also are applied through the logic gates leading to NOR gate 734. The output of NOR gate 734 provides an indication of whether the character image width is greater than the 32 × 24 bit memory mosaic of SAM 30.

Control lines 716 and 749 are coded to provide a one scan per sample, a two scan per sample, or a three scan per sample resolution. For example, if line 716 is at a logic one level, a one scan per sample resolution is selected. If line 716 is at a logic zero level, however, either a two scan per sample or a three scan per sample resolution may be selected. If line 749 is at a logic one level, a two scan per sample resolution is selected. With line 749 at a logic zero level, however, a three scan per sample resolution is selected.

Multiplexer 712 selects to the I1-I4 inputs when the output of inverter 714 is at a logic one level, and to the I5-I8 inputs when the inverter output is at a logic zero level. Multiplexer 713 selects to the I5-I8 inputs when the output of inverter 715 is at a logic one level, and to the I1-I4 inputs when the inverter output is at a logic zero level. Thus, for a one scan per sample resolution, multiplexer 712 may be selected to either its I1-I4 inputs or I5-I8 inputs. Multiplexer 713, however, must be selected to the outputs of multiplexer 712. The O1-O4 outputs of multiplexer 713 thereby provide a value equivalent to the character width applied to the inputs of ROM 711 divided by 2. For two and three scans per sample resolutions, the output of multiplexer 713 will provide a value equivalent to the character width divided by twice the resolution.

If the width of the character image stored in SAM 30 does not exceed the width of the 32 × 24 bit memory mosaic in SAM 30, the output of NOR gate 734 is at a logic zero level. Gates 724-732 are enabled to gate the outputs of adders 722 and 717 to the I3 and I4 inputs, respectively, of FIFO 178. If the character image is too wide, however, the output of NOR gate 734 transitions to a logic one level to force the outputs of gates 729-732 and 728 to a logic zero level. Further, the outputs of gates 724-727 are forced to a logic one level. The left character image limit thus is a logic zero, while the right character image limit is a binary 11101.

The ROM 711 performs a divide by six operation upon the character width input. More particularly, for a width between zero and five, the ROM output is a binary zero. For a width between 6 and 11, the ROM input is a binary one. Further, the ROM output is a binary two for a width between 12 and 17, a binary three for width between 18 and 23, and a binary four for width between 24 and 29. The ROM output is a binary five for a character width between 30 and 35, a binary six for width between 36 and 41, and a binary seven for a width between 42 and 47. In addition, the ROM output is a binary eight for a width between 48 and 41 and a binary nine for a width between 52 and 57. Further, the ROM output is a binary 10 for a width between 58 and 63 and a binary 11 for a width between 64 and 69.

FIGURE 25

Figure 25:
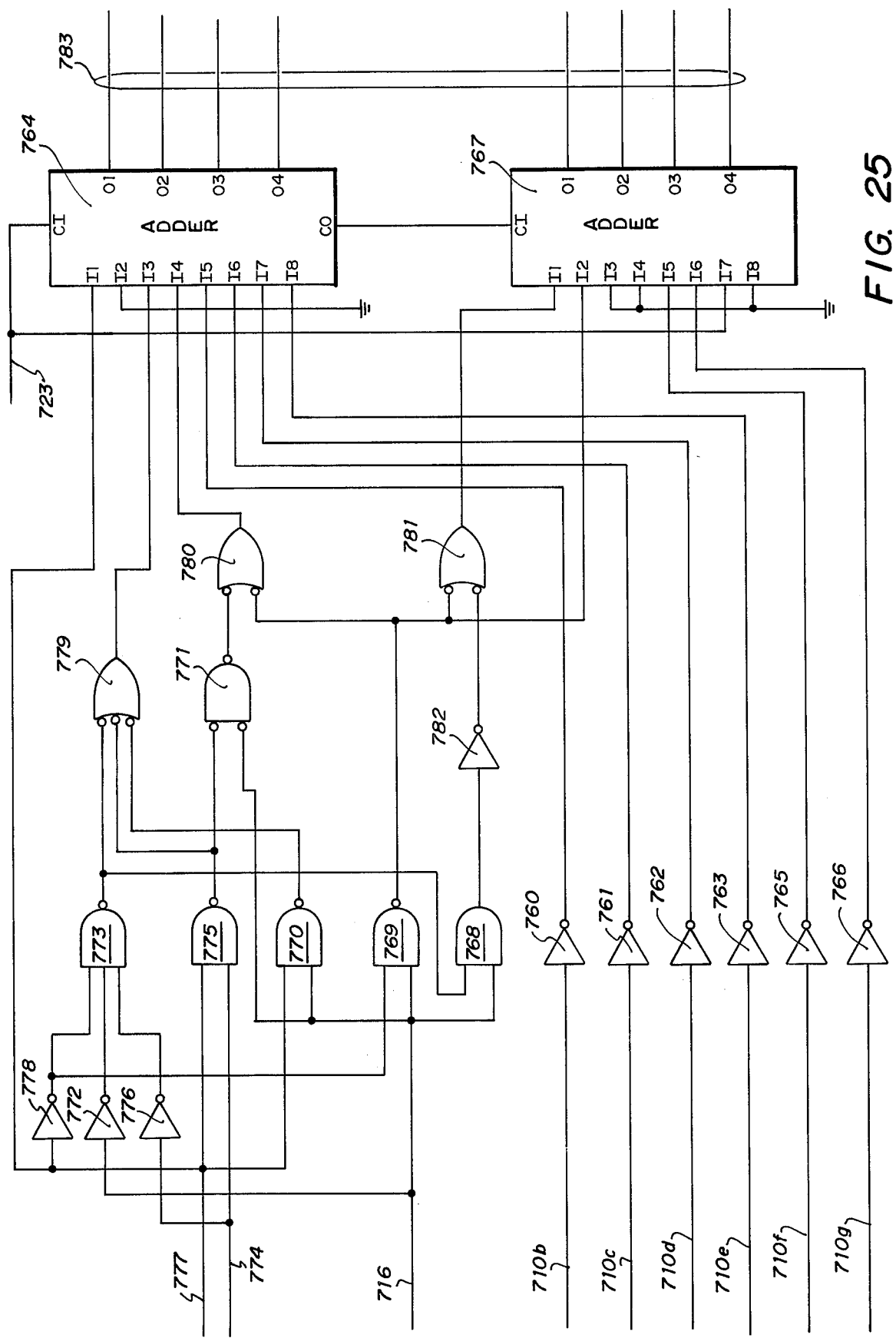
FIG. 25 is a logic diagram of the delay arithmetic unit of FIG. 8.

FIG. 25 is a detailed logic diagram of the delay arithmetic unit 185 of FIG. 8.

Signals on control lines 710b-710e of FIG. 23 are applied through inverters 760-763 to the I5-I8 inputs, respectively, of an adder 764. Control lines 710f and 710g are applied through inverters 765 and 766 to the I5 and I6 inputs, respectively, of an adder 767. Further, control line 716 is connected to one input of an AND gate 768, to one input of a NAND gate 769, to one input of a NAND gate 770, to one input of an AND gate 771, and through an inverter 772 to one input of a NAND gate 773. The output of inverter 714 of FIG. 23 is applied by way of a control line 774 to one input of a NAND gate 775, and through an inverter 776 to a second input of NAND gate 773. A control line 777 leading from the operator console (not shown) is connected to the I1 input of adder 764, to the input of an inverter 778, to a second input of NAND gate 775, and to a second input of NAND gate 770.

The output of inverter 778 is applied to a third input of NAND gate 773 and to a second input of NAND gate 769. The output of NAND gate 773 is connected to one input of a NOR gate 779 and to a second input of AND gate 768. The output of NAND gate 775 is connected to a second input of NOR gate 779 and to a second input of AND gate 771. The output of NAND gate 770 is connected to a third input of NOR gate 779. The output of NAND gate 769 is connected to one input of a NOR gate 780, to the I2 input of adder 767 and to one input of a NOR gate 781. The output of AND gate 768 is applied through an inverter 782 to a second input of NOR gate 781.

The output of AND gate 771 is connected to a second input of NOR gate 780, the output of which is connected to the I4 input of adder 764. The output of NOR gate 779 is connected to the I3 input of adder 764. The output of NOR gate 781 is connected to the I1 input of adder 767.

The CI (carry in) input of adder 764 is connected to the logic one source 723, and the I2 input to the adder is connected to ground. The CO output of adder 764 is connected to the CI input of adder 767. The I3, I4 and I8 inputs to adder 767 are connected to ground. The O1–O4 outputs of adder 764 and the O1–O3 outputs of adder 767 are applied to lines 783 leading to the I1 input of comparator 186 of FIG. 8.

In operation, bits two-five of the eight bit output of multiplexer 173 are applied to the I-I8 inputs of adder 764, and bits six and seven of the multiplexer output are applied to the I5 and I6 inputs of adder 767. Either a one, a two or a three scan per sample resolution is selected as before described by the two bit binary code on lines 716 and 774. If the line 716 is other than a logic one, the size of SAM 30 must be increased from the 24-scan width as before described. More particularly, if line 716 is at a logic zero level and line 774 is at a logic one level, SAM 30 must have a width of 72 scans. If both lines 716 and 774 are at a logic zero level, then the SAM 30 must be 48 scans in width.

Line 777 signals the occurrence of hand print information in the video stream. If the line 777 is at a logic one level, a delay of 25 scans is required of the delay logic unit 25 of FIG. 4. If line 777 is at a logic zero level, however, a delay of only 12 scans is required.

The output of adders 764 and 767 provide a seven-bit delay count which may be represented by:

$$\text{Delay} = D + S/2 - W/2, \tag{D}$$

where $D$ is the scan width of the delay logic unit 25 of FIG. 4, $S$ is the scan width of SAM 30, and $W$ is the character width as provided by the width arithmetic unit 171 of FIG. 7.

FIGURE 26

FIG. 26 illustrates a representative video image supplied by a video sensor scanning the numerals 1–9 printed on a document surface.

The numeral 1 indicated generally by reference number 785 of FIG. 26 may be detected and located by prior character detection systems utilizing vertical search, horizontal search or combined vertical and horizontal search techniques. Such prior systems cannot, however, reliably detect the numerals 2 and 3 generally represented by reference numbers 786 and 787, respectively. The character overlap illustrated by the letter y represented generally by reference number 788, the inverted letter y represented generally by reference number 789 and the numeral 2 is another source of error. Reading reliability in prior recognition systems also is compromised when a touching of characters occurs as illustrated by the black video cells 784 intermediate to the numerals 2 and 3.

The tracker method described herein, however, reliably detects and locates the numerals 2 and 3 within backgrounds such as those illustrated in FIG. 26. More particularly, the letter y and the inverted letter y are not selected for output to a character recognition system because the letters do not satisfy the vertical difference criteria as indicated by comparator 162 of FIG. 6. The numerals 2 and 3, however, meet the vertical difference criteria. The intermediate cells 784 do not interfere with the detection of characters since noise between characters is ignored during the tracker blanking state.

The numerals 4 and 5 represented generally by reference numbers 790 and 791, respectively, further illustrate an overlapping between characters. The numeral 5 further is a broken numeral. Either of these conditions would substantially compromise the reading reliability of prior detection systems. The reading reliability of the tracker method of the present invention, however, is not compromised. More particularly, a first tracker locates the right boundary of the character segment 792 upon satisfying the start condition represented by Equation, and a second tracker locates the right boundary of character segment 793 upon satisfying the start condition. The left boundary of character 792 is located when the first tracker enters a completion state, and the right boundary of character segment 793 is located when the second tracker enters a completion state. During a merge operation, the top register of the tracker tracing character segment 792 is loaded into the character top register 150 of FIG. 6, and the bottom register of the tracker tracing character segment 793 is loaded into the character bottom register 157. Thus, the numeral 5 is located both vertically and horizontally regardless of the overlap between the numerals 4 and 5, and the break between segment 792 and segment 793.

The right boundary of the numeral 4 is located when a third tracker satisfies the start condition. The background noise outside of a character segment 794 is disregarded since the adjacency condition represented by Equation would not not be met during the vertical scans in which they would appear.

The numeral 6 represented generally by reference number 796 is surrounded in video noise. The noise is ignored during the tracing of the numeral since the background noise would meet neither the start condition nor the valid condition represented by Equations B and C. Further, the noise between the numeral 6 and the numeral 7 represented generally by reference number 797 is ignored as it occurs during a tracker blanking state. The numeral 9 represented generally by the reference number 798 is comprised of broken segments, and is treated in a manner similar to that described with the tracing of segments 792 and 793 of the numeral 5. Such broken segments present no problem to the tracker method of the present invention so long as the broken segments collectively satisfy the validity condition.

FIGURE 27

FIG. 27 illustrates the operation of two trackers tracing the numeral 5 within an information field including touching characters.

Referring to FIG. 27, the numerals 2 and 5 are represented generally by reference numbers 802 and 803. The black video cells 804 connect the numerals 2 and 5 to form touching characters. In detecting and locating the numerals 2 and 5, the right boundary of the numeral 5 at black cell 803a is located by a first tracker upon satisfying the start condition. The first tracker then continues to track the horizontal segment of the numeral 5 on a scan to scan basis. A second tracker locates a second right boundary of the numeral 5 at cell 803b, and continues to track the lower circular segment of the numeral on a scan to scan basis. As the numeral 5 is traced by the two trackers in the leftward direction, an overlap of tracker operation occurs in the area of a segment 803c.

The left boundary of the numeral 5 is located upon the completion of the first tracker at vertical scan 805. If the first tracker had not entered a complete state during a left boundary search, however, the left boundary could have been declared in scan 806. Scan 806 is the scan during which a minimum number of video cells are traced by trackers with valid markers.

FIGURE 28

FIG. 28 illustrates overlapping characters in a video data stream wherein a plus sign is interposed between two X's.

Prior systems utilizing a vertical search, horizontal search or a combination of vertical and horizontal searches are not able to detect three distinct characters in the extreme case illustrated in FIG. 28. No difficulty is experienced by the tracker method of the present invention, however, as distinct and separate vertical and horizontal seraches are not performed. Rather, the start, adjacency and validity conditions controlling the operation of the trackers provides for the detection and location of each of the three distinct characters.

In a right to left scan of the letter X represented generally by reference number 807, a first tracker satisfies a start condition and commences to trace the character at black cell 807a. Concurrently, a second tracker also satisfies the start condition and commences to trace the letter at the black cell 807b. As the character is vertically scanned from right to left, the two trackers continue to trace the character and overlap in tracing a segment 807c. The overlap occurs because the black cells of the segment satisfy the adjacency condition for each of the two trackers. The right boundary of character 807 is located by each tracker upon meeting the start condition. Further, the left boundary of the character 807 is located when the two trackers each enter the completion state during the vertical scan including black cells 807d and 807e.

During the vertical scan of cells 807d and 807e, a third tracker satisfies a start condition and begins tracing the plus sign represented generally by reference number 808 beginning at black cell 808a. The trace continues from right to left on a scan by scan basis until the vertical scan including the blck cell 809b occurs. The third tracker then enters a completion state to locate the left boundary of the character 808. It is to be understood that the third tracker does not attempt to trace black cells 809a and 809b of the letter X represented generally by reference number 809, as neither of the cells satisfy an adjacency condition for the third tracker. The letter X indicated by reference number 809 thus is tracked in the same manner as described for the letter X indicated by reference number 807.

VARIABLE AND PROPORTIONAL PITCH CHARACTERS

The invention as before described herein has been directed to the detection and location of characters having a fixed pitch. That is, the number of characters per scan remains fixed.

Fixed character pitch may be accommodated through the proper selection of two state parameters stored in parameter memory unit 138, and supplied by way of line 143 to comparator 190 of FIG. 8. More particularly, a state one parameter is applied to comparator 190 during the tracker evaluation mode of ROM 98, and a state three parameter is applied to comparator 190 during a blanking state. The state one and state three parameters are selected so that the left boundary of a character occurs within either the tracker evaluation mode or during a left boundary search. In the preferred embodiment as before described, the delay logic unit 25 of FIG. 4 provides a 12-scan delay and the SAM 30 is 24 scans wide. Thus, a character may be centered in SAM 30 every 36 scans. Further, 24 scan periods occur between the center of a character in one memory mosaic of SAM 30 and the trailing edge of a next occurring character.

In the first character mode of ROM 98d of FIG. 19, a tracker evaluation, a left boundary search, and a character evaluation must occur within 36 scans. As before described, a character image is qualified and centered in SAM 30 during a character evaluation mode. The transition from the first character mode to a left boundary search occurs when the width count of a valid tracker is greater than or equal to a first character width parameter, or when a valid tracker enters a completion state. The left boundary search occurs within a fixed 10-scan period, and is followed by the character evaluation state.

In the second character mode, a blanking state is initiated immediately upon the occurrence of a leading edge of a memory mosaic of SAM 30. The duration of the blanking state is controlled by the state three parameter, which is two scan periods for a fixed character pitch. The blanking state is followed in order by a tracker evaluation state, a left boundary search and a character evaluation state. The duration of the tracker evaluation during the second character mode is dependent upon the character pitch. If the binary information stream exhibits a fixed character pitch, the tracker evaluation state is completed either after a preferred 22 scan periods as set by the state one parameter, or upon a valid tracker entering a completion state with no other trackers marked valid. If the binary information stream exhibits a variable pitch, however, the tracker evaluation state is complete only when a valid tracker enters a complete state and no other trackers are marked valid. A state one parameter is not used under variable pitch conditions.

Figure 29:
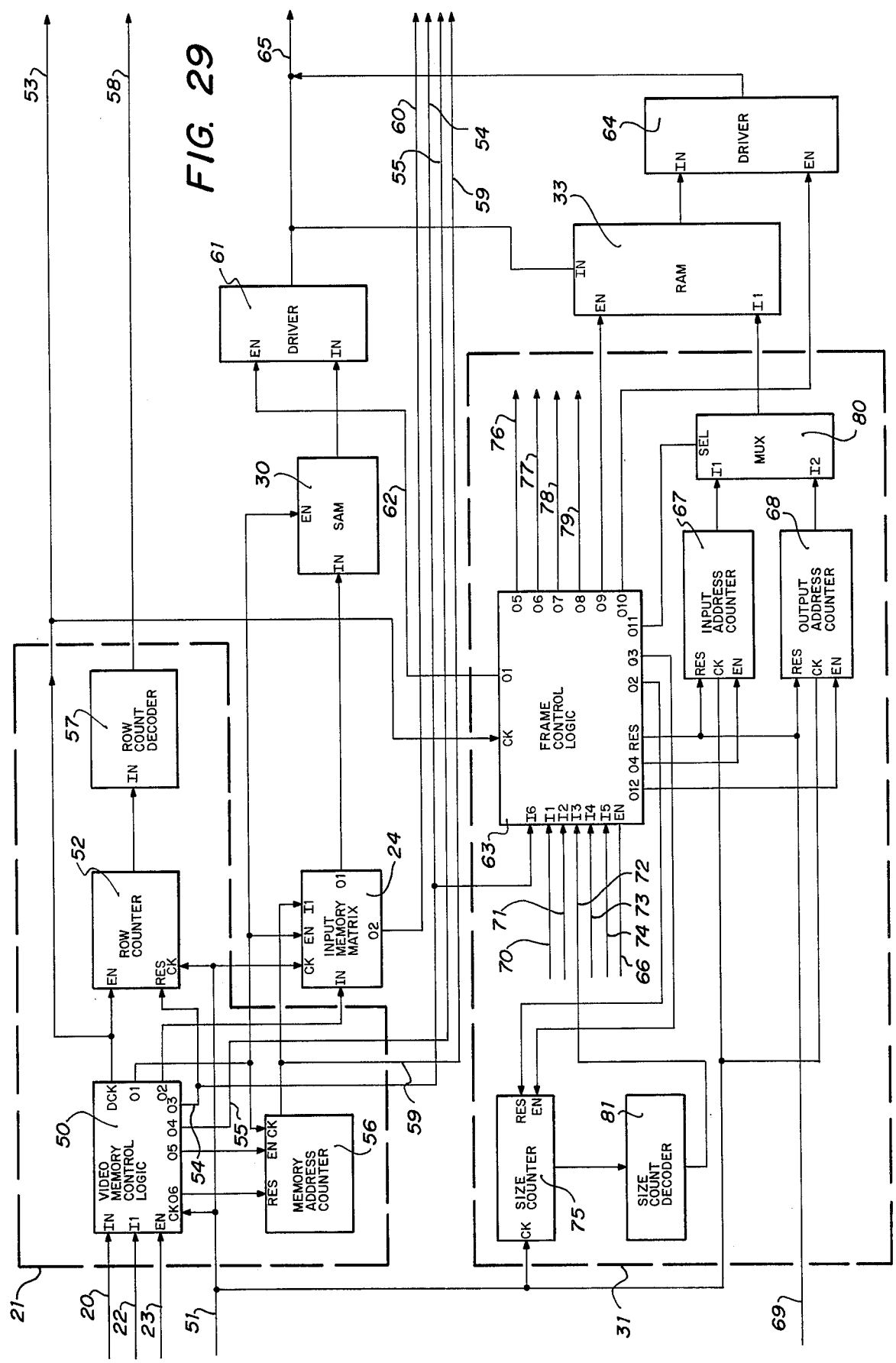
FIGS. 29-30 illustrate modifications to the system of FIGS. 4-8 to accommodate proportional pitch characters.
Figure 30:
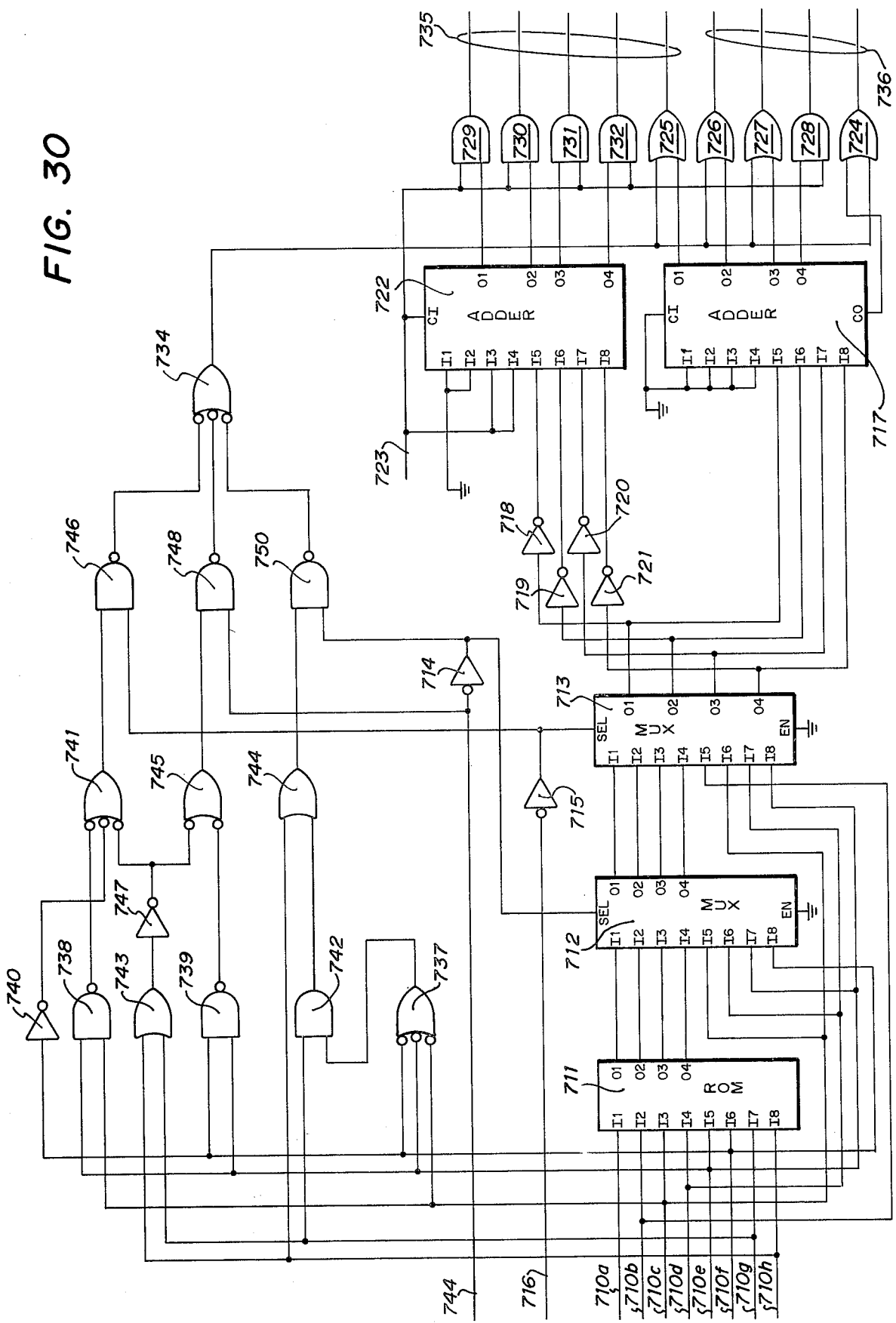

FIGURES 29 and 30

FIGS. 29 and 30 illustrate modifications to the preferred embodiment of FIGS. 4-8 which are required to accommodate a binary information stream exhibiting proportional character pitch.

A line of information exhibiting proportional character pitch is one wherein the space between characters is dependent upon the character width. To detect and locate proportional pitch characters, it is necessary to left justify a character image in SAM 30 of FIG. 4 rather than horizontally center the character as before described. This is accomplished by forcing the left limit of arithmetic unit 175 of FIG. 7 to zero. The right limit then becomes the width of the character image.

In comparing FIG. 29 with FIG. 4, it is seen that the figures are identical except for the removal of delay logic unit 25. In FIG. 29, the 01 output of input memory matrix unit 24 is connected to the input of SAM 30. Further, by comparing FIGS. 30 and 24, it is seen that inverter 733 has been removed. Further, in FIG. 30 the CI input of adder 722 has been connected to an input of each of gates 728-732. The 13 and 14 inputs of adder 717 are no longer connected to the 13 and 14 inputs of adder 722, but now are connected to the 11 and 12 inputs of adder 717.

The remaining modification to the system of FIGS. 4-8 is in the ROM 98 bit pattern. Table V itemizes the changes that are to be made to Table II, supra, for proportional pitch character identification and location. No other modifications to the systems of FIGS. 4-8 are required.

TABLE V

| ABSOLUTE ADDRESS | RELATIVE PAGE ADDRESS | HEX CODE | BINARY CODE | | | | INSTRUCTION | | |
|---|---|---|---|---|---|---|---|---|---|
| 25 | 25 | 029E | 0000 | 0010 | 1001 | 1110 | GFL | 20 | SBS |
| 48 | 48 | FD1F | 1111 | 1101 | 0001 | 1111 | LTI | 40 | NOP |
| 76 | 12 | 01C9 | 0000 | 0001 | 1100 | 1001 | GFL | 14 | SFC |
| 86 | 22 | 030A | 0000 | 0011 | 0000 | 1010 | GFL | 24 | RFC |
| 106 | 42 | 01C9 | 0000 | 0001 | 1100 | 1001 | GFL | 14 | SFC |

In accordance with the invention, there is provided a system for detecting characters which heretofore could not reliably be detected in a binary information stream. More particularly, overlapping characters, broken segment characters and characters occurring in information fields with background noise are detected reliably in sensor information streams exhibiting a fixed, a variable or a proportional character pitch. Touching characters are detected reliably in sensor information streams exhibiting a fixed character pitch. Further, the performance of the system is not compromised by the appearance of characters or character fragments from an adjacent information line appearing in the field of view of the information line being scanned.

Having described the invention in connection with certain specific embodiments thereof, it is to be understood that further modifications may now suggest themselves to those skilled in the art, and it is intended to cover such modifications as fall within the scope of the claims.

What is claimed is:

1. A character detection and location system receiving a binary information stream from a sensor scanning characters printed on a document surface for centering valid character information in a memory mosaic, which comprises:
   (a) data synchronization means receiving said binary information stream for synchronizing the information rate to the processing rate of said system;
   (b) shift register memory means in electrical communication with said synchronization means for providing responses to said binary information stream passing through registration with selected memory cells;
   (c) plural tracker means receiving said responses from said memory means for concurrently tracing plural character segments each comprised of said responses satisfying an adjacency condition, each tracker means including means receiving said responses for signaling when said adjacency condition is satisfied;
   (d) tracker control means in electrical communication with said memory means for selectively activating an inactive one of said plural tracker means when one of said responses satisfies a start condition; and
   (e) data evaluation means in electrical communication with said plural tracker means for detecting the position and boundaries of valid character information in said binary information stream, said data evaluation means including means in electrical communication with said plural tracker means for determining if a character segment represents valid character information.

2. A system for detecting and segregating character information in a binary data stream generated by digitizing sensor cell responses of a linear sensor array scanning a line of information, which comprises:
   (a) memory means receiving said binary data stream at a data rate for providing a two-dimensional binary image;
   (b) a plurality of tracker means receiving binary subimages passing through registration with a fixed sample window of said memory means at a rate synchronous to said data clock rate for concurrently tracing plural character segments, each of which is comprised of character information contained in said memory cells satisfying an adjacency condition, each tracker means including means connected to compare the information contained in one cell with the information contained in certain other cells including adjacent cells to said one cell to determine if said adjacency condition is satisfied and producing a tracked cell count representing character information found adjacent for each tracked image, a width count for said tracked image, and top and bottom coordinates of said tracked image;
   (c) tracker control means responsive to said memory means and said plural tracker means for activating an inactive one of said plural tracker means upon the satisfaction of a start condition; and
   (d) data evaluation means receiving said tracked cell count, a width count for said tracked image, and top and bottom coordinates of said tracked image from each of said tracker means for determining if said tracked image conforms to certain parameters including width, height, and cell count which define valid character information.

3. A system for detecting and locating characters including touching characters, overlapping characters and broken segment characters in a binary information stream generated by scanning a line of printed characters with linear sensor array, which comprises:
   (a) memory control means receiving said information stream for controlling the circulation of information in said system;
   (b) shift register means in electrical communication with said memory control means for providing at a shift rate signals of a fixed pattern of register cells;
   (c) plural tracker means, each of said tracker means in electrical communication with said memory control means and independently tracing one of a plurality of character segments and providing tracker information concerning each traced character segment, each of said tracker means including means for determining if an adjacency condition is satisfied by comparing information of said information stream within one cell with the information within certain other cells;
   (d) tracker selector means in electrical communication with said system control means for activating an inactive one of said plural tracker means each time a combination of said signals satisfies a start condition;

(e) data evaluation means responsive to said system control means for sensing said plural tracker means to detect said valid character information and merging tracker information from those of said plural tracker means providing said valid character information to locate a valid character in said binary information stream; and (f) system control means responsive to said memory control means and in electrical communication with said data evaluation means for signalling the occurrences of valid character information and a character presence.

4. The combination set forth in claim 3, wherein said memory control means includes:

(a) phase control means for synchronizing the information and scan rates to a system clock rate;

(b) row counter means responsive to said phase control means for identifying a current and last sensor cell response of a sensor array scan to said plural tracker means;

(c) delay logic means responsive to said phase control means and in electrical communication with said shift register means for imparting a delay to said binary information stream to accommodate the detection of said character presence and the evaluation of tracker information;

(e) character storage means in electrical communication with said delay logic means for storing a character image in a memory mosaic; and (f) character output control means responsive to said phase control means and said system control means for transferring said character image from said system.

5. The combination set forth in claim 4, wherein said character output control means includes:

(a) frame control logic means responsive to said character presence for controlling the transfer of said character image from said character storage means;

(b) size counter means in electrical communication with said frame control logic means for indicating the completion of a data transfer from said character storage means;

(c) output memory means responsive to said frame control logic means and in electrical communication with said character storage means for storing plural character images; and (d) memory address means responsive to said frame control logic means for selecting memory locations of said output memory means during reading and writing operations.

6. The combination set forth in claim 4, wherein each of said plural tracker means includes:

(a) tracker memory means in electrical communication with said shift register means for storing those of said signals satisfying either said start or said adjacency condition;

(b) adjacency arithmetic means in electrical communication with said shift register means and said tracker memory means for detecting those of said signals satisfying said adjacency condition;

(c) tracker control logic means responsive to said phase control means, and in electrical communication with said adjacency arithmetic means and said tracker selector means for tracing a binary image of said center cell signals satisfying said adjacency condition;

(d) tracker top register means responsive to said tracker control logic means and in electrical communication with said row counter means for indicating the topmost coordinate of said binary image;

(e) tracker bottom register means responsive to said tracker control logic means and in electrical communication with said row counter means for indicating the lowermost coordinate of said binary image;

(f) tracked cell counter means responsive to said tracker control logic means for counting the number of cells of said binary image that have been traced; and (g) tracker width counter means responsive to said tracker control logic means for indicating the scan width of said binary image.

7. The combination set forth in claim 6, wherein said system control means includes:

(a) a read only memory;

(b) parameter memory means responsive to said read only memory for supplying threshold values to be used in the evaluation of tracker information;

(c) tracker address means responsive to said read only memory for sequentially addressing said plural tracker means; and (d) valid tracker register means responsive to said read only memory for signalling those of said plural tracker means tracing a valid character image.

8. The combination set forth in claim 7, wherein said tracker selector means includes:

(a) start arithmetic means in electrical communication with said shift register means for detecting those of said signals satisfying said start condition; and (b) tracker sequence controller means in electrical communication with said start arithmetic means for activating an inactive one of said plural tracker means when said start condition is satisfied but said adjacency condition is not.

9. The combination set forth in claim 8, wherein said data evaluation means includes:

(a) character register means responsive to said read only memory and in electrical communication with selected ones of said plural tracker means for indicating the top and bottom coordinates of said valid character image;

(b) first character arithmetic means in electrical communication with said character register means for providing the height and the center coordinates of said valid character image;

(c) first comparison means responsive to said character arithmetic means and said parameter memory means for providing an indication of the presence of said valid character image;

(d) second character arithmetic means in electrical communication with said selected ones of said plural tracker means for providing the width of said valid character image;

(e) second comparison means responsive to said second character arithmetic means and said parameter memory means for providing an indicator of the presence of said valid character image;

(f) tracked cell comparison means responsive to said read only memory and in electrical communication with said parameter memory means for providing an indication of the presence of said valid character image;

(g) horizontal location means in electrical communication with said second character arithmetic means and responsive to said read only memory and said phase control means for indicating that said valid character image has been horizontally centered in said memory mosaic;

(h) vertical location means in electrical communication with said row counter means and said first character arithmetic means for indicating the top row of said valid character image in said memory mosaic; and (i) scan size detection means in electrical communication with said row counter means, a first of said plural tracker means, and said read only memory for detecting a scan having minimum information content.

10. A method of detecting and locating characters including touching, overlapping and broken segment characters and background noise in a binary information stream having a plurality of scans comprising the steps of:

(a) forming a plural scan binary image from said information stream;

(b) sensing means of said binary information within said binary image;

(c) initializing traces of each character and background noise segments contained in said information stream satisfying a start condition;

(d) comparing prior and subsequent scans with a particular scan of said binary information for each trace to determine if an adjacency condition is satisfied;

(e) continuing each trace to subsequent scans of said information stream if binary information in said subsequent scans satisfies said adjacency condition;

(f) counting number of consecutive scans for each trace satisfying said adjacency condition;

(g) retaining location of uppermost and lowermost bits of binary information within said scans for each trace;

(h) counting each bit of binary information contained in each trace;

(i) detecting each trace of valid character information by comparing certain predetermined parameters with the count of bits of binary information for each trace, the number of consecutive scans accumulated for each trace, and the location of the uppermost and lowermost bits of binary information for each trace;

(j) following step (h), detecting a scan within each trace which contains valid character information having a minimum number of binary bits to locate a character boundary;

(k) resetting each trace containing other than trace information representing valid character information;

(l) terminating each trace containing trace information representing valid character information when said adjacency condition is undetected for a complete scan;

(m) merging said count of bits accumulated, the number of consecutive scans and the location of the lowermost and uppermost bits of binary information to form composite character information;

(n) detecting the presence of a valid character in said information stream from said composite character information; and (o) rejecting said valid character upon detecting the valid character information thereof is at and above a certain maximum location within said scans and upon detecting the valid character information thereof is at and below a certain minimum location within said scan.

11. A system for detecting and locating characters in a binary stream without affecting data contained therein, said stream being divided into scans, each binary bit of each scan disposed in a particular row defined by the location of the binary bit within the scan comprising:

(a) a control means receiving said binary stream for controlling the circulation of the data contained within said binary stream through and out of said system;

(b) memory means receiving said data serially and storing each scan as received in response to said control means with a binary bit disposed in one row of one scan being lined up with the binary bits of said one row of prior scans for providing each binary bit of each scan at one output of said memory means in a predetermined sequence;

(c) a plurality of tracker means connected to said one output of said memory means for tracing data bits representing character information and background noise within said binary stream, each tracker means including means connected to said one output of said memory means for determining adjacency of one data bit by examining other binary bits having a certain predetermined relationship by row and scan to said one data bit;

(d) data evaluation means in electrical communication with said plurality of tracker means for identifying and evaluating data bits determined as adjacent to locate said characters within said stream without affecting the data contained therein.

* * * * *